(12) United States Patent
Tsuruta et al.

(10) Patent No.: US 6,759,165 B2
(45) Date of Patent: Jul. 6, 2004

(54) HYDROGEN-ABSORBING ALLOY, METHOD OF SURFACE MODIFICATION OF THE ALLOY, NEGATIVE ELECTRODE FOR BATTERY AND ALKALINE SECONDARY BATTERY

(75) Inventors: Shinji Tsuruta, Yokohama (JP); Tatsuoki Kohno, Kawasaki (JP); Motoya Kanda, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 151 days.

(21) Appl. No.: 09/933,900

(22) Filed: Aug. 22, 2001

(65) Prior Publication Data

US 2002/0037454 A1 Mar. 28, 2002

Related U.S. Application Data

(60) Division of application No. 09/270,763, filed on Mar. 17, 1999, which is a division of application No. 08/787,101, filed on Jan. 22, 1997, now Pat. No. 5,962,165, which is a continuation-in-part of application No. 08/505,154, filed on Jul. 21, 1995, now abandoned.

(30) Foreign Application Priority Data

| Jul. 22, 1994 | (JP) | 6-170903 |
| Aug. 23, 1994 | (JP) | 6-198513 |
| Mar. 16, 1995 | (JP) | 7-083453 |
| Jan. 22, 1996 | (JP) | 8-008219 |
| Jan. 22, 1996 | (JP) | 8-008220 |

(51) Int. Cl.$^7$ ................................................ H01M 4/46
(52) U.S. Cl. ...................................... 429/218.2; 420/900
(58) Field of Search ......................... 429/218.2; 420/900

(56) References Cited

U.S. PATENT DOCUMENTS

| 4,623,597 A | * 11/1986 | Sapru et al. ................. 429/101 |
| 5,506,069 A | 4/1996 | Ovshinsky et al. |
| 5,554,456 A | 9/1996 | Ovshinsky et al. |
| 5,576,118 A | 11/1996 | Zhang et al. |
| 5,616,432 A | 4/1997 | Ovshinsky et al. |
| 5,708,349 A | 1/1998 | Hasebe et al. |
| 5,853,919 A | 12/1998 | Kohno et al. |
| 5,962,165 A | 10/1999 | Tsuruta et al. |

FOREIGN PATENT DOCUMENTS

JP 5815794 3 9/1983

* cited by examiner

*Primary Examiner*—Carol Chaney

(57) ABSTRACT

A hydrogen-absorbing alloy which is excellent in stability in an aqueous solution and in mechanical pulverizability is disclosed. This hydrogen-absorbing alloy contains an alloy represented by the following general formula (I):

$$Mg_2M1_y \quad (I)$$

wherein M1 is at least one element selected (excluding Mg, elements which are capable of causing an exothermic reaction with hydrogen, Al and B) from elements which are incapable of causing an exothermic reaction with hydrogen; and y is defined as $1 < y \leq 1.5$.

13 Claims, 8 Drawing Sheets

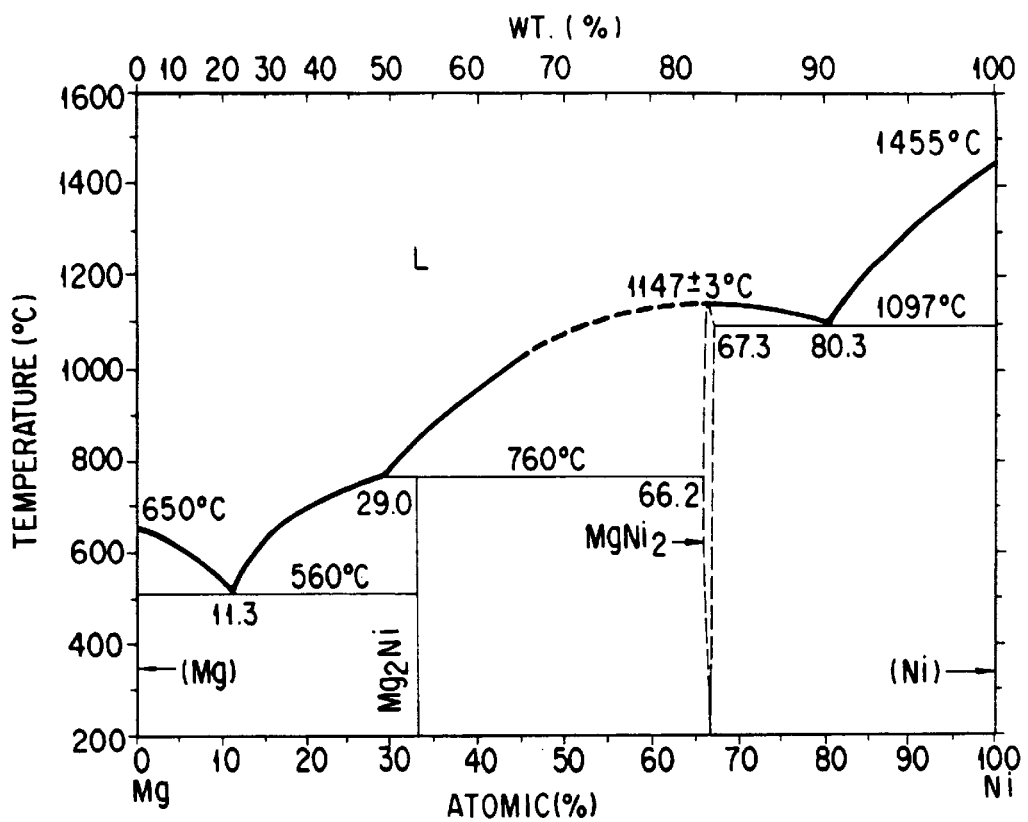
F I G. 1
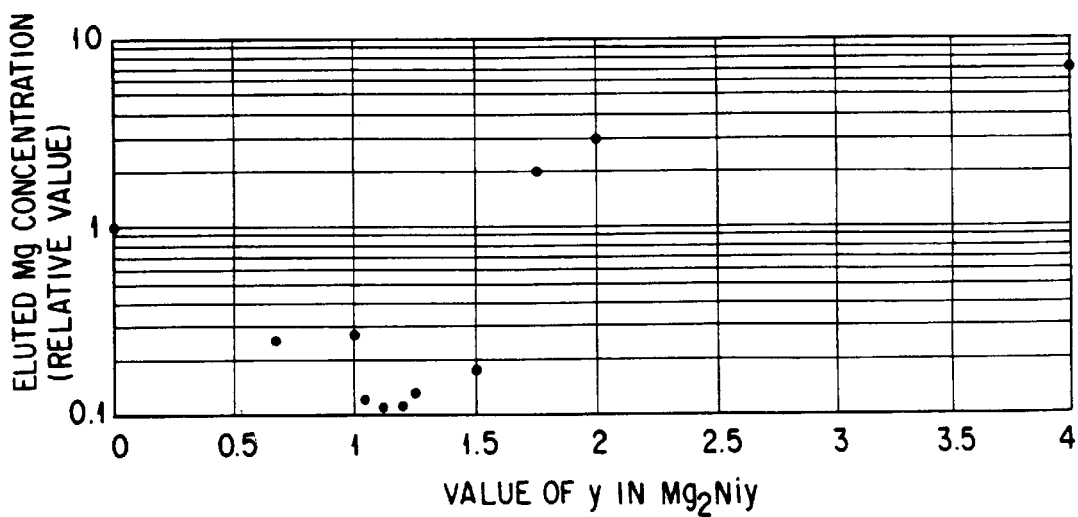
F I G. 4

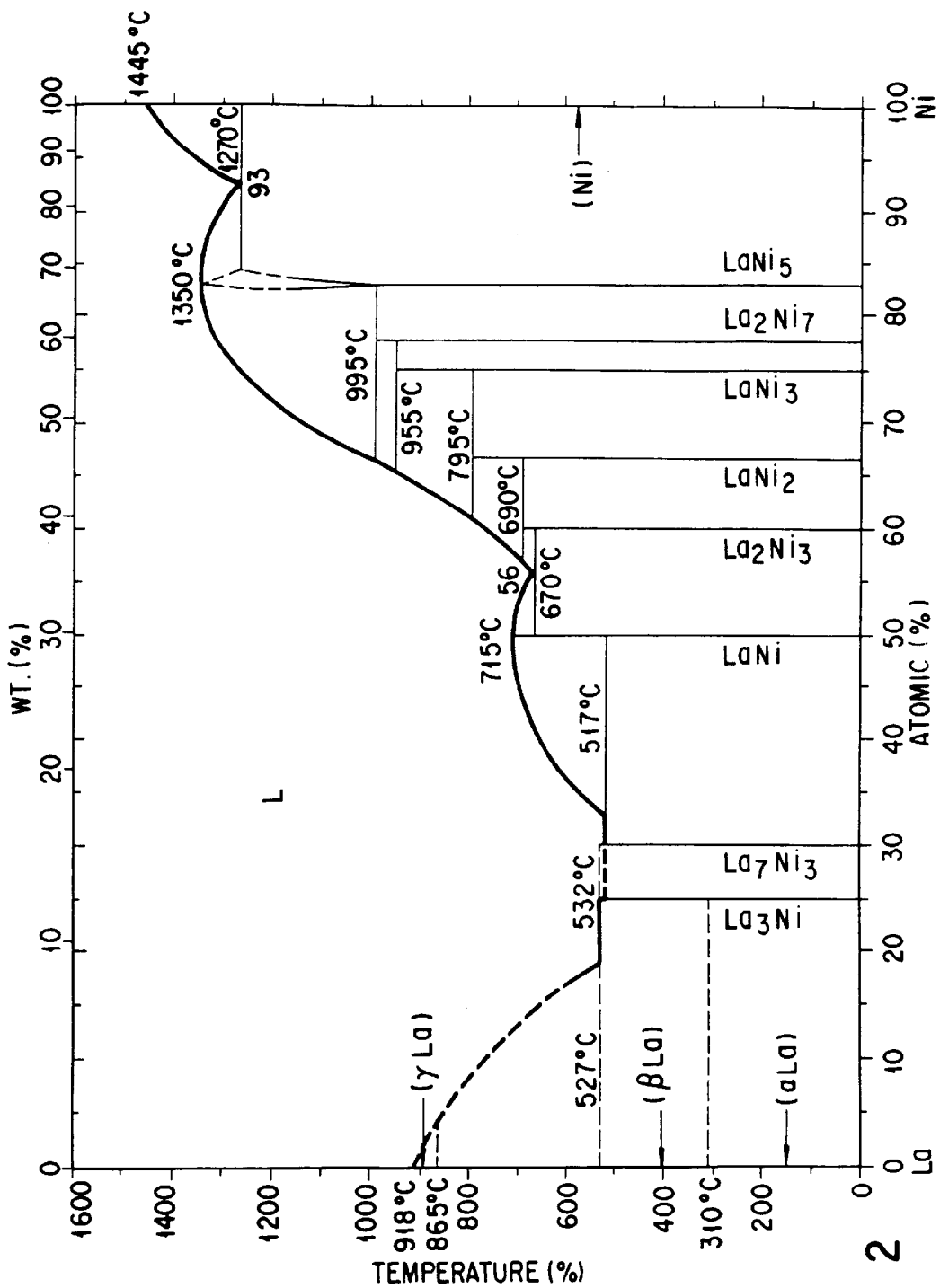
F I G. 2

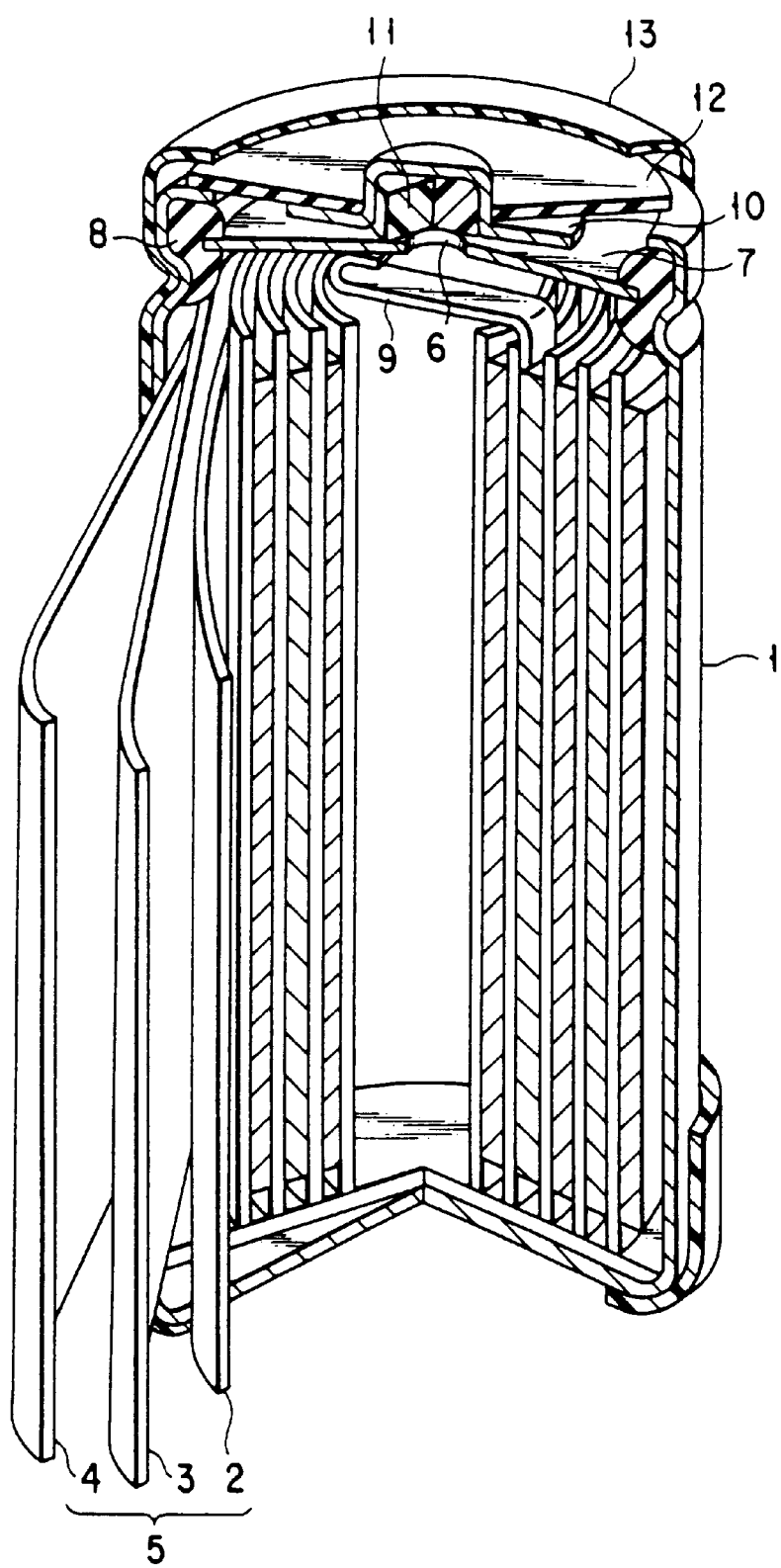
F I G. 3

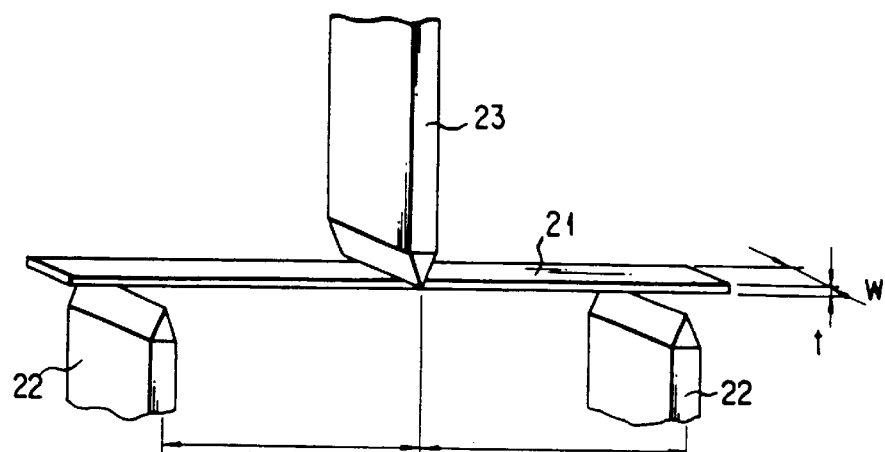
F I G. 5
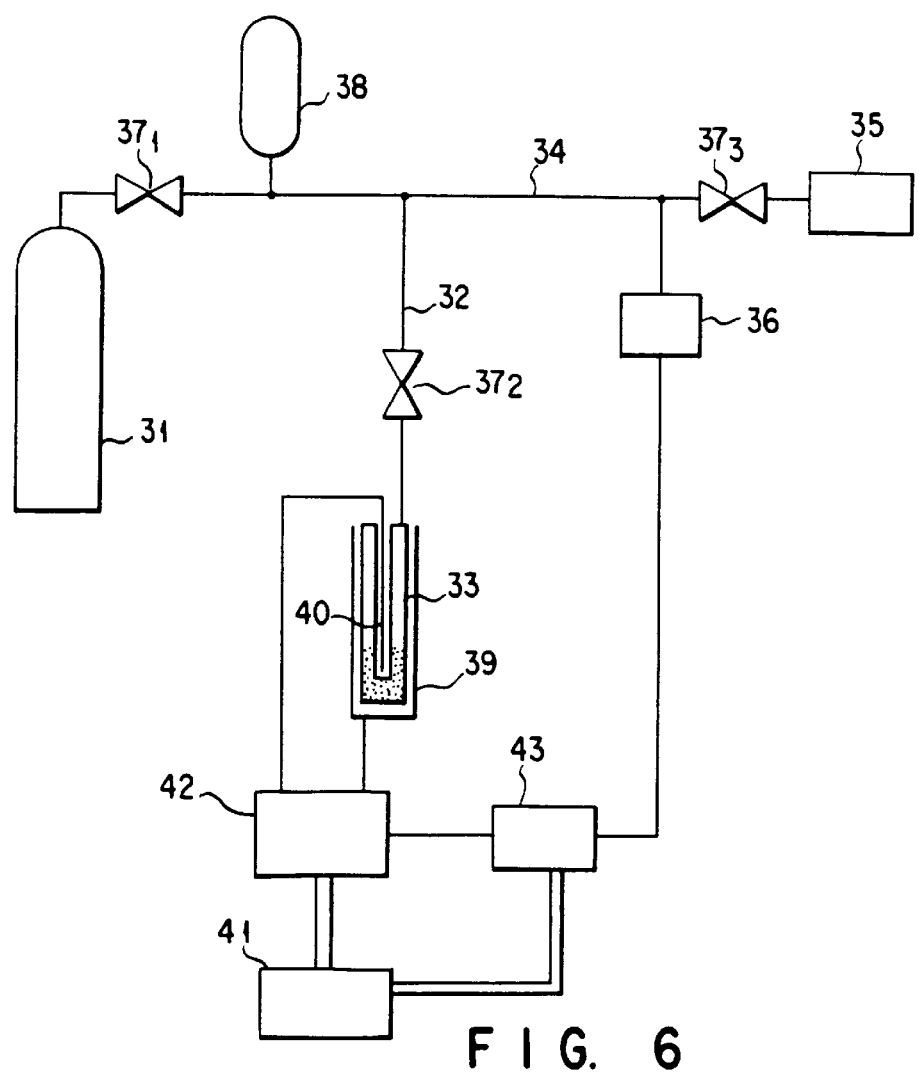
F I G. 6

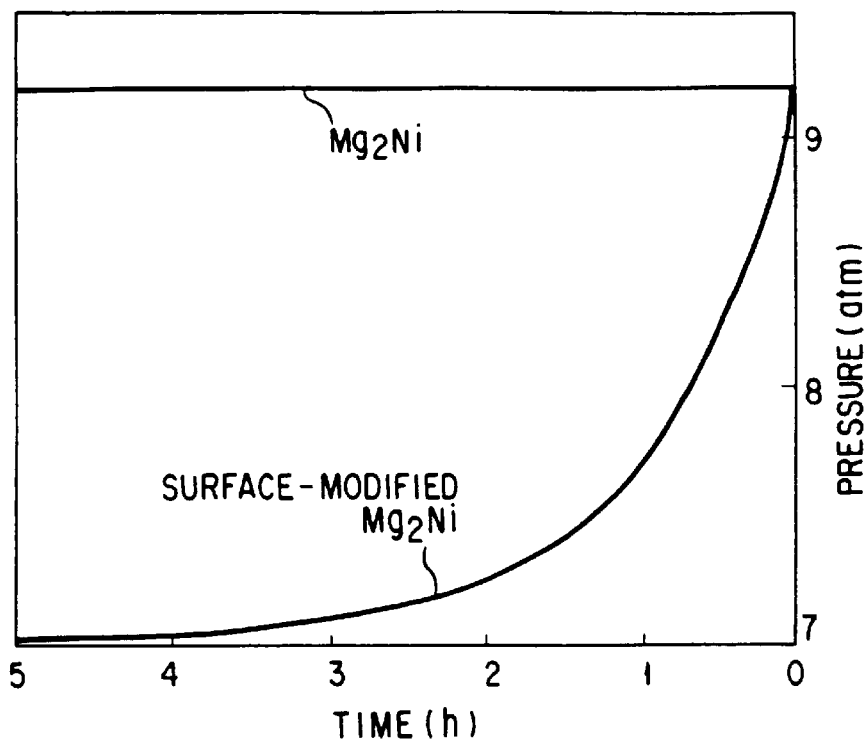
F I G. 9
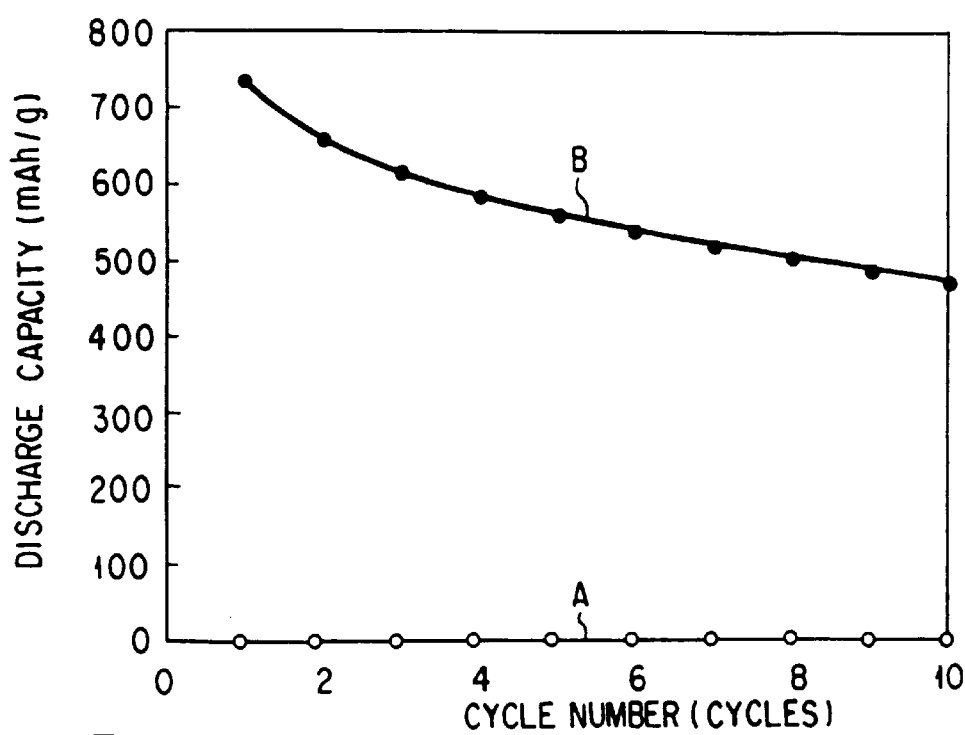
F I G. 10

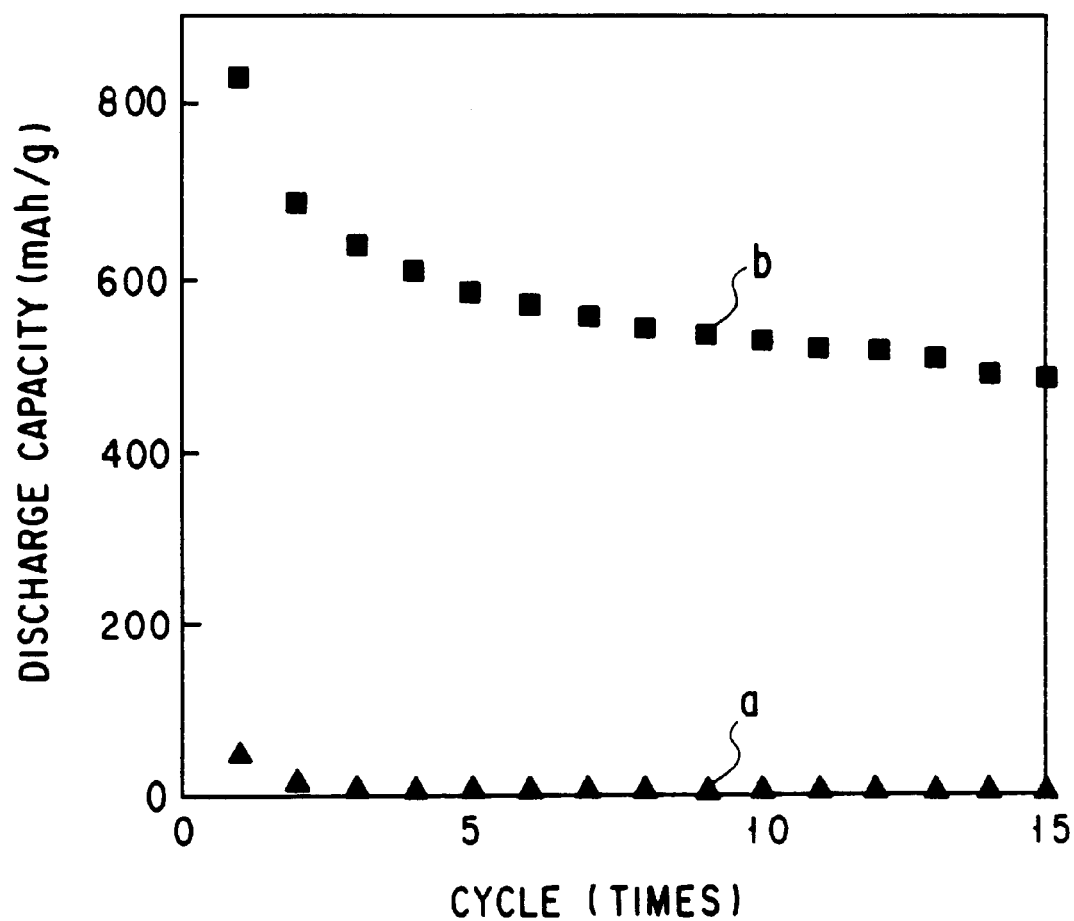
F I G. 11

HYDROGEN-ABSORBING ALLOY, METHOD OF SURFACE MODIFICATION OF THE ALLOY, NEGATIVE ELECTRODE FOR BATTERY AND ALKALINE SECONDARY BATTERY

CROSS-REFERENCE TO RELATED APPLICATIONS

This application is a division of U.S. patent application Ser. No. 08/787,101, filed Jan. 22, 1997 now U.S. Pat. No. 5,962,165 which is a continuation-in-part of U.S. patent application Ser. No. 08/505,154, filed Jul. 21, 1995, now abandoned.

BACKGROUND OF THE INVENTION

This invention relates to a hydrogen-absorbing alloy, a method of modifying the surface of the hydrogen-absorbing alloy, negative electrode for battery and an alkaline secondary battery.

Hydrogen-absorbing alloy is known as being capable of stably absorbing and storing hydrogen several ten thousands times (calculated as a gas under normal temperature and pressure) as much as of its own volume. Therefore, hydrogen-absorbing alloy is noticed as a promising material for safely and easily storing, keeping and transporting hydrogen as an energy source. Hydrogen-absorbing alloy is also studied for utilization in a chemical heat pump or compressor by making most of a difference in property between hydrogen-absorbing alloys, some of them being developed for actual use. Recently, the application of hydrogen-absorbing alloys to a metal hydride secondary battery (for example, nickel-hydrogen secondary battery) as an energy source by making use of hydrogen stored in a hydrogen-absorbing alloy, as well as an electrode material by making use of its high catalytic activity in the absorption and desorption reaction of the hydrogen-absorbing alloys has been extensively developed.

As evident from these facts, the hydrogen-absorbing alloy has many possibilities for various applications in view of its physical and chemical characteristics, so that the hydrogen-absorbing alloy is now considered as being one of important raw materials in future industrial.

The metal capable of absorbing hydrogen and constituting the hydrogen-absorbing alloy may be in the form of single substance which reacts exothermically with hydrogen, i.e., a metal element capable of forming a stable compound together with hydrogen (for example, platinum group elements, lanthanum group elements and alkaline earth elements); or in the form of an alloy comprising such a metal, as mentioned above, alloyed with another kind of metals. One of the advantages of the alloy resides in that the bonding strength between a metal and hydrogen can be suitably weakened so that not only the absorption reaction but also the desorption reaction can be performed comparatively easily. Second advantage of the alloy resides in that the absorption and desorption characteristics of the alloy with respect to the magnitude of hydrogen gas pressure required for the reaction (equilibrium pressure; plateau pressure), the extent of equilibrium region (plateau region), the change (flatness) of equilibrium pressure during the process of absorbing hydrogen and the like can be improved. Third advantage of the alloy resides in the improvement in chemical and physical stability.

The composition of the conventional hydrogen-absorbing alloy may be classified into the following types; i.e., (1) an $AB_5$ type (for example, $LaNi_5$, $CaNi_5$); (2) an $AB_2$ type (for example, $MgZn_2$, $ZrNi_2$); (3) an AB type (for example, TiNi, TiFe); (4) an $A_2B$ type (for example, $Mg_2Ni$, $Ca_2Fe$); and other types (for example, cluster), wherein A represents a metal element which is capable of exothermically reacting with hydrogen, and B, another kind of metal. Among them, $LaNi_5$ of (1), a laves phase alloy belonging to (2) and some kinds of alloy belonging to (3) are capable of reacting with hydrogen at the normal temperature, and chemically stable so that they are extensively studied as a candidate for an electrode material of a secondary battery.

Whereas, the hydrogen-absorbing alloy belonging to (4) $A_2B$ type is accompanied with the following problems. Namely, the alloy strongly attract hydrogen so that hydrogen once absorbed therein can be hardly released. The absorption and desorption reaction thereof occurs only when the temperature thereof is raised up to a relatively high degree (about 200 to 300° C.), and the rate of the reaction, if occurred, is slow. The chemical stability, in particular the stability in an aqueous solution, of the alloy is comparatively low. The alloy is generally very viscous and hard so that the working such as pulverization of it is very difficult. In view of these facts, the hydrogen-absorbing alloy of $A_2B$ type is rarely utilized except for the storage and transport of hydrogen in spite of its excellent capacity of absorbing hydrogen which is comparable to other types of hydrogen-absorbing alloy on the basis of volume and, if calculated on the basis of weight, two to several times as high as that of other types of hydrogen-absorbing alloy. Therefore, if these problems inherent to the hydrogen-absorbing alloy of $A_2B$ type as explained above are solved, it would be possible to expand the application of the alloy not only to the same fields as those of other types of hydrogen-absorbing alloy but also to a new field of utilization.

By the way, there have been reported a number of academic papers on the hydrogen-absorbing alloy of this (5) type. However, up to date, the report of practical use or testing for practical use is almost none.

Meanwhile, there is disclosed in Jpn. Pat. KOKAI Publication No. 6-76817 a magnesium-based hydrogen-absorbing alloy represented by a composition formula of $Mg_{2-x}Ni_{1-y}A_yB_x$ (wherein x is 0.1 to 1.5; y is 0.1 to 0.5; A represents an element selected from Sn, Sb and Bi; B represents an element selected from Li, Na, K and Al) such for example as $Mg_{1.5}Al_{0.5}Ni_{0.7}Sn_{0.3}$; or $Mg_{1.8}Al_{0.2}Ni_{0.8}Sn_{0.2}$. There is also disclosed in this publication that the hydrogen-absorbing alloy can be utilized as a negative electrode material of an alkali secondary battery. However, since this hydrogen-absorbing alloy disclosed in the publication is fundamentally of $A_2B$ type, the hydrogen-absorbing and desorbing property thereof in the normal temperature region is poor. Therefore, in order to make it possible to absorb and desorb hydrogen under normal temperature and pressure, the hydrogen-absorbing alloy is covered on the surface thereof with a nickel metal compound or a phosphorous compound as disclosed in the publication.

As explained above, the $A_2B$ type hydrogen-absorbing alloy has a feature distinct from other types of hydrogen-absorbing alloy in that it is light in weight, large in capacity and low in raw material cost since its composition is mainly consisted of alkaline earth metals and iron group elements. However, the $A_2B$ type hydrogen-absorbing alloy is accompanied with various problems as explained above.

BRIEF SUMMARY OF THE INVENTION

Accordingly, an object of the present invention is to provide a hydrogen-absorbing alloy which is chemically stable, in particular in an aqueous solution, and can be easily pulverized by way of mechanical means.

Another object of this invention is to provide a hydrogen-absorbing alloy which is improved of its hydrogen-absorbing property, in particular the hydrogen-absorbing at room temperature.

Another object of this invention is to provide a method of modifying the surface activity of the hydrogen-absorbing alloy so that hydrogen can be easily and sufficiently absorbed by the hydrogen-absorbing alloy.

A further object of this invention is to provide a negative electrode for a secondary battery, which is excellent in stability during the electrode reaction, and to provide an alkali secondary battery having an improved charge/discharge cycle property.

A still further object of this invention is to develop a means to evaluate the deteriorating rate of a hydrogen-absorbing alloy containing magnesium, and, on the basis of this means, to provide a negative electrode suited for practical use, which is excellent in the reversibility and stability in the electrode reaction and an alkali secondary battery provided with such a negative electrode.

Namely, according to the present invention, there is provided a hydrogen-absorbing alloy containing an alloy represented by the following general formula (I):

$$Mg_2M1_y \qquad (I)$$

wherein M1 is at least one element selected (excluding Mg, elements which are capable of causing an exothermic reaction with hydrogen, Al and B) from elements which are incapable of causing an exothermic reaction with hydrogen; and y is defined as $1<y\leq0.5$.

According to the present invention, there is further provided a hydrogen-absorbing alloy containing an alloy represented by the following general formula (II):

$$Mg_{2-x}M2_xM1_y \qquad (II)$$

wherein M2 is at least one element selected (excluding Mg) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0<x\leq1.0$; and y is defined as $1<y\leq2.5$.

Further, according to the present invention, there is also provided a hydrogen-absorbing alloy containing an alloy represented by the following general formula (III):

$$M_{2-x}M2_xM1_y \qquad (III)$$

wherein M is at least one element selected Be, Ca, Sr, Ba, Y, Ra, La, Ce, Pr, Pm, Sm, Eu, Gd, Tb, Dy, Ho, Er, Tm, Lu, Ti, Zr, Hf, Pd and Pt; M2 is at least one element selected (excluding M) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0.01<x\leq1.0$; and y is defined as $0.5<y\leq1.5$.

Moreover, according to the present invention, there is further provided a method of modifying the surface of a hydrogen-absorbing alloy comprises a step of treating the hydrogen-absorbing alloy with an R—X compound, wherein R represents alkyl, alkenyl, alkynyl, aryl or a substituted group thereof; X is a halogen element.

Still more, according to the present invention, there is further provided a hydrogen-absorbing alloy, wherein a half-width $\Delta(2\theta)$ of at least one peak out of peaks of three strongest lines to be obtained by an X-ray diffraction of the alloy using Cuk α-ray as a radiation source lies in the range of $0.2°\leq\Delta(2\theta)\leq50°$.

Still more, according to the present invention, there is further provided a hydrogen-absorbing alloy which comprises 10% or more of magnesium, wherein an apparent half-width $\Delta(2\theta_1)$ of a peak in the vicinity of 20° lines in the range of $0.3°\leq\Delta(2\theta_1)10°$, or an apparent half-width $\Delta(2\theta2)$ of a peak in the vicinity of 40° lies in the range of $0.3\leq\Delta(2\theta_2)\leq10°$ in an X-ray diffraction of the alloy using CuKα-ray as a radiation source.

Moreover, according to the present invention, there is further provided a method of modifying the surface of a hydrogen-absorbing alloy comprising a step of mechanically treating the hydrogen-absorbing alloy under vacuum or in an atmosphere of an inert gas or hydrogen.

Moreover, according to the present invention, there is further provided a method of modifying the surface of a hydrogen-absorbing alloy, which comprising the steps of mechanically treating the hydrogen-absorbing alloy under vacuum or in an atmosphere of an inert gas or hydrogen.

Furthermore, according to the present invention, there is provide a negative electrode for battery containing a hydrogen-absorbing alloy comprising an alloy represented by the following general formula (I):

$$Mg_2M1_y \qquad (I)$$

Wherein M1 is at least one element selected (excluding Mg, elements which are capable of causing an exothermic reaction with hydrogen, Al and B) from elements which are incapable of causing an exothermic reaction with hydrogen; and y is defined as $1<y\leq1.5$.

According to the present invention, there is further provided an alkali secondary battery comprising a negative electrode containing a hydrogen-absorbing alloy comprising an alloy represented by the following general formula (I):

$$Mg_2M1_y \qquad (I)$$

Wherein M1 is at least one element selected (excluding Mg, elements which are capable of causing an exothermic reaction with hydrogen, Al and B) from elements which are incapable of causing an exothermic reaction with hydrogen; and y is defined as $1<y\leq1.5$.

According to the present invention, there is provided a negative electrode for battery containing a hydrogen-absorbing alloy comprising an alloy represented by the following general formula (II):

$$Mg_{2-x}M2_xM1_y \qquad (II)$$

wherein M2 is at least one element selected (excluding Mg) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0<x\leq1.0$; and y is defined as $1<y\leq2.5$.

According to the present invention, there is further provided an alkali secondary battery comprising a negative electrode containing a hydrogen-absorbing alloy comprising an alloy represented by the following general formula (II):

$$Mg_{2-x}M2_xM1_y \qquad (II)$$

wherein M2 is at least one element selected (excluding Mg) from the group consisting of elements which are capable of causing an exothermic reaction with hydrogen, Al and B; M1 is at least one element selected (excluding Mg and M2) from elements which are incapable of causing an exothermic reaction with hydrogen; x is defined as 0<x≦1.0; and y is defined as 1<y≦2.5.

According to the present invention, there is provided a negative electrode for battery containing a hydrogen-absorbing alloy, wherein a half-width Δ(2θ) of a least one peak out of peaks of three strongest lines to be obtained by an X-ray diffraction using Cukα-ray as a radiation source lies in the range of 0.2°≦Δ(2θ)≦50°.

According to the present invention, there is further provided an alkali secondary battery comprising a negative electrode containing a hydrogen-absorbing alloy, wherein a half-width Δ(2θ) of a least one peak out of peaks of three strongest lines to be obtained by an X-ray diffraction using Cuk α-ray as a radiation source lies in the range of 0.2°≦Δ(2θ)≦50.

According to the present invention, there is provided a negative electrode for battery containing a hydrogen-absorbing alloy comprising magnesium, wherein, when the negative electrode is immersed in a 6N to 8N aqueous solution of an alkali hydroxide, (a) either the elution rate of magnesium ion into the aqueous solution of alkali hydroxide of normal temperature is not more than 0.5 mg/kg alloy/hr, or the elution rate of magnesium ion into the aqueous solution of alkali hydroxide of 60° C. is not more than 4 mg/kg alloy/hr, and (b) either the elution rate of component element of alloy into the aqueous solution of alkali hydroxide of normal temperature is not more than 1.5 mg/kg alloy/hr, or the elution rate of a component element of alloy into the aqueous solution of alkali hydroxide of 60° C. is not more than 20 mg/kg alloy/hr.

According to the present invention, there is further provided an alkali secondary battery comprising a negative electrode accommodated in a case and containing a hydrogen-absorbing alloy comprising magnesium, a positive electrode accommodated in the case and so arranged s to oppose the negative electrode with a separator sandwiched therebetween, and an alkali electrolyte filled therein; wherein a magnesium ion concentration in the alkali electrolyte 30 days or more after filling and sealing the alkali electrolyte in the case is not more than 2.2 mg/liter.

According to the present invention, there is further provided a hydrogen-absorbing alloy containing an alloy represented by the following general formula (V):

$(Mg_{1-x}M3_x)_{20-y}M4$      (V)

wherein M4 is at least one element selected Ni, Fe, Co, Cu, Zn, Sn and Si; M3 is at least one element selected (excluding the elements of M4) from the group consisting of elements which are more electronegative than Mg; x is defined as 0<x<0.5; and y is defined as 0≦y<18.

Further, according to the present invention, there is also provided a hydrogen-absorbing alloy containing an alloy represented by the following general formula (VI):

$(Mg_{1-x}M5_x)_{20-y}M6$      (VI)

wherein M5 is at least one element (excluding elements which are more electronegative than Mg) which has an atomic radius 1 to 1.5 times as high as that of Mg; M6 is at least one element selected Ni, Fe, Co, Cu, Zn, Sn and Si; x is defined as 0<x<0.5; and y is defined as 0≦y<18.

Moreover, according to the present invention, there is further provided a hydrogen-absorbing alloy which is formed of a mixture comprising:

an alloy having hydrogen-absorbing properties; and
at least one additive selected from the group consisting of
(a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in the (a); and
(c) an oxide of any of elements defined in the (a);
the mixture being mechanically treated under vacuum or in an atmosphere of an inert gas or hydrogen.

Moreover, according to the present invention, there is further provided a hydrogen-absorbing alloy, which comprises;

an alloy having hydrogen-absorbing properties; and
0.01 to 50% by volume of at least one powdered additive having 0.01 to 100 μm in average diameter, which is dispersed in the alloy and selected from the group consisting of (a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in the (a); and
(c) an oxide of any of elements defined in the (a).

According to the present invention, there is further provided an alkali secondary battery comprising a negative electrode containing a hydrogen-absorbing alloy comprising an alloy represented by the following general formula (V):

$(Mg_{1-x}M3_x)_{20-y}M4$      (V)

wherein M4 is at least one element selected Ni, Fe, Co, Cu, Zn, Sn and Si; M3 is at least one element selected (excluding the elements of M4) from the group consisting of elements which are more electronegative than Mg; x is defined as 0<x<0.5; and y is defined as 0≦y<18.

Further, according to the present invention, there is also provided an alkali secondary battery comprising a negative electrode containing a hydrogen-absorbing alloy comprising an alloy represented by the following general formula (VI):

$(Mg_{1-x}M5_x)_{20-y}M6$      (V)

wherein M5 is at least one element (excluding elements which are more electronegative than Mg) which has an atomic radius 1 to 1.5 times as high as that of Mg; M6 is at least one element selected Ni, Fe, Co, Cu, Zn, Sn and Si; x is defined as 0<x<0.5; and y is defined as 0<y<18.

Moreover, according to the present invention, there is further provided an alkali secondary battery comprising a negative electrode containing a hydrogen-absorbing alloy which is formed of a mixture comprising:

an alloy having hydrogen-absorbing properties; and
at least one additive selected from the group consisting of
(a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in the (a); and
(c) an oxide of any of elements defined in the (a);

the mixture being mechanically treated under vacuum or in an atmosphere of an inert gas or hydrogen.

Moreover, according to the present invention, there is further provided an alkali secondary battery comprising a negative electrode containing a hydrogen-absorbing alloy, the hydrogen-absorbing alloy comprising:

an alloy having hydrogen-absorbing properties; and 0.01 to 50% by volume of at least one powdered additive 0.01 to 100 µm in average diameter, which is dispersed in the alloy and selected from the group consisting of (a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in the (a); and (c) an oxide of any of elements defined in the (a).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a graph showing a phase diagram of Mg/Ni-based alloy;

FIG. 2 is a graph showing a phase diagram of La/Ni-based alloy;

FIG. 3 is a partially sectioned perspective view showing a cylindrical secondary battery according to one embodiment of the present invention;

FIG. 4 is a graph showing the relationship between the value of y in $Mg_2Ni_y$ and the amount of magnesium eluted;

FIG. 5 is a partially sectioned perspective view illustrating a method of measuring a maximum stress of a band-like piece of an alloy;

FIG. 6 is a block diagram illustrating a hydrogen-absorption and desorption performance evaluation apparatus of temperature-scanning type to be employed in the examples of this invention;

FIG. 9 is a graph illustrating the changes in pressure during hydrogen absorption at a temperature of 25° C. as obtained by using a $Mg_2Ni$ hydrogen-absorbing alloy which has not been surface-modified and another $Mg_2Ni$ hydrogen-absorbing alloy which has been surface-modified;

FIG. 10 is a graph showing the relationship between the number of cycles in a simulated cell which has been provided with either a negative electrode of Example 151 or a negative electrode of Comparative Example 20;

FIG. 11 is a graph showing the relationship between the number of cycles and the discharge capacity in a simulated cell which has been provided with either a negative electrode of Example 242 or a negative electrode of Comparative Example 20.

DETAILED DESCRIPTION OF THE INVENTION

Figure 7:
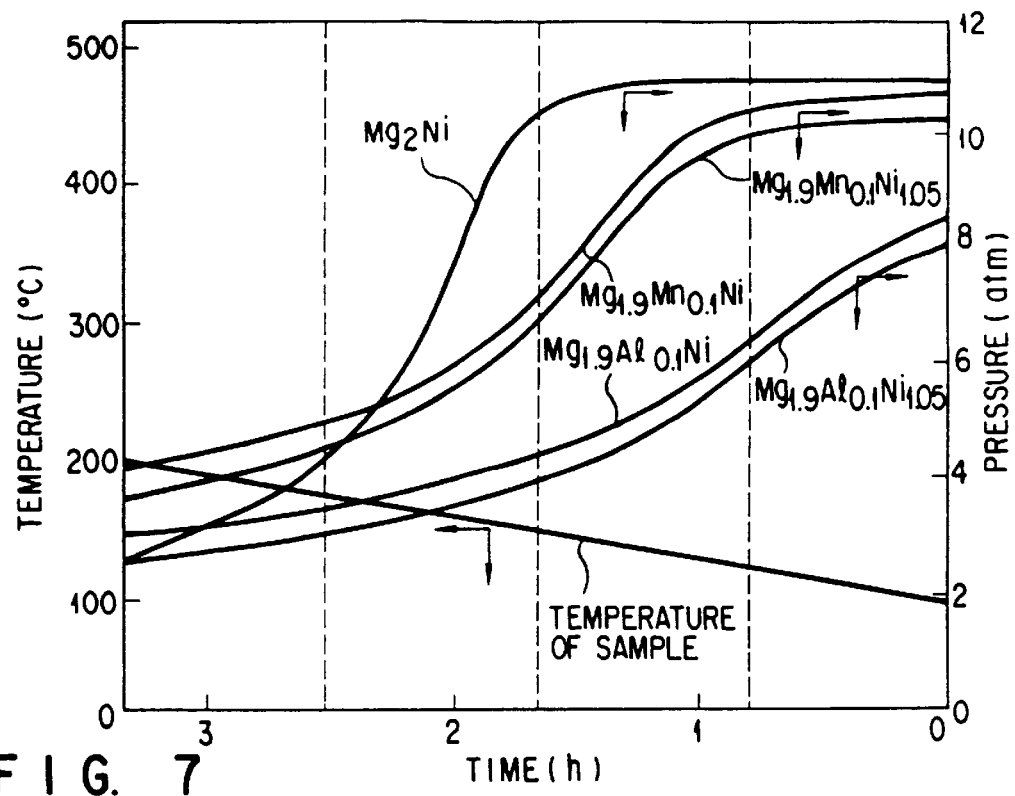
FIG. 7 is a graph showing the relationship between the rise in temperature of hydrogen-absorbing alloys of Examples 16 and 17, as well as of Comparative Examples 3 and 11 and the changes in pressure (a decrease in pressure in proportion to the hydrogen absorption by a hydrogen-absorbing alloy)

A Hydrogen-absorbing alloy according to an embodiment of this invention contains an alloy represented by the following formula (I):

$$Mg_2M1_y \qquad \text{(I)}$$

wherein M1 is at least one element selected (excluding Mg, elements which are capable of causing an exothermic reaction with hydrogen, Al and B) from elements which are incapable of causing an exothermic reaction with hydrogen; and y is defined as $1<y\leq1.5$.

Examples of elements (M1) are Fe, Ni, Co, Ag, Cd, Mn, In, Se, Sn, Ge and Pb. This M1 may be used as a single element or as a mixture comprising two or more of these elements. Preferable examples of the M1 are those having a higher electronegativity than that of Mg, i.e., Fe, Ni, Co, Ag, Cd, Mn, In, Se, Sn, Ge and Pb. In particular, a hydrogen-absorbing alloy containing iron group elements such as Fe, Ni, Co as a alloying element is preferable, since such an alloy is chemically stable and excellent in hydrogen-absorbing and desorbing performance. M1 is preferably an element which is more electronegative than Mg and which provides, if used in 10 atomic % or less based on pure magnesium, an alloy having less crystal lattice of $Mg_{1-w}M1_w$ phase ($0<w\leq0.1$), in volume, than crystal lattice of pure magnesium. Examples of this element are Mn, Ag, Cd and In.

Table 1 shows the volume of crystal lattice of each of an alloy consisting of the substituting element as mentioned above and magnesium, and pure magnesium. The values indicated in this Table 1 are calculated on the basis of the lattice constants obtained from the diffraction patterns of the alloys as measured according to the powder X-ray diffraction method, assuming that the crystal structures of these alloys are formed of the hexagonal system lime that of pure magnesium.

By the way, if the value of W in the $Mg_{1-w}M1_w$ phase exceeds over 0.1, the crystal structure of the $Mg_{1-w}M1_w$ phase may take different crystal structure from the hexagonal system so that the changes in magnesium crystal lattice volume due to the addition of the element M1 may not be accurately evaluated. Therefore, the range of W was limited to $0<w\leq0.1$. However, if it is clear that the crystal structure of the $Mg_{1-w}M1_w$ phase can be maintained in the form of hexagonal system even if the value of W exceeds over 0.1, the element M1 may be optionally selected from a range wherein W exceeds over 0.1.

TABLE 1

| Composition of alloy | crystal Lattice Volume (nm$^3$) |
| --- | --- |
| Mg (Pure Mg) | 0.0462 |
| $Mg_{0.99}Ag_{0.01}$ | 0.0459 |
| $Mg_{0.9}Cd_{0.1}$ | 0.0452 |
| $Mg_{0.95}In_{0.05}$ | 0.0460 |

The reasons for limiting the range of y of M1 in the general formula (I) to $1<y\leq1.5$ will be explained below in relative to (a) Influence to the Amount of Hydrogen Absorption; and (b) Influence to Chemical Stability and Workability such as pulverizability.

(a) Influence to the Amount of Hydrogen Absorption

If the ratio between Mg having a hydrogen-absorption capacity and M1 (which is hardly capable of forming a hydrogenated compound) is set to 2:y, the value of y should be y=1 (namely, $Mg_2M1$) in stoichiometric view point. Practically, however, if the value of y is set to 1 or less, problems may be caused with respect to the chemical stability and mechanical pulverizability of the resultant alloy, which are the subject matters this invention is intended to solve. On the contrary, if value of y is excessively large, other several problems may be raised thereby making it undesirable in practical use. For example, if value of y is more than 2, the resultant alloy is, microscopically speaking, no more formed only of $Mg_2M1$ type-based crystal, but is turned into a $MgM1_2$ type, i.e., Laves phase. This $MgM1_2$ type alloy also has a hydrogen-absorbing capacity. However, the hydrogen-absorbing capacity of $MgM1_2$ type alloy is only 40 to 70% of that of $Mg_2M1$ type alloy on the basis of weight. Therefore, an excessive value of y would be disadvantageous in terms of capacity density.

(b) Influence to Chemical Stability and Pulverizability

The $Mg_2M1$ type hydrogen-absorbing alloy is generally formed only when the condition of Mg:M1=2:1 is met. Therefore, it is almost impossible to maintain the $Mg_2M1$ type structure, if some compositional fluctuation, such as shortage or excess of Mg or M1 exists locally in the alloy. The mechanism of this will be explained with reference to a phase diagram as follows. FIG. 1 shows a phase diagram of $Mg_2Ni$ (Mg—Ni system) representing a typical example of $Mg_2$1 alloy. FIG. 2 shows a phase diagram of $LaNi_5$ (La—Ni system) of $AB_5$ type. These phase diagrams are disclosed in "Binary Alloy Phase Diagrams" ASM International (USA), 1990. As seen from these FIGS. 1 and 2, $Mg_2Ni$ is indicated by a single vertical Line in the phase diagram of Mg—Ni system, whereas $LaNi_5$ is indicated as somewhat expanded region in the phase diagram of La—Ni system. This can be attributed to the facts in the process of manufacturing an alloy that in the case of $LaNi_5$, even if the composition of melt is fluctuated more or less from the prescribed composition, an alloy which is substantially the same as $LaNi_5$ can be produced. But in the case of $Mg_2Ni$, if the composition of melt is pluctuated from the prescribed composition, it will cause the co-precipitation of $Mg_2Ni$ and an excessive component in a state of 2-phase eutectoid according to the fluctuation of the melt. Namely, in a case where y is expressed as a positive number in an equation of Mg:Ni=2:y, if Y<1, $Mg_2Ni$ and an excessive Mg will be co-precipitated as a eutectoid, whereas if Y>1, a eutectoid of $Mg_2Ni$ and $Mg_2Ni_2$ or a eutectoid of $Mg_2Ni$, $Mg_2Ni_2$ and Ni will be formed.

Mg is inferior in chemical stability such as corrosion resistance and oxidation resistance, and is higher in viscosity and malleability as compared with Ni. On the other hand, when $Mg_2Ni$ is compared with $Mg_2Ni_2$, $Mg_2Ni$ is more resistive to water and oxygen, since $Mg_2Ni$ is constructed to be higher in polarization (ionicity) in the stated of hydrogen absorption in particular. Therefore, an alloy containing y falling in a condition of y<1 is poor in chemical stability and in pulverizability though it can withstand against a mechanical stress owing to the presence in the grain boundary of highly viscous Mg. By contrast, when y>1, there is no co-precipitation of Mg, and moreover the alloy is constructed such that the surface of $Mg_2Ni$ is enclosed by $Mg_2Ni$ or Ni, whereby improving the chemical stability thereof. Moreover, when y>1, the resultant alloy is highly rigid, but susceptible to brittle fracture at the grain boundary phase containing an excessive amount of Ni of low viscosity, thereby making it possible to be easily pulverized by mechanical means.

As explained above, one of the conditions for realizing the improvement of mechanical pulverizability is y>1, when the ratio of Mg and M1 components are expressed as Mg:M1=2:y. Meanwhile, in view of maintaining a sufficient capacity of the alloy without relying on the $MgM1_2$ phase, the upper limit of y should be set to 1.5. Further, in view of chemical stability of the alloy, the range of y should be set to $1<y\leq1.5$.

When the ratio of Mg and M1 components are expressed as Mg:M1=2:y, it will be theoretically sufficient if the lower limit of y exceeds over 1. However, as a matter of fact, there are a fluctuation in composition and segregation in the alloy so that one of the conditions to obtain an alloy wherein every portions within the alloy are occupied by a composition whose value of y exceeds over 1 is dependent on the uniformity of the alloy. Specifically, (a) The value of y should preferably be 1.05 or more, if the alloy is to be manufactured by the so-called annealing method wherein a melt of component elements prepared using an induction furnace or an arc furnace in the same manner as in preparing an ordinary metal ingot is poured into the vessel such as a mold; (b) The value of y should preferably be 1.02 or more, if the alloy is to be manufactured by allowing the melt mentioned above to be contacted with a low temperature/high heat capacity material such as a rotating roll or a liquid thereby quenching the melt, or by allowing the melt mentioned above to be injected into air or liquid thereby quenching the melt; and (c) The value of y should preferably be 1.02 or more, if the alloy is to be manufactured by mixing several kinds of pure metals or alloys so as to formulate a predetermined alloy composition and then subjecting the mixture to a hot rolling, a hot press or a mechanical mixing (a mechanical alloying method) without subjecting the mixture to a melting process.

According to the method of (a), the segregation is more likely to be caused during the slow cooling step thereby making it more difficult to obtain a homogeneous alloy as compared with other methods. However, since the manufacturing process is rather simple, the method of (a) is most extensively utilized. According to the method of (c), the uniformity of alloy is more likely to be influenced by the manufacturing conditions, so that, depending on the manufacturing conditions, the lower limit of y may be required to be raised. By contrast, according to the method of (b), an alloy of comparatively homogeneous quality can be obtained. If the homogeneity of composition and texture can be enhanced by the optimization of manufacturing conditions or by a treatment such as annealing after manufacturing, it is possible to achieve the object of this invention even with a composition containing 1.01 or more of y. The judgment of the homogeneity can be performed by various surface-analyzing methods (such as EDX; energy dispersed X-ray spectrometer or EPMA; electron probe microanalyzer) using an electron microscope or by an X-ray diffraction method. For example, according to the surface-analyzing method, an alloy is determined as being homogeneous when 90% or more of a sectioned surface is made up of the same phase in the measurement of component distribution in a sectioned texture of an alloy. On the other hand, according to the X-ray diffraction method, the ratio between the magnitude of a diffraction peak belonging to a mother alloy such as Mg or M1, or single elements included in the mother alloy and the magnitude of a diffraction peak to be derived from these elements when they are existed as an individual substance is represented by a percentage, and the resultant values are totaled, thus determining the homogeneity of an alloy if the total is not more than 5%.

In view of these results, it is expected that the lower limit of y is in the range of about 1.01 to 1.10 even in an alloy to be manufactured by other manufacturing methods.

The hydrogen-absorbing alloy according to this invention may be an alloy represented by the general formula (I) containing Group VB elements or Group VIB elements up to 20 atomic %.

As explained above, the hydrogen-absorbing alloy according to this invention includes an alloy represented by the general formula (I): $Mg_2M1_y$ (wherein M1 is at least one element selected (excluding Mg, elements which are capable of causing an exothermic reaction with hydrogen, Al and B) from elements which are incapable of causing an exothermic reaction with hydrogen; and y is defined as $1<y\leq1.5$). Namely, since the hydrogen-absorbing alloy represented by the general formula (I) is featured in that y or M1 such as Ni is more than 1 and less than 1.5, it is chemically stable and excellent in mechanical pulverizability, exhibiting a high hydrogen-absorbing capacity which is inherent to the $A_2B$ type alloy such as $Mg_2Ni$.

Therefore, the hydrogen-absorbing alloy according to this invention is capable of maintaining its excellent hydrogen-absorbing capacity even if it is allowed to react with a hydrogen gas containing a small amount of an oxidizing gas such as oxygen or water vapor. Still more, even if the hydrogen-absorbing alloy according to this invention is caused to contact with an aqueous solution, the hydrogen-absorbing capacity thereof would hardly be deteriorated, thus extending the utility of the alloy.

Further, a hydrogen-absorbing alloy in general is gradually refined as a result of the expansion and contraction of crystal lattice due to the absorption and desorption of hydrogen, thereby causing change in physical properties (such as bulk density, contact resistance and conductivity). If this change in physical properties causes a trouble, it can be avoided by adopting a method of using an alloy powder which has been pulverized in advance. Since the hydrogen-absorbing alloy proposed by this invention can be more easily pulverized as compared with the conventional $A_2B$ type alloy such as $Mg_2Ni$, the problem mentioned above can be easily dealt with.

As explained above, the hydrogen-absorbing alloy represented by the general formula (I) according to this invention can be easily and reliably treated in a preliminary working before use, and the control thereof during use can be easily and reliably performed. Therefore, the hydrogen-absorbing alloy represented by the general formula (I) is quite useful as an electrode material of a secondary battery.

A hydrogen-absorbing alloy according to another embodiment of this invention contains an alloy represented by the following formula (II):

$$Mg_{2-x}M2_xM1_y \quad \text{(II)}$$

wherein M2 is at least one element selected (excluding Mg) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0<x\leq1.0$; and y is defined as $1<y\leq2.5$.

As examples of M1, the same elements as explained with reference to the general formula (I) may be employed.

Examples of the elements (excluding Mg) which are capable of causing an exothermic reaction with hydrogen, or capable of spontaneously forming a hydrogenated compound are alkaline earth elements such as Be, Ca and Ba; rare earth elements such as Y, Ra, La, Ce, Pr, Pm, Sm, Eu, Gd, Tb, Dy, Ho, Er, Tm and Lu; Group IVa elements such as Ti, Zr and Hf; and Group VIIIa elements such as Pd and Pt. This M2 may be used as a single element or as a mixture comprising two or more of these elements.

M2 should preferably be selected (excluding Mg) from Al, B and the elements which are capable of causing an exothermic reaction with hydrogen and have a higher electronegativity than that of Mg. Namely, M2 should preferably be at least one element selected from B, Be, Y, Pd, Ti, Zr, Hf, Th, V, Nb, Ta, Pa and Al. When an element having a higher electronegativity than that of Mg is selected as M2, it is possible to minimize that difference in electronegativity between the alloy and hydrogen and to instabilize hydrogen within the lattice thereby to improve the hydrogen-absorbing property of the alloy. In particular, Be which is an alkaline earth metal is capable of forming a chemically stable alloy when it is alloyed with Mg. On the other hand, Ti, Zr and Hf belonging to Group IVa elements are highly reactive to hydrogen thereby forming a hydrogenated compound.

Additionally, M2 should preferably be selected (excluding Mg) from Al, B and the elements which are capable of causing an exothermic reaction with hydrogen, which provides, if used in 10 atomic % or less based on pure magnesium, an alloy having less crystal lattice of $Mg_{1-w}M1_w$ phase ($0<w\leq0.1$), in volume, than crystal lattice of pure magnesium. Namely, M2 should preferably be at least one element selected from Li and Al.

The reason for limiting the range of x in the general formula (II) is based on the following facts. Namely, when the value of x exceeds over 1.0, the hydrogen-absorbing properties of $Mg_2M1_y$ (hydrogen-absorbing capacity, flatness of plateau region and reversibility) are badly affected, and, in some cases, the crystal structure per se can not be maintained. Therefore, the range of x should preferably be $0.05\leq x\leq0.5$.

The reason for limiting the range of y in the general formula (II) is based on the following facts. Namely, the advantages that can be obtained by setting the value of y to more than 1 are the same as already explained above in reference to the alloy of the general formula (I). On the other hand, when the value of y exceeds over 2.5, not only the hydrogen-absorbing capacity of the alloy is reduced, but also the crystal structure inherent to the alloy may not be maintained. Therefore, the range of y should preferably be $1.01\leq y\leq1.5$, more preferably $1.02\leq y\leq1.5$, and more preferably $1.05\leq y\leq1.5$.

This hydrogen-absorbing alloy according to this invention may be an alloy represented by the general formula (II) containing Group VB elements or Group VIB elements up to 20 atomic %.

As explained above, the hydrogen-absorbing alloy according to this invention includes an alloy represented by the general formula (II): $Mg_{2-x}M2_xM1_y$ (wherein M2 is at least one element selected (excluding Mg) form the group consisting of elements which are capable of causing an exothermic reaction with hydrogen, Al and B; M2 is at least one element selected (excluding Mg and M2) from elements which are incapable of causing an exothermic reaction with hydrogen; x is defined as $0<x\leq1.0$; and y is defined as $1<y\leq2.5$). Namely, since the hydrogen-absorbing alloy represented by the general formula (II) is characterized in that part of Mg is substituted with an element represented by M2 such as Al, the hydrogen-absorbing property, in particular the lowering of hydrogen-absorbing temperature can be improved as compared with the conventional $A_2B$ type hydrogen-absorbing alloy, and at the same time a high hydrogen-absorbing capacity inherent to the $A_2B$ type Hydrogen-absorbing alloy can be maintained. Further, this hydrogen-absorbing alloy represented by the general formula (II) is larger in hydrogen-absorbing capacity (based on weight), lower in manufacturing cost and lighter in weight as compared with the conventional rare earth-based hydrogen-absorbing alloy. Moreover, since the hydrogen-absorbing alloy represented by the general formula (II) is characterized in that y of M1 such as Ni is more than 1 and less than 2.5, it is chemically stable and excellent in mechanical pulverizability.

Therefore, the hydrogen-absorbing alloy according to this invention is capable of maintaining its excellent hydrogen-absorbing capacity even if it is allowed to react with a hydrogen gas containing a small amount of an oxidizing gas such as oxygen or water vapor. Still more, even if the hydrogen-absorbing alloy according to this invention is caused to contact with an aqueous solution, the hydrogen-absorbing capacity thereof would hardly be deteriorated, thus extending the utility of the alloy.

As explained above, the hydrogen-absorbing alloy represented by the general formula (II) according to this invention is capable of lowering hydrogen-absorbing temperature and at the same time capable of sustaining a high hydrogen-absorbing capacity inherent to the $A_2B$ type hydrogen-absorbing alloy. Moreover, this alloy represented by general formula (II) can be easily and reliably treated in a preliminary working before use or in the control of conditioning during use thereof. Therefore, the hydrogen-absorbing alloy represented by the general formula (II) is quite useful as an electrode material of a secondary battery.

A hydrogen-absorbing alloy according to another embodiment of this invention contains an alloy represented by the following formula (III):

$$M_{2-x}M2_xM1_y \quad (III)$$

wherein M is at least one element selected Be, Ca, Sr, Ba, Y, Ra, La, Ce, Pr, Pm, Sm, Eu, Gd, Tb, Dy, Ho, Er, Tm, Lu, Ti, Zr, Hf, Pd and Pt; M2 is at least one element selected (excluding M) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0.01<x\leq1.0$; and y is defined as $0.5<y\leq1.5$.

As examples of M1, the same elements as explained with reference to the hydrogen-absorbing alloy containing an alloy represented by the general formula (I) may be employed.

As examples of M2, the same elements as explained with reference to the hydrogen-absorbing alloy containing an alloy represented by the general formula (II) may be employed.

Preferable examples of the combination of M, M2 and M3 are a ternary alloy comprising Zr as M, Fe as M1 and Cr as M2; and a quarternary alloy comprising Zr as M, Ni and Co as M1 and V as M2.

The reason for limiting the ranges of y and x in the general formula (III) is based on the following facts. Namely, if the value of y is less than 0.5, the individual phases of M, M1 and M2 will be precipitated so that the features inherent to the hydrogen-absorbing alloy would be lost, and at the same time the hydrogen-absorbing alloy would become chemically unstable. Therefore, it is preferable to set the lower limit of y to over 1.0 (for example, 1.01). On the other hand, when the value of y exceeds over 2.0, not only the hydrogen-absorbing capacity of the alloy is reduced, but also the crystal structure inherent to the alloy may not be retained. Therefore, the upper limit of y should preferably be set to 1.5.

If the value of x is less than 0.01, a hydrogen-absorbing alloy having an excellent hydrogen-absorbing property at a low temperature would no more be obtainable. On the other hand, when the value of x exceeds over 1.0, not only the crystal structure of the hydrogen-absorbing alloy is altered, but also the properties inherent to the $A_2B$ type alloy may be lost. Therefore, a preferable range of x is 0.05 to 0.5.

As explained above, the hydrogen-absorbing alloy according to this invention includes an alloy represented by the general formula (III):$M_{2-x}M2_xM1_y$ wherein M is at least one element selected Be, Ca, Sr, Ba, Y, Ra, La, Ce, Pr, Pm, Sm, Eu, Gd, Tb, Dy, Ho, Er, Tm, Lu, Ti, Zr, Hf, Pd and Pt; M2 is at least one element selected (excluding M) from the group consisting of elements which are capable of causing an exothermic reaction with hydrogen, Al and B; M2 is at least one element selected (excluding Mg and M2) from elements which are incapable of causing an exothermic reaction with hydrogen; x is defined as $0.01<x\leq1.0$; and y is defined as $0.5<y\leq1.5$. Namely, since the hydrogen-absorbing alloy represented by the general formula (III) is characterized in that part of M such as Zr is substituted with an element represented by M2 such as Al, the hydrogen-absorbing property, in particular the lowering of hydrogen-absorbing temperature can be improved as compared with the conventional $A_2B$ type hydrogen-absorbing alloy, and at the same time a high hydrogen-absorbing capacity inherent to the $A_2B$ type hydrogen-absorbing alloy can be maintained. Further, this hydrogen-absorbing alloy represented by the general formula (III) is larger in hydrogen-absorbing capacity (based on weight), lower in manufacturing cost and lighter in weight as compared with the conventional rare earth-based hydrogen-absorbing alloy.

Therefore, the hydrogen-absorbing alloy represented by the general formula (III) according to this invention is capable of lowering hydrogen-absorbing temperature and at the same time capable of sustaining a high hydrogen-absorbing capacity inherent to the $A_2B$ type hydrogen-absorbing alloy. Moreover, since the hydrogen-absorbing alloy represented by the general formula (III) is capable of sustaining a high hydrogen-absorbing capacity inherent to the $A_2B$ type hydrogen-absorbing alloy, the alloy would be quite useful as an electrode material of a secondary battery.

Another example of the hydrogen-absorbing alloy according to the present invention contains an alloy represented by the following general formula (V):

$$(Mg_{1-x}M3_x)_{20-y}M4 \quad (V)$$

wherein M4 is at least one element selected Ni, Fe, Co, Cu, Zn, Sn and Si; M3 is at least one element selected (excluding the elements of M4) from the group consisting of elements which are more electronegative than Mg; x is defined as $0<x<0.5$; and y is defined as $0\leq y<18$.

Preferable examples of M3, i.e. elements (excluding the elements of M4) which are more electronegative than Mg are Al (1.5), Mn (1.5), Ta (1.5), V (1.6), Cr (1.6), Nb (1.6), Ga (1.6), In (1.7), Ge (1.8), Pb (1.8), Mo (1.8), Re (1.9), Ag (1.9), B (2.0), C (2.5), P (2.1), Ir (2.2), Rh (2.2), Ru (2.2), Os (2.2), Pt (2.2), Au (2.4), Se (2.4), S (2.5), Sc (1.3), Zr (1.4), Hf (1.3), Pd (1.8) and Tl (1.8). The number in the parenthesis indicates an electro-negativity of a metal which is obtained from a value of poling of each metal element. These elements may be employed singly or in combination thereof.

The reasons for limiting the ranges of x and y in the general formula (V) are as follows. Namely, when the value of x exceeds 0.5, the crystal structure of alloy would be extremely altered and at the same time the inherent properties of the Mg-based alloy would be deteriorated. Preferable range of x is $0.01\leq x\leq 0.4$. The alloy having the value x confined in this preferable range would exhibit an increased amount of hydrogen-absorption. On the other hand, when the value of y exceeds 18, the site for hydrogen absorption in the alloy would be decreased so that the amount of hydrogen-absorption would be decreased. Preferable range of y is $1\leq y\leq 17.5$.

This hydrogen-absorbing alloy comprising an alloy represented by the general formula (V) and explained above exhibits excellent hydrogen-absorbing and hydrogen-releasing properties.

Followings are observations made from the viewpoint of electronegativity on any change in bonding strength between an alloy and hydrogen, i.e. any change in stability of hydrogen in the alloy when the Mg component in the aforementioned general formula (V) is substituted by the M3 element such as Pt and Zr.

Generally, there is a relationship in most of the hydride of elemental metal that as the difference in electronegativity between an alloy and hydrogen becomes larger, the bonding strength of the metal-hydrogen bond becomes higher. It is also considered that as the difference in electronegativity between an alloy and hydrogen becomes larger, the ionic bonding property of the metal-hydrogen bond is increasingly enhanced, thereby strengthening the metal-hydrogen bond and resulting in an increased stability of the absorbed hydrogen. In other words, when Mg is substituted by the M3 element such as Al and Ag, i.e. by a metal having a larger electronegativity than Mg, the difference in electronegativity between such a metal and hydrogen becomes smaller, so that hydrogen within the crystal lattice is assumed to be instabilized.

Therefore, it is possible, when the site of Mg is substituted by the M3 element which is more electronegative than Mg, such as Al and Ag to instabilize hydrogen atoms in the crystal lattice, thereby to improve the hydrogen absorption properties of the alloy and to facilitate the manufacture of the alloy.

On the other hand, M4 in the aforementioned general formula (V) such as Ni is effective in improving the hydrogen absorption properties as well as in enhancing the release of hydrogen which has been absorbed in the alloy, since M4 is more electronegative than Mg and inherently incapable of exothermally reacting with hydrogen, i.e. inherently incapable of spontaneously forming a hydride.

As explained above, the hydrogen-absorbing alloy according to this invention which comprises an alloy represented by the general formula (V) is featured in bringing about a prominent improvement on the hydrogen absorption properties, in particular the amount of hydrogen absorption as compared with the conventional $Mg_2Ni$-type alloy. The hydrogen-absorbing alloy according to this invention is also featured in having practical advantages that, as compared with the conventional rare earth element type hydrogen-absorbing alloy, the hydrogen-absorbing alloy of this invention is larger in amount of hydrogen absorption per weight, cheaper in manufacturing cost and lighter in weight.

Another example of the hydrogen-absorbing alloy according to the present invention contains an alloy represented by the following general formula (VI):

$$(Mg_{1-x}M5_x)_{20-y}M6 \qquad (VI)$$

wherein M5 is at least one element (excluding elements which are more electronegative than Mg) which has an atomic radius 1 to 1.5 times as high as that of Mg; M6 is at least one element selected Ni, Fe, Co, Cu, Zn, Sn and Si; x is defined as $0<x<0.5$; and y is defined as $0\leq y<18$.

If the atomic radius of M5 element is larger than Mg by more than 1.5 times, it may become difficult to form a single alloy phase, resulting in a deterioration of hydrogen absorption properties of the alloy. As for the elements representing the aforementioned M5, Ca, Sr, K and Na may be employed. Among these M5 elements, more preferable examples thereof are Ca and Sr.

The reasons for limiting the ranges of x and y in the general formula (VI) are as follows. Namely, when the value of x exceeds 0.5, the crystal structure of alloy would be extremely altered and at the same time the inherent properties of the Mg-based alloy would be deteriorated. Preferable range of x is $0.01\leq x\leq 0.4$. The alloy having the value x confined in this preferable range would exhibit an increased amount of hydrogen-absorption. On the other hand, when the value of y exceeds 18, the site for hydrogen absorption in the alloy would be decreased so that the amount of hydrogen-absorption would be decreased. Preferable range of y is $1\leq y\leq 17.5$.

This hydrogen-absorbing alloy comprising an alloy represented by the general formula (VI) and explained above exhibits excellent hydrogen-absorbing and hydrogen-releasing properties.

Namely, when the Mg site in the alloy is substituted by the M5 elements having 1 to 1.5 times as high atomic radius as that of Mg, such as Sr, the catalytic activity to hydrogen of the alloy can be increased, thereby improving the hydrogen absorption properties.

On the other hand, M6 in the aforementioned general formula (VI) such as Ni is effective in improving the hydrogen absorption properties as well as in enhancing the release of hydrogen which has been absorbed in the alloy, since M6 is more electronegative than Mg and inherently incapable of exothermally reacting with hydrogen, i.e. inherently incapable of spontaneously forming a hydride.

As explained above, the hydrogen-absorbing alloy according to this invention which comprises an alloy represented by the general formula (VI) is featured in bringing about a prominent improvement on the hydrogen absorption properties, in particular the amount of hydrogen absorption as compared with the conventional $Mg_2Ni$-type alloy. The hydrogen-absorbing alloy according to this invention is also featured in having practical advantages that, as compared with the conventional rare earth element type hydrogen-absorbing alloy, the hydrogen-absorbing alloy of this invention is larger in amount of hydrogen absorption per weight, cheaper in manufacturing cost and lighter in weight.

The method of modifying the surface of a hydrogen-absorbing alloy according to the present invention comprises a step of treating the hydrogen-absorbing alloy with an R—X compound, wherein R represents alkyl, alkenyl, alkynyl, aryl or a substituted group thereof; X is a halogen element.

Examples of the hydrogen-absorbing alloy are (1) an $AB_5$ type (for example, $LaNi_5$, $CaNi_5$); (2) an $AB_2$ type (for example, $MgZn_2$, $ZrNi_2$); (3) an AB type (for example, TiNi, TiFe); and (4) an $A_2B$ type (for example, $Mg_2Ni$, $Ca_2Fe$).

The method according to this invention is used another hydrogen-absorbing alloy containing an alloy represented by the following formula (IV):

$$Ng_{2-x}M2_xM1_y \qquad (IV)$$

wherein M2 is at least one element selected (excluding M) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0 \leq x \leq 1.0$; and y is defined as $0.5 < y \leq 2.5$.

As examples of M1 in the formula (IV), the same elements as explained with reference to the alloy represented by the general formula (I) may be employed.

As examples of M2 in the formula (IV), the same elements as explained with reference to the alloy represented by the general formula (II) may be employed.

In the method according to this invention, a hydrogen-absorbing alloy of the $AB_5$ type or the $A_2B$ type as mentioned above, or a hydrogen-absorbing alloy containing an alloy represented by the general formula (IV) is preferably used.

In the above mentioned R—X compound, R represents alkyl, alkenyl, alkynyl, aryl or a substituted group thereof, and X is a halogen element, the reactivity of which being in the order of an iodide>bromide>chloride. Examples of such an R—X compound are methyl iodide, ethyl bromide, 1,2-dibromoethane and 1,2-diiodoethane.

This R—X compound (a halide) is preferably employed to react with a hydrogen-absorbing alloy under the presence of a solvent thereby modifying the surface of the hydrogen-absorbing alloy.

Examples of this solvent are diethyl ether, tetrahydrofuran (THF), di-n-propyl ether, di-n-butyl ether, di-n-isopropyl ether, diethylglycoldiethyl ether (diglyme), dioxane and dimethoxyethane (DME). These solvents may be employed singly or in combination. Preferable solvents among them are diethyl ether and THF. In the case where the R—X compound is alkyl halide, alkenyl halide or aryl halide, an ether type solvent may be preferably employed as a solvent. On the other hand, the R—X compound selected is an alkenyl compound or an aryl compound, THF which has higher coordinating strength can be preferably employed. When the reaction is to be performed in an ether, bromides and iodides among these R—X compounds can be more easily put into the reaction. Chlorides or substituted bromides, which are relatively low in reactivity among these R—X compounds can be put into the reaction using THF.

The concentration of a solution dissolving the above mentioned R—X compound with the above mentioned solvent should be suitable determined taking the following points into consideration.

(1) Reactivity of a halide (when a halide of low reactivity is used, the halide should be incorporated in a higher concentration).

(2) Possibility of causing a side reaction (when aryl chloride or benzyl chloride is use, a coupling reaction may possibly be caused, so that these halides should be incorporated in a lower concentration).

(3) Solubility and stability of products (when the solubility of a halide is low, the halide should be incorporated in a lower concentration. Namely, when the solution has a saturated concentration or more, a solid substance may be precipitated upon cooling thereby giving rise to heterogeneity).

In order to facilitate the reaction, a catalyst may preferably added to the solution having the R—X compound dissolved therein. Examples of such a catalyst are condensated polycyclic hydrocarbons such as pentalene, indene, naphthalene, azulene, heptalene, biphenylene, indacene, acenaphthylene, fluorene, phenalene, phenanthrene, anthracene, fluoranthene, acephenanthrylene, anthrylene, triphenylene, pyrene, chrysene, naphthacene, pleiadene, picene, perylene, pentaphene, tentacene, tetraphenylene, hexaphene, hexacene, rubicene, coronene, trinaphthylene, pentaphene, heptacene, pinanthrene and ovalene. Among these compounds, anthracene is most preferred. When a hydrogen-absorbing alloy comprising Mg is treated with a THF solution of R—X compound with anthracene added therein, a mixture of anthracene and magnesium acts to form an equilibrium between magnesium-anthracene. Therefore, a mere addition of anthracene as a catalyst into the reaction system represented by a reaction formula (3) described hereinafter would promote a reaction of the rightward direction thereby making it possible to perform an excellent surface modification of the alloy.

It would be advantageous in the industrial application of the method of surface-modification according to this invention to add R—MS (M: a component in a hydrogen-absorbing alloy) prepared in advance to the reaction system in the initial stage and to perform a dehydration and activation of the reaction system.

According to the method of surface-modification of hydrogen-absorbing alloy as proposed by this invention, it is possible to improve the hydrogen-absorbing property and activity in particular of a hydrogen-absorbing alloy as compared with those which are not surface-modified.

Therefore, one of the methods of improving the hydrogen-absorbing property of a hydrogen-absorbing alloy is to modify the surface of the hydrogen-absorbing alloy. Namely, the activity of a hydrogen-absorbing alloy in a process of hydrogen absorption is occurred by a mechanism of surface segregation, so that this activity is considered to be related to the easiness of forming a catalytic layer on the surface of the alloy and the performance of catalyst. When a hydrogen-absorbing alloy is treated with an R—X compound, M constituting part of component elements of the hydrogen-absorbing alloy undergoes the following reactions.

$$M + R—X \rightarrow R—MX \qquad (1)$$

or $$M + \alpha R\text{-}x \rightarrow \alpha R—MX_\alpha \qquad (2)$$

When the surface treatment is performed through these reactions, a gentle segregation is caused to occur on or near the surface of the hydrogen-absorbing alloy thereby producing an active site acting as a catalyst thereon.

For instance, when a $Mg_2Ni$ type hydrogen-absorbing alloy is treated with ethyl bromide, magnesium in the hydrogen-absorbing alloy undergoes the following reaction.

$$Mg + C_2H_5Br \rightarrow C_2H_5-MgBr \qquad (3)$$

With this reaction (surface modification), the oxide film covering the surface of $Mg_2Ni$ is removed thereby exposing nickel to be functioned as a hydrogen-dissociating catalyst at the time of hydrogen-absorption thus improving the hydrogen-absorbing property of the alloy.

Examples of the element (other than magnesium) which is capable of reacting with the R—X compound are rare earth elements Ln (Ln: lanthanum, cerium, praseodymium, neodymium, promethium, samarium, europium, gadolinium, terbium, dysprosium, holmium, erbium, thulium, ytterbium and ruthenium). When these Ln elements are allowed to react with 1,2-diiodoethane in THF in an atmosphere of argon or nitrogen gas at room temperature, $LnI_2$ is produced according to the following reaction formula.

$$Ln+ICH_2CH_2I \rightarrow LnI_2+CH_2=CH_2 \quad (4)$$

La, Nd, Sm and Lu in particular among these rare earth elements are more reactive to 1,2-diiodoethane, the reactivity thereof being in the order of La>Nd>Sm>Lu.

For instance, when a $LaNi_5$ type hydrogen-absorbing alloy is treated with 1,2-diiodoethane, lanthanum in the hydrogen-absorbing alloy undergoes the following reaction.

$$La+ICH_2CH_2I \rightarrow LaI_2+CH_2=CH_2 \quad (5)$$

With this reaction (surface modification), the oxide film covering the surface of $LaNi_5$ is removed thereby exposing nickel to be functioned as a hydrogen-dissociating catalyst at the time of hydrogen-absorption thus improving the hydrogen-absorbing property of the alloy.

The amount of halogen left remained on the surface of hydrogen-absorbing alloy after the treatment with a solution of the R—X compound is only a little (for example, not more than 1%), so that the property inherent to the hydrogen-absorbing alloy would not be substantially diminished.

A hydrogen-absorbing alloy according to the another present invention is characterized in that a half-width $\Delta(2\theta)$ of at least one peak out of peaks of three strongest lines to be obtained by an X-ray diffraction using Cu$K\alpha$-ray as a radiation source lies in the range of $0.2° \leq \Delta(2\theta) \leq 50°$. The term of three strongest lines used herein is intended to mean three largest peak as counted from the largest peak in an X-ray diffraction pattern.

Examples of the hydrogen-absorbing alloy composition are (1) an $AB_5$ type (for example, $LaNi_5$, $CaNi_5$); (2) an $AB_2$ type (for example, $MgZn_2$, $ZrNi_2$); (3) an AB type (for example, TiNi, TiFe); and (4) an $A_2B$ type (for example, $Mg_2Ni$, $Ca_2Fe$).

The hydrogen-absorbing alloy is preferably a composition containing an alloy represented by the following formula (IV):

$$Mg_{2-x}M2_xM1_y \quad (IV)$$

wherein M2 is at least one element selected (excluding M) from the group consisting of elements which are capable of causing an exothermic reaction with hydrogen, Al and B; M1 is at least one element selected (excluding Mg and M2) from elements which are incapable of causing an exothermic reaction with hydrogen; x is defined as $0 \leq x \leq 1.0$; and y is defined as $0.5 < y \leq 2.5$.

As examples of M1 in the formula (IV), the same elements as explained with reference to the alloy represented by the general formula (I) may be employed.

As examples of M2 in the formula (IV), the same elements as explained with reference to the alloy represented by the general formula (II) may be employed.

In particular, in the case of a hydrogen-absorbing alloy containing 10% or more of magnesium such as a $Mg_2Ni$ type hydrogen-absorbing alloy or a hydrogen-absorbing alloy containing an alloy represented by the general formula (IV), the alloy should preferably be characterized in that an apparent half-width $\Delta(2\theta_1)$ of a peak in the vicinity of 20° lies in the range of $0.3° \leq \Delta(2\theta_1) \leq 10°$, or an apparent half-width $\Delta(2\theta_2)$ of a peak in the vicinity of 40° lies in the range of $0.3° \leq \Delta(2\theta_2) \leq 10°$ in an X-ray diffraction using Cu$K\alpha$-ray as a radiation source.

The reasons for limiting the range of $\Delta(2\theta)$ are as follows. Namely, if this $\Delta(2\theta)$ is less than 0.2°, the rate of absorbing hydrogen would become too slow. On the other hand, if this $\Delta(2\theta)$ exceeds over 50°, the hydrogen-absorbing capacity of the alloy would be reduced. More preferable half-width $\Delta(2\theta)$ is in the range of $0.3° \leq \Delta(2\theta) \leq 10°$.

When the size of crystal grain of the hydrogen-absorbing alloy is represented by D, it is preferable to confine the range of D to $0.8 \text{ nm} \leq D \leq 50$ nm. When the hydrogen-absorbing alloy having D confined in this range is used, the path of hydrogen diffusion may be enlarged and the distance of path may be minimized so that the hydrogen-absorbing and desorbing property of the alloy can be improved. The reasons for limiting the range of crystal grain are as follows. Namely, if this D is less than 0.8 nm, the hydrogen-absorbing capacity of the alloy may be lowered. On the other hand, if this D is larger than 50 nm, the path of hydrogen diffusion would be inhibited.

A method of modifying the surface of a hydrogen-absorbing alloy according to another embodiment of this invention comprises a step of mechanically treating a hydrogen-absorbing alloy under vacuum or in an atmosphere of an inert gas or hydrogen.

Regarding the mechanical treatment to be adopted in the surface modification mentioned above, the following method may be taken. Namely, at first, a hydrogen-absorbing alloy is introduced into a vessel having balls disposed therein such as an epicyclic ball mill, screw ball mill, rotational ball mill, or attriter, and then a mechanical impact is given to the hydrogen-absorbing alloy through collisions between the inner wall of the vessel and the balls, or between balls.

When this mechanical treatment is to be carried out with the vessel being sealed, the treatment may be performed in an apparatus such as a dry box filled therein with an argon or inert gas atmosphere, or in a vessel provided with a discharge valve for exhausting the interior of the vessel. It is also possible in some case to carry out the treatment with the vessel filled with hydrogen gas. When this sealed vessel is employed, since the impact is effected throughout the interior of the vessel, the sealed portion thereof is also subjected to the impact thereby causing a loosening the sealed portion. Therefore, it may be advisable, in order to secure the hermetic condition of the vessel, to make the cover of the vessel into a double cover, or to dispose the vessel in an inert atmosphere or in a vacuum chamber. It is also preferable to control the purity of the inert gas in the preparation of an inert gas atmosphere. For example, it is desirable to control the inert gas atmosphere to contain not more than 100 ppm of oxygen and not more than 50 ppm of water vapor. The hydrogen-absorbing alloy particles as well as metal particles should be treated in an inert gas atmosphere so as to avoid the oxidization thereof.

The mechanical treatment using an epicyclic ball mill and the like should be carried out for 1 to 1,000 hours. If the treating time is less than one hour, it may be difficult to obtain a desired hydrogen-absorbing property of hydrogen-absorbing alloy. On the other hand, if the treating time exceeds over 1,000 hours, a gradual oxidation would proceed and the manufacturing cost would be raised.

The particle size of the hydrogen-absorbing alloy modified by this mechanical treatment should desirably be in the range of 0.1 to 50 μm. If necessary, a heat treatment may also be performed on this modified hydrogen-absorbing alloy. The heat treatment temperature is determined a composition of a hydrogen-absorbing alloy. This temperature in this case should preferably be in the range of about 100 to 500° C. There is a possibility in some case that the element components incorporated in the mixture may be coagulated with the alloy as a result of the mechanical treatment. This agglomeration may be effective for improving the hydrogen-absorbing property of the alloy. In this case, a desirable ratio of this agglomeration is 10% by weight or more.

According to the method of modifying the surface of a hydrogen-absorbing alloy of this invention, it is possible to remarkably improve the initial activity and hydrogen-absorbing property of a hydrogen-absorbing alloy. This method comprises a step of mechanically treating a hydrogen-absorbing alloy under vacuum or in an atmosphere of an inert gas or hydrogen.

The improvement of the hydrogen-absorbing property of a hydrogen-absorbing alloy may be effected by any of following methods: (1) a modification through coating; (2) a modification through topochemical method; (3) a modification through mechanochemical method; (4) a modification through an encapsulation; and (5) co-use of radiation exposure. According to the surface modification of this invention, the third method, i.e., (3) modification through mechanochemical method, is selected out of these various methods, thereby succeeding to remarkably improve the initial activation and hydrogen-absorbing property of a hydrogen-absorbing alloy.

According to this mechanical modification method of this invention, it is possible not only to alter the fundamental structure of alloy particles, but also to alter the physical property of alloy particles through the change in surface structure. In other words, it is possible to alter the internal energy of hydrogen-absorbing alloy. Moreover, it is possible to increase the surface energy through the generation of fresh surface resulting from the generation of fine grains.

According to this mechanical modification method of this invention, the surface and structure of a hydrogen-absorbing alloy are altered thereby generating a stress and thus causing a structural destruction, a displacement of atom or molecule, and a deterioration of crystal regularity, resulting in an increases of potential energy. By making the most of these various effects, it is possible to improve a catalytic activity and a selectivity in the catalytic reaction.

The lattice defect within a hydrogen-absorbing alloy may be pointed out as one of phenomena resulting from the modification. In this case, the lattice defect may include, in addition to a lattice defect which is thermodynamically allowable in an ideal crystal, a plastic deformation formed in a crystal grain by a mechanical energy generated in the surface modification process, a difference in temperature in the crystal grain or phase transition due to a local generation of heat, and a residual stress resulted from a generation of phase transition. It is also possible to improve the hydrogen-absorbing property of a hydrogen-absorbing alloy by making the most of the effects obtainable from these phenomena.

An expansion of the profile of peaks has been confirmed through the measurement of peaks in X-ray diffraction pattern of a sample (hydrogen-absorbing alloy) using Cuk$\alpha$ as a radiation source after a mechanical modification has been effected to the samples. Generally, the expansion of the profile of peaks can be ascribed to (a) a change in size of crystal grain; and (b) a heterogeneous stain.

Regarding (a), the size D of crystal grain can be represented by the Scherrer's equation as follows.

$$D=(0.9\lambda)/(\Delta(2\theta) \cos \theta) \quad (6)$$

D: Size of crystal grain;
$\Delta(2\theta)$: Apparent half-width;
$\lambda$: Wavelength of X-ray employed;
$\theta$: Bragg angle of diffraction line;

In the same manner, the size $\epsilon$ of crystal grain can be represented by the Stokes and Wilson's equation as follows.

$$\epsilon=\lambda/(\beta i \cos \theta) \quad (7)$$

$\epsilon$: Size of crystal grain;
$\beta_i$: Integrated width;
$\lambda$: Wavelength of X-ray employed;
$\theta$: Bragg angle of diffraction line;

When a hydrogen-absorbing alloy is mechanically treated as explained above, the peaks in X-ray diffraction pattern are caused to become broader. This can be attributed, in view of these two equations mentioned above, to the fact that the size of crystal grain becomes smaller as a result of the mechanical treatment.

The influence by (b) the stain of crystal grains should also be taken into consideration as one of the reasons of causing the broadening of X-ray diffraction peaks. This stain of crystal grain may be ascribed to a change or fluctuation of an interval between crystal planes. From the Stokes and Wilson's equation, the relationship between the heterogeneous stain $\eta$ of crystal grain and the integrated width $\beta'_i$ of diffraction line based on the heterogeneous stain $\eta$ can be expressed as follows.

$$\beta'_i=2\eta \tan \theta \quad (8)$$

Further, the expansion of the profile due to both of the size of crystal grain and the heterogeous stain can be represented according to Hall's equation by the following equation.

$$\beta=\beta_i+\beta'_i \quad (9)$$

Therefore, the expansion of profile in the hydrogen-absorbing alloy after the mechanical treatment thereof can be ascribed to both of the change in crystal grain size and the generation of the heterogeneous stain. Accordingly, the hydrogen-absorbing property of the alloy can be improved by controlling these two factors. Namely, when the crystal grain of a hydrogen-absorbing alloy is made smaller in size through the mechanical treatment, the diffusion path of hydrogen can be enlarged, with its distance being made shortened. As a result, the hydrogen-absorbing and desorbing property of a hydrogen-absorbing alloy can be improved. The preferable size D of such a crystal grain is in the range of 0.8 nm$\leq$D$\leq$50 nm. Further, the impact energy resulting from the mechanical treatment is great enough to alter the interval between the planes of hydrogen-absorbing alloy particles thereby causing a lattice asymmetry in the hydrogen-absorbing alloy. In other words, since it is possible to generate a crystal stain in the hydrogen-absorbing alloy, the hydrogen-absorption and desorption can be easily effected by changing the energy within the crystal lattice.

In a hydrogen-absorbing alloy undergone through the mechanical treatment, the profile expansion represented by the apparent half-width $\Delta(2\theta)$ as shown in the equation (6) would become in the range of $0.2°\leq\Delta(2\theta)\leq50°$, more preferably $0.3°\leq\Delta(2\theta)\leq10°$.

Another example of the hydrogen-absorbing alloy according to the present invention is formed of a mixture comprising:

an alloy having hydrogen-absorbing properties; and at least one additive selected from the group consisting of (a) at least one element selected from Group IA elements (such as Li, Na, Rb, Ca, Sr, Ba, etc.), Group IIA elements (such as Be, Mg, Rb, Cs, etc.), Group IIIA elements (such as Sc, Y, etc.), Group IVA elements (Ti, Zr and Hf), VA elements (V, Nb and Ta), Group VIA elements (Cr, Mo and W), Group VIIA elements (such for example as Mn, Re, etc.), Group VIIIA elements (Fe, Ru, Os, Co, Rh, Ir, Ni, Pd and Pt), Group IB elements (Cu, Ag and Au), Group IIB elements (Zn, Cd and Hg), Group IIIB elements (such as B, Al, Ga, In, Tl, etc.), Group IVB elements (C, Si, Ge, Sn and Pb), Group VB elements (P, As, Sb and Bi), and Group VIB elements (such as S, Se, Te, etc.); (b) an alloy formed of any combination of elements defined in said (a); and (c) an oxide of any of elements defined in said (a); the aforementioned mixture being mechanically treated under vacuum or in an atmosphere of an inert gas or hydrogen.

As for the aforementioned alloy having hydrogen-absorbing properties, an $A_2B$ alloy (wherein A is an element which is capable of causing an exothermic reaction with hydrogen, and B is an element which is incapable of causing an exothermic reaction with hydrogen) or alloys represented by the aforementioned general formulas (IV) to (VI) may be employed. In particular, hydrogen-absorbing alloys containing an alloy represented by the aforementioned general formula (V) or (VI) are preferable.

The elements of aforementioned (a), alloys of aforementioned (b) and oxides of aforementioned (c) all function as a catalytic seed for hydrogenation as they are forcibly attached to the alloy having hydrogen-absorbing properties.

Preferable elements among the aforementioned (a) are those which exhibit a high catalytic activity to the reaction thereof with hydrogen. Namely, an element which is positive (endothermic) in heat of reaction with hydrogen, or an element which exhibits a larger exchange current density $i_0$ in the reaction at the negative electrode (hydrogen electrode), if the application of the element to a buttery is taken into account, is preferable. Examples of such an element are V, Nb, Ta, Cr, Mo, W, Mn, Fe, Ru, Co, Rh, Ir, Pd, Ni, Pt, Cu, Ag, Au, etc.

As for the alloy defined in the aforementioned (b), those which exhibit a higher catalytic activity due to the synergistic effect between the constituent elements of the alloy in the reaction at the hydrogen electrode than the catalytic activity to be derived from each constituent element are preferable. Specific examples of these preferable alloys are Ni—Ti type alloy, Ni—Zr type alloy, Co—Mo type alloy, Ru—V type alloy, Pt—W type alloy, Pd—W type alloy, Pt—Pd type alloy, V—Co type alloy, V—Ni type alloy, V—Fe type alloy, Mo—Co type alloy, Mo—Ni type alloy, W—Ni type alloy and W—Co type alloy. Among these alloy, $MoCo_3$, $WCo_3$, $MoNi_3$ and $WNi_3$ are more preferable, since these alloys are high in catalytic activity and suited for improving the hydrogen-absorbing property of the hydrogen-absorbing alloy.

With respect to oxides defined in the aforementioned (c), an oxide which is capable of giving a large exchange current density $i_0$ is preferable. Preferable examples of such an oxide are $FeO$, $RuO_2$, $CoO$, $Co_2O_3$, $Co_3O_4$, $RhO_2$, $IrO_2$ and $NiO$.

The aforementioned mixture should preferably be formed of a composition where the aforementioned additive is contained in the ratio of 0.01 to 70% by volume based on the volume of the alloy having hydrogen-absorbing properties. If the content of this additive is less than 0.01% by volume, it may be difficult to improve the rate of hydrogen absorption by the hydrogen-absorbing alloy. On the other hand, if the content of this additive exceeds 70% by volume, the amount of hydrogen absorption by the hydrogen-absorbing alloy may be decreased. More preferably content of the additive is in the range of 1 to 50% by volume.

Regarding the mechanical treatment to be adopted in the surface modification mentioned above, the same apparatus as explained above, i.e. such as an epicyclic ball mill, screw ball mill, rotational ball mill, or attritor may be employed.

This mechanical treatment by making use of an epicyclic ball mill for instance may be performed in the same manner as explained above within a time period of 1 to 1,000 hours.

Since the hydrogen-absorbing alloy according to this invention is formed of a mixture comprising an alloy having hydrogen-absorbing properties; and at least one additive selected from the group consisting of (a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in said (a); and (c) an oxide of any of elements defined in said (a); the resultant mixture being mechanically treated under vacuum or in an atmosphere of an inert gas or hydrogen, the initial activity and the hydrogen-absorbing properties of the hydrogen-absorbing alloy can be prominently improved.

Namely, the activity of the hydrogen absorptive alloy per se at the moment of absorbing hydrogen is considered to be influenced by the easiness of forming a catalytic layer and also by the performance of the catalytic layer. In view of these facts, it is possible to improve the hydrogen-absorbing properties of the hydrogen-absorbing alloy by taking advantage of the effects as explained in the aforementioned method of modifying the surface of the hydrogen-absorbing alloy.

Accordingly, in the case of the hydrogen-absorbing alloy according to this invention, with a view to further improve the hydrogen-absorbing properties of the hydrogen absorptive alloy, the aforementioned additives are added at the ratio of 0.01 to 70% by volume to the alloy having hydrogen-absorbing properties, and the resultant mixture is subjected to a mechanical treatment under vacuum, or in an atmosphere of an inert gas or hydrogen, thereby attaching a catalytic seed for the hydrogenation. It is possible, with this mechanical treatment, to forcibly attach a catalytic seed to be functioned as a hydrogenation catalyst at the moment of hydrogen absorption to the surface or vicinity of surface of the alloy having hydrogen-absorbing properties, and hence to improve the initial activity of the alloy. Therefore, it is possible according to this hydrogen-absorbing alloy to prominently improve the initial activity and the hydrogen-absorbing properties of the hydrogen-absorbing alloy.

For example, when Ni is mixed at a predetermined ratio with a $Mg_2Ni$ type alloy having hydrogen-absorbing properties, and the resultant mixture is subjected to a mechanical treatment in an atmosphere of an inert gas such as argon, nickel to be functioned as a dissociation catalyst for hydrogen at the moment of hydrogen absorption would be attached onto the surface of the alloy. As a result, it is possible to improve the hydrogen-absorbing properties of the hydrogen-absorbing alloy. Moreover, when this mechanical treatment is performed in this manner, the particle diameter of the alloy would be decreased, thereby increasing the ratio of grain boundary of the alloy and giving rise to the generation of non-uniform distortion within the crystal, thereby making it possible to facilitate the absorption of hydrogen.

Another example of the hydrogen-absorbing alloy according to this invention comprises an alloy having hydrogen-absorbing properties; and 0.01 to 70% by volume of at least one powdered additive having 0.01 to 100 μm in average diameter, which is dispersed in said alloy and selected from the group consisting of (a) at least one element selected from Group IA elements (such as Li, Na, Rb, Ca, Sr, Ba, etc.), Group IIA elements (such as Be, Mg, Rb, Cs, etc.), Group IIIA elements (such as Sc, Y, etc.), Group IVA elements (Ti, Zr and Hf), VA elements (V, Nb and Ta), Group VIA elements (Cr, Mo and W), Group VIIA elements (such for example as Mn, Re, etc.), Group VIIIA elements (Fe, Ru, Os, Co, Rh, Ir, Ni, Pd and Pt), Group IB elements (Cu, Ag and Au), Group IIB elements (Zn, Cd and Hg), Group IIIB elements (such as B, Al, Ga, In, Tl, etc.), Group IVB elements (C, Si, Ge, Sn and Pb), Group VB elements (P, As, Sb and Bi), and Group VIB elements (such as S, Se, Te, etc.); (b) an alloy formed of any combination of elements defined in said (a); and (c) an oxide of any of elements defined in said (a).

As for the aforementioned alloy having hydrogen-absorbing properties, an $A_2B$ alloy (wherein A is an element which is capable of causing an exothermic with hydrogen, and B is an element which is incapable of causing an exothermic reaction with hydrogen) or alloys represented by the aforementioned general formulas (IV) to (VI) may be employed. In particular, hydrogen-absorbing alloys containing an alloy represented by the aforementioned general formula (V) or (VI) are preferable.

All of the additives, i.e. the elements of aforementioned (a), alloys of aforementioned (b) and oxides of aforementioned (c) function as a catalytic seed for hydrogenation as they are forcibly attached to the alloy having hydrogen-absorbing properties. As for these additives, the same kinds of materials as explained above with reference to the hydrogen-absorbing alloy of this invention would employed.

The reasons for limiting the size of the powdered additives are as follows. Namely, if the size of the powdered additives is less than 0.01 μm, it may become difficult to improve the hydrogen-absorbing properties of the hydrogen-absorbing alloy. On the other hand, if the size of the powdered additives exceeds 100 μm. the rate of hydrogen absorption by the hydrogen-absorbing alloy may be lowered. More preferable particle size of the powdered additives is in the range of 0.1 to 50 μm.

The reasons for limiting the dispersion volume of the powdered additives to the alloy having hydrogen-absorbing properties are as follows. Namely, if the dispersion volume of the powdered additives is less than 0.01% by volume, it may be difficult to promote the rate of hydrogen absorption by the hydrogen-absorbing alloy. On the other hand, if the dispersion volume of this additive exceeds 70% by volume, the amount of hydrogen absorption by the hydrogen-absorbing alloy may be decreased. More preferably dispersion volume of the additive is in the range of 1 to 50% by volume.

As for the method of dispersing the aforementioned powdered additives into the alloy having hydrogen-absorbing properties, various methods such as a method of performing the aforementioned mechanical treatment after the mixing of the additive with the alloy; a method of adding the additive at the occasion of melting the alloy; an ultra-quenching method; an atomizing method; a plating method; a CVD method; a sputtering method; a mechanical alloying method; a rolling method; a sol-gel method may be employed.

According to this another example of the hydrogen-absorbing alloy of this invention, the aforementioned additive having a predetermined particle diameter is dispersed into the alloy having hydrogen-absorbing properties at a ratio of 0.01 to 70% by volume, so that a catalytic seed for the hydrogenation is attached to the alloy, thus prominently improving the initial activity of the alloy. Therefore, it is possible according to this hydrogen-absorbing alloy to prominently improve the initial activity and the hydrogen-absorbing properties of the hydrogen-absorbing alloy.

An alkali secondary battery according to the present invention will be explained further with reference to a cylindrical nickel-hydrogen secondary battery.

Referring to FIG. 3, a bottomed cylindrical case 1 is accommodated therein with an electrode group 5 which has been manufactured by spirally winding a stacked body comprising a positive electrode 2, a separator 3 and a negative electrode 4. The negative electrode 4 is disposed at the outermost periphery of the electrode group 5 so as to electrically contact with the cylindrical case 1. The cylindrical case 1 is also filled with an alkali electrolyte. A sealing plate 7 formed of a disk having an opening 6 at the center is disposed on the upper opening of the cylindrical case 1. An insulating gasket 8 having a ring-like shape is interposed between the periphery of the sealing plate 7 and the upper inner wall surface of the opening of the cylindrical case 1. The peripheral fringe portion of the opening of the cylindrical case 1 is caulked inward so that the sealing plate 7 is hermetically fixed via the gasket 8 to cylindrical case 1. The positive electrode lead 9 is connected through its one end to the positive electrode 2 and through its other end to the lower surface of the sealing plate 7. A positive terminal 10 having a hat-like shape is mounted over the sealing plate 7 in such a manner as to cover the opening 6. A rubber safety valve 11 is disposed in a space surrounded by the sealing plate 7 and the positive electrode terminal 10 in such a manner as to seal the opening 6. A holding plate 12 formed of an insulating disk having an opening is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the separator 3, the negative electrode 4 and the electrolyte will be explained.

(1) The Positive Electrode 2

This positive electrode 2 can be manufactured by adding a conductive material to an active material, i.e., nickel hydroxide powder, and the resultant mixture is kneaded together with a polymeric binder and water to prepare a paste, which is then stuffed into an electroconductive substrate and, after being dried, molded into a predetermined shape.

As for the conductive material, cobalt oxide or cobalt hydroxide can be used.

Examples of polymeric binder are carboxymethyl cellulose, methyl cellulose, sodium polyacrylate and polytetrafluoroethylene.

Examples of the electroconductive substrate are a metal net made of nickel, stainless steel or stainless steel treated nickel plate, or sponge-like, fibrous or felt-like metallic porous body.

(2-1) The Negative Electrode

This negative electrode can be manufactured by adding a conductive material to a hydrogen-absorbing alloy powder, and the resultant mixture is kneaded together with a polymeric binder and water to prepare a paste, which is then stuffed into an electroconductive substrate and, after being dried, molded into a predetermined shape.

Examples of the hydrogen-absorbing alloy are an alloy indicated by the following items (1) to (5) may be employed.

(1) A hydrogen-absorbing alloy containing an alloy represented by any of the aforementioned general formulas (I), (II), (V) and (VI).

(2) A hydrogen-absorbing alloy which is featured in that a half-width $\Delta(2\theta)$ of at least one peak out of peaks of three strongest lines to be obtained by an X-ray diffraction using $CuK_\alpha$-ray as a radiation source lies in the range of $0.2° \leq \Delta(2\theta) \leq 50°$, more preferably in the range of $0.3 \leq \Delta(2\theta) \leq 10°$. This hydrogen-absorbing alloy should preferably be such that the size D of the crystallite thereof falls within the range of $0.8$ nm $\leq D \leq 50$ nm.

(3) A hydrogen-absorbing alloy which is mechanically treated in vacuo or in an atmosphere of an inert gas or hydrogen.

(4) A hydrogen-absorbing alloy which is formed of a mixture comprising an alloy having hydrogen-absorbing properties; and at least one additive selected from the group consisting of (a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in said (a); and (c) an oxide of any of elements defined in said (a); said mixture being mechanically treated in vacuo or in an atmosphere of an inert gas or hydrogen.

(5) A hydrogen-absorbing alloy, which comprises an alloy having hydrogen-absorbing properties; and 0.01 to 50% by volume of at least one powdered additive having 0.01 to 100 $\mu$m in average diameter, which is dispersed in said alloy and selected from the group consisting of (a) at least one element selected from Group IA elements, Group IIA elements, Group IIIA elements, Group IVA elements, VA elements, Group VIA elements, Group VIIA elements, Group VIIIA elements, Group IB elements, Group IIB elements, Group IIIB elements, Group IVB elements, Group VB elements and Group VIB elements; (b) an alloy formed of any combination of elements defined in said (a); and (c) an oxide of any of elements defined in said (a).

Among the hydrogen-absorbing alloys or the alloys having hydrogen-absorbing properties as referred in the above items (3) to (5), those containing an alloy represented by any of the aforementioned general formulas (IV) to (VI) are preferable.

As for the polymeric binder, the same materials as employed for the positive electrode $\leq$ can be used.

As for the conductive material, for example carbon black can be used.

Examples of the electroconductive substrate are a two-dimensional substrate such as a punched metal, expanded metal, porous rigid plate, a nickel net, and a three-dimensional substrate such as a felt-like metallic porous body, sponge-like metallic substrate.

The negative electrode containing, as a raw material therefor, the hydrogen-absorbing alloy comprising an alloy represented by the general formulas (I) and (II) is optimized regarding the content of magnesium in the alloy, so that the reactivity thereof can be improved and at the same time the deterioration resistance of the hydrogen-absorbing alloy, i.e., the stability of the hydrogen-absorbing alloy at the occasion of hydrogen-absorption/desorption or charge/discharge cycle can be improved. Further, with the provision of such a negative electrode, it is possible to produce an alkali secondary battery of excellent in capacity as well as in charge/discharge property.

The hydrogen-absorbing alloy containing an alloy represented by any of the aforementioned general formulas (V) and (VI) is featured in that it exhibits a prominent improvement on the hydrogen absorption properties, in particular an increase in amount of hydrogen absorption as compared with the conventional $Mg_2Ni$ type alloy. This hydrogen-absorbing alloy is also featured in that, as compared with the conventional rare earth element type hydrogen-absorbing alloy, this hydrogen-absorbing alloy is larger in amount of hydrogen absorption per weight, cheaper in manufacturing cost and lighter in weight. Therefore, an alkali secondary battery provided with a negative electrode containing such a hydrogen-absorbing alloy as a negative electrode material is excellent in capacity as well as in charge/discharge property.

Further, an alkali secondary battery provided with a negative electrode containing a hydrogen-absorbing alloy represented by the aforementioned items (2) to (5) as a negative electrode material would exhibit a still larger capacity and more excellent charge/discharge property.

(2-2) The Negative Electrode 4

This negative electrode 4 comprises a hydrogen-absorbing alloy containing magnesium. When the negative electrode is immersed in a 6 to 8N aqueous solution of an alkali hydroxide, (a) either the elution rate of magnesium ion into the aqueous solution of alkali hydroxide of normal temperature is riot more than 0.5 mg/kg alloy/hr, or the elution rate of magnesium ion into the aqueous solution of alkali hydroxide of 60° C. is not more the 4 mg/kg alloy/hr, and (b) either the elution rate of a component element of alloy into the aqueous solution of alkali hydroxide of normal temperature is not more than 1.5 mg/kg alloy/hr, or the elution rate of a component element of alloy into the aqueous solution of alkali hydroxide of 60° C. is not more than 20 mg/kg alloy/hr.

The inventors have established a method for evaluating the deterioration rate of a hydrogen-absorbing alloy containing magnesium, and on the basis of this method have found out a negative electrode comprising the hydrogen-absorbing alloy having a satisfactory reversibility and stability in the electrode reaction.

The elution rate of ion, in an aqueous solution of alkali hydroxide, of a hydrogen-absorbing alloy, namely a corrosion rate is a parameter indicating a static stability of an alloy, so that it is generally impossible to estimate the stability of a dynamic cycle from only this static stability. This is because the stability of cycle in a hydrogen-absorbing alloy is deemed to be much influenced by dynamic properties such as an influence of hydrogen passing between the crystal lattices of the alloy to the strain of crystal lattice in the process of hydrogen-absorption and desorption, in addition to the static properties inherent to the alloy that can be determined by a chemical or physical modification through a contact with foreign additives or matters, or through a surface treatment.

In view of this, various kinds of negative electrodes (hydrogen electrodes) were prepared by way of several methods using various kinds of hydrogen-absorbing alloys containing magnesium, each differing in composition from each other and being treated with different methods, and evaluations of each negative electrode were performed. As a result, it has been found that, as far as a hydrogen-absorbing alloy having a high reversibility is concerned, a hydrogen-absorbing alloy meeting the following conditions is excellent in stability.

Namely, a negative electrode should be characterized in that, when the negative electrode is immersed in a 6 to 8N aqueous solution of an alkali hydroxide, (a) as far as only magnesium is concerned, either the elution rate of magnesium ion into the aqueous solution of alkali hydroxide of normal temperature is not more than 0.5 mg/kg alloy/hr, or the elution rate of magnesium ion into the aqueous solution of alkali hydroxide of 60° C. is not more than 4 mg/kg alloy/hr, and (b) as far as the whole elements are concerned, either the elution rate of a component element of alloy into the aqueous solution of alkali hydroxide of normal temperature is not more than 1.5 mg/kg alloy/hr, or the elution rate of a component element of alloy into the aqueous solution of alkali hydroxide of 60° C. is not more than 20 mg/kg alloy/hr.

The reason for setting the elution rate at a temperature of 60° C. as a condition is as follows. Namely, in the case of hydrogen-absorbing alloy which is practically useful, the ion elution rate at the normal temperature of the alloy is as low as in the order of 0.5 mg/kg alloy/hr so that it is required for saving the measuring time and improving the accuracy of measurement to accelerate the elution reaction rate.

Therefore, it is also possible to employ another set value representing a substantially the same degree of elution rate, which is to be measured at a different temperature for evaluating the features of the negative electrode. However, the employment of high temperature exceeding over 60° C. for the evaluation is not preferable, since it may give rise to a side reaction by flucturing an atmosphere temperature and fluctuation in measured values depending on the composition of the alloy and on the kinds of treatment.

Most convenient method of manufacturing the negative electrode is to employ a hydrogen-absorbing alloy which is featured in that, when the hydrogen-absorbing alloy is immersed alone in a 6 to 10N aqueous solution of an alkali hydroxide, the elution rate of magnesium ion into the aqueous solution of alkali hydroxide of normal temperature is not more than 0.5 mg/kg alloy/hr, or the elution rate of magnesium ion into the aqueous solution of alkali hydroxide of 60° C. is not more than 4 mg/kg alloy/hr, and the total of elution rate of component elements of alloy into the aqueous solution of alkali hydroxide of normal temperature is not more than 1.5 mg/kg alloy/hr, or the elution rate of the component elements into the aqueous solution of alkali hydroxide of 60° C. is not more than 20 mg/kg alloy/hr.

(3) The Separator 3

The separator 3 may be formed of a nonwoven fabric made of a polymer such as a polypropylene nonwoven fabric, a nylon nonwoven fabric or a nonwoven fabric consisting of polypropylene fiber and nylon fiber. In particular, a polypropylene nonwoven fabric having its surface treated into hydrophilic nature is preferable as a separator.

(4) Alakali Electrolyte

Examples of the alkali electrolyte are an aqueous solution of sodium hydroxide (NaOH), an aqueous solution of lithium hydroxide (LiOH), an aqueous solution of potassium hydroxide (KOH), a mixed solution of sodium hydroxide (NaOH) and lithium hydroxide (LiOH), a mixed solution of potassium hydroxide (KOH) and LiOH, and a mixed solution of NaOH, KOH and LiOH.

An alkali secondary battery according to the present invention comprises a negative electrode accommodated in a case and including a hydrogen-absorbing alloy containing magnesium, a positive electrode accommodated in the case and so arranged as to opposite the negative electrode with a separator sandwiched therebetween, and an alkali electrolyte filled therein, wherein a magnesium ion concentration in the alkali electrolyte 30 days or more after filling and sealing the alkali electrolyte in the vessel is not more 2.2 mg/liter.

Reasons for defining the secondary battery by the ion concentration in the electrolyte will be explained with reference to the case where it is used in an alkali secondary battery.

Generally, the amount of an electrolyte within an alkali secondary battery is limited, so that even a small amount of ion elution into the electrolyte will cause a substantial increase of ion concentration in the electrolyte. Moreover, since the elution rate of ion decreases with the increase in concentration of eluted ion in the electrolyte, the rate of increase in ion concentration in the electrolyte will be decreased to a negligible degree within a relatively short period of time. Further, in the case of a negative electrode (a hydrogen electrode) which is low in deterioration rate, the elution rate of ion from the negative electrode is low from the beginning as explained with reference to the negative electrode of this invention. In view of these facts, it can be assumed that the ion concentration of the electrolyte in the battery after 30 days as counted from the filling of the electrolyte is made substantially constant. Therefore, the ion concentration in an electrolyte can be assumed as being one of the parameters as far as the electrolyte within the battery is concerned.

As explained above, it is possible according to another embodiment of this invention to provide an alkali secondary battery with a negative electrode comprising the hydrogen-absorbing alloy having a satisfactory reversibility and stability in the electrode reaction by establishing a method for evaluating the deterioration rate of a hydrogen-absorbing alloy containing magnesium. Therefore, it is possible according to this invention to provide an alkali secondary battery of high capacity, in place of the conventional alkali secondary battery (a nickel-cadmium battery, or nickel battery using $LaNi_5$ type hydrogen-absorbing alloy).

Meanwhile, the restriction of the amount of magnesium ion eluted into an electrolyte in an alkali secondary battery is also effective in prohibiting the internal short through the formation of dendrite.

The present invention will be described in greater detail below by way of its preferred examples.

EXAMPLES 1–5

Comparative Examples 1–6

Mg and Ni were dissolved in a high frequency furnace filled with an argon gas atmosphere, thereby preparing 11 kinds of hydrogen-absorbing alloy having a composition of $Mg_2Ni_y$ (y is a value which is indicated in Table 2 shown below).

The particles diameter of each of these 11 kinds of hydrogen-absorbing alloy thus obtained was adjusted to 45 to 75 $\mu$m, and then a predetermined amount of each of these alloys was dipped into an 8N aqueous solution of potassium hydroxide heated to 60° C. for 5 hours. Subsequently, the concentration of magnesium ion eluted into this aqueous solution was measured. From this measurement, the relative value of magnesium ion eluted and the concentration of magnesium ion eluted per mole of magnesium were calculated. The relative value of the magnesium eluted was calculated, setting the elution concentration from the pure magnesium to 100. The results are shown in Table 2 below. Further, a standardized data which was obtained by dividing the eluted amount by the ratio of magnesium in the alloy are shown in FIG. 4.

On the other hand, particles of each hydrogen-absorbing alloy pulverized into particles of 75 μm or less in diameter were charged into the pressure resistant vessel, and hydrogen gas was introduced into this vessel under the conditions of 300° C. and 10 atm. Then, the amount of hydrogen absorbed in the alloy was calculated from the decrease in pressure after 24 hours. The results are shown in Table 2 below.

TABLE 2

| | $Mg_2Ni_y$ composition | | Eluted Mg concentration | | Amount of |
| --- | --- | --- | --- | --- | --- |
| | Mg:Ni moler ratio | y | Relative value | per molar ratio of Mg in alloy | hydrogen adsorption (z in $Mg_2Ni_yH_z$) |
| Comparative Example 1 | 100:0 | 0 | 100 | 1.00 | 0 |
| Comparative Example 2 | 75:25 | 0.667 | 19 | 0.25 | 1.4 |
| Comparative Example 3 | 2:1 | 1.000 | 18 | 0.27 | 3.2 |
| Example 1 | 40:21 | 1.050 | 8 | 0.12 | 3.4 |
| Example 2 | 64:36 | 1.125 | 7 | 0.11 | 3.5 |
| Example 3 | 5:3 | 1.200 | 7 | 0.11 | 3.3 |
| Example 4 | 8:5 | 1.250 | 8 | 0.13 | 3.0 |
| Example 5 | 4:3 | 1.500 | 10 | 0.18 | 2.3 |
| Comparative Example 4 | 8:7 | 1.750 | 105 | 1.97 | 0.7 |
| Comparative Example 5 | 50:50 | 2.000 | 145 | 2.90 | 0.4 |
| Comparative Example 6 | 1:2 | 4.000 | 240 | 7.20 | 0.5 |

As seen from Table 2, in the case of $Mg_2Ni_y$, the amount of eluted Mg ion indicated a smaller value than that of the pure Mg when the value of y representing the amount of Ni was small. However, when the value of y exceeded over 1.5, the amount of eluted Mg ion was abruptly increased. In particular, when the value of y in the hydrogen-absorbing alloy was in the range of $1<y \leq 1.5$, the amount of eluted Mg ion was decreased. Further, the hydrogen-absorbing property of $Mg_2Ni_y$ was not substantially altered when the value of y representing the amount of Ni is around 1. However, when the value of y exceeded over 1.5, the hydrogen-absorbing property was abruptly deteriorated. In view of these results, it can seen that when the value of y in $Mg_2Ni_y$ is in the range of $1<y \leq 1.5$ as defined by this invention, a hydrogen-absorbing alloy having an excellent chemical stability and hydrogen-absorbing property can be obtained.

EXAMPLE 6

Comparative Example 7

Mg and Ni were fused in a high frequency furnace filled with an argon gas atmosphere, thereby preparing two kinds of hydrogen-absorbing alloy, each having a composition of $Mg_2Ni_{1.5}$ (Example 6) and a composition of $Mg_2Ni_{0.84}$ (Comparative Example 7).

A block of each hydrogen-absorbing alloy was cut with a diamond cutter thereby preparing 5 kinds of band-like piece of alloy respectively. Since any flaw or irregularity formed on the surface of the band-like piece of alloy may causes or promote a rupture of alloy, these test pieces were subjected to the following stress measurement after polishing the surfaces of these test pieces with a diamond paste 0.3 μm in particle size. The maximum stress of each band-like piece was measured as shown in FIG. 5. Namely, a band-like piece 21 was supported between a pair of supporting bars 22 arranged in parallel and kept apart by a distance of 20 mm. Then, a portion of the band-like piece 21 corresponding to the center of the space between the pair of supporting bars 22 was pressed with a weight 23 to cause a bending of the band-like piece 21 and at the same time the force required for bending the band-like piece 21 was measured, thus calculating the maximum stress on the basis of the measurement.

The calculation of the maximum stress was made in accordance with the equation shown below. In this equation, the width of band-like alloy piece is indicated by W (mm); the thickness of band-like alloy piece, by T (mm); the distance between a pair of supporting bars was set to 20 mm, the force required for bending is defined as f/N, and the maximum stress was indicated by σ.

$$\sigma/10^6 N \cdot m^{-2} = \text{moment/section modulus} = (20f/4)/(WT^2/6) = 5f/6WT^2$$

The maximum stress of each band-like alloy piece (test piece) measured in this manner is shown in Table 3 below.

TABLE 3

| | Size of sample | | Break- | Modulus | | |
| --- | --- | --- | --- | --- | --- | --- |
| | Thickness (mm) | Width (mm) | ing load N | Moment $10^3$ Nm | of section $10^{-9}$ m | Max. stress $10^6$ Nm$^{-2}$ |
| Example 6 | | | | | | |
| Sample 1 | 0.49 | 10.1 | 2.05 | 10.2 | 0.41 | 25.2 |
| Sample 2 | 0.50 | 9.9 | 2.83 | 14.2 | 0.41 | 34.5 |
| Sample 3 | 0.65 | 9.6 | 3.14 | 15.7 | 0.67 | 23.3 |
| Sample 4 | 1.03 | 10.3 | 11.3 | 56.3 | 1.82 | 30.9 |
| Sample 5 | 1.05 | 10.1 | 11.7 | 58.4 | 1.85 | 31.6 |
| Comparative Example 7 | | | | | | |
| Sample 1 | 0.37 | 9.7 | 2.45 | 12.3 | 0.22 | 55.3 |
| Sample 2 | 0.60 | 10.6 | 6.20 | 31.0 | 0.64 | 48.7 |
| Sample 3 | 0.60 | 10.9 | 5.39 | 26.9 | 0.65 | 41.3 |
| Sample 4 | 1.22 | 10.5 | 26.9 | 134 | 2.60 | 51.8 |
| Sample 5 | 1.30 | 10.3 | 27.7 | 138 | 2.92 | 47.3 |

As seen from this Table 3, a band-like alloy piece made of a hydrogen-absorbing alloy having a composition of $Mg_2Ni_{1.5}$ (Example 6) indicated a low stress and an excellent workability (including pulverization) as compared with a hydrogen-absorbing alloy having a composition represented by $Mg_2Ni_{0.84}$ (Comparative Example 7).

When the sectioned surface of the hydrogen-absorbing alloy of Example 6 was investigated with a scanning electron microscope (SEM), it was confirmed from the resultant photograph that the sectioned surface was made up of a predominant portion of $Mg_2Ni$ phase and a minor portion of Ni or other phases, and that there was a phase of high Mg content in a small ratio on the grain boundary of $Mg_2Ni$ phase. The same texture was also confirmed in the measurement of EPMA (electron probe microanalyzer). Specifically, in the case of the hydrogen-absorbing alloy of Example 6, the area of the high Mg content phase was 8 to 9% based on the whole area, and the area occupied by $Mg_2Ni$ phase and the phase consisting only of Ni was 90% or more. In a SEM photograph of the hydrogen-absorbing alloy of Comparative Example 7, most of the area was occupied by $Mg_2Ni$ phase and the phase consisting only of Ni, and at the same time a substantial amount of the high Mg content phase was recognized on the grain boundary of $Mg_2Ni$ phase. Specifically, the area of the high Mg content phase was 20% or more based on the whole area.

In view of these results of Example 6 and Comparative Example 7, it can be seen that an alloy indicating a homogeneity ($Mg_2Ni$ phase) of 90% or more in a composition distribution as measured on the sectioned area the alloy is excellent in stability and mechanical pulverizability.

EXAMPLES 7–14

Comparative Example 8–10

Eleven kinds of hydrogen-absorbing alloy blocks having a composition of $Mg_{2-x}M2_xM1_y$, and value of y as shown in Table 4 shown below.

A plurality of band-like alloy pieces of the same size as the test piece 21 of Example 6 were prepared from these hydrogen-absorbing alloy blocks. Then, the maximum stress of these test pieces was measured using the test apparatus shown in FIG. 5 and the calculating equation as mention above. The results obtained are shown in Table 4.

TABLE 4

| | Hydrogen-absorbing alloy $Mg_{2-x}M2_xM1_y$ | Value of y | Max. stress $10^6$ $Nm^{-2}$ |
|---|---|---|---|
| Example 7 | $Mg_2Ni_{0.95}Fe_{0.1}$ | 1.05 | 28.1 |
| Example 8 | $Mg_2Ni_{0.95}Co_{0.1}$ | 1.05 | 28.6 |
| Example 9 | $Mg_2Ni_{0.9}Cu_{0.2}$ | 1.10 | 31.2 |
| Example 10 | $Mg_{1.9}Ca_{0.1}Ni_{1.1}$ | 1.10 | 28.2 |
| Example 11 | $Mg_{1.9}La_{0.1}Ni_{1.1}$ | 1.10 | 29.3 |
| Example 12 | $Mg_2Ni_{0.9}Sn_{0.25}$ | 1.15 | 30.2 |
| Example 13 | $Mg_2Ni_1Se_{0.1}$ | 1.10 | 34.9 |
| Example 14 | $Mg_{1.9}Ca_{0.1}Ni_{0.9}Sn_{0.15}$ | 1.05 | 30.8 |
| Comparative Example 8 | $Mg_2Ni_{0.95}Fe_{0.05}$ | 1.00 | 44.8 |
| Comparative Example 9 | $Mg_{1.9}Al_{0.1}Ni_{0.9}$ | 0.90 | 54.3 |
| Comparative Example 10 | $Mg_2Ni_{0.45}Sn_{0.45}$ | 0.90 | 53.3 |

As apparent from Table 4, in the case of $Mg2-xM2_xM1_y$, a maximum stress of about $30\times10^6$ $Nm^{-2}$ was obtainable when the value of y is over 1 as shown in Example 7 to 14. By contrast, in the case of Comparative Examples 8 to 10 where the value of y is not more than 1, the maximum stress thereof was about $50\times10^6$ $Nm^{-2}$, indicating that a force of several ten% higher than those of Examples 7 to 14 was required in these Comparative Examples 8 to 10.

EXAMPLE 15

A hydrogen-absorbing alloy comprising predetermined amount of Mg and Ni and having a composition of $Mg_2Ni_y$ was prepared by way of an annealing method. Then, the alloy was sealed in a quartz tube filled with an argon atmosphere, and slowly annealed for about one month at a temperature of 500° C. thereby obtaining a hydrogen-absorbing alloy comprising a composition of $Mg_2Ni_{1.01}$.

The hydrogen-absorbing alloy thus obtained was dipped in an aqueous solution of alkali hydroxide, and the amount of magnesium ion eluted was measured. As a result, the relative amount of magnesium ion eluted was found to be 9, the value obtained by dividing the amount by 66.4%, i.e., the magnesium content in the alloy was found to be 0.14, indicating an excellent chemical stability.

FIG. 6 illustrates a temperature scanning type hydrogen-absorption/desorption-evaluating apparatus employed in the evaluation of hydrogen-absorbing alloys obtained in Examples beginning from Example 16. Referring to FIG. 16, a hydrogen gas cylinder 31 is connected via a pipe 32 to a test sample vessel 33. The middle portion of the pipe 32 is branched, and a distal end of the branched pipe 34 is connected to a vacuum pump 35. A manometer 36 is mounted on a pipe portion branched from the branched pipe 34. On the pipe 32 interposed between the hydrogen gas cylinder 31 and the test sample vessel 33 are mounted in the order (starting from the hydrogen gas cylinder 31) of a first valve $37_1$ and a second valve $37_2$. On a portion of the pipe 32 disposed between the first valve $37_1$ and a second valve $37_2$ is connected a pressure accumulator 38. Further, a third valve $37_3$ is mounted on a portion of the branched pipe 34 interposed between the vacuum pump 35 and the manometer 36. The test sample vessel 33 is provided with a heater 39. A thermocouple 40 is disposed inside the test sample vessel 33. A temperature controller 42 to be controlled by a computer 41 is connected to both of the thermocouple 40 and the heater 39 so as to control the temperature of the heater 39 on the basis of a detected temperature from the thermocouple 40. A recorder 43 to be controlled by the computer 41 is connected to both of the manometer 36 and the temperature controller 42.

EXAMPLES 16 and 17

Comparative Examples 11 and 12

Various kinds of hydrogen-absorbing alloys, each having a composition of $Mg_{2-x}M2_xM1_y$, but differing in components of $Mg_{2-x}M2_x$ and $M_1$, and values of x and y, i.e., an alloy of $Mg_{1.9}Al_{0.1}Ni_{1.05}$ (M1=Ni, M2=Al, x=0.1, y=1.05; Example 16), an alloy of $Mg_{1.9}Al_{0.1}Ni$ (M1=Ni, M2=Al, x=0.1, y=1; Comparative Example 11), an alloy of $Mg_{1.9}Mn_{0.1}Ni_{1.05}$ (M1=Ni, M2=Mn, x=0.1, y=1.05; Example 17), an alloy of $Mg_{1.9}Mn_{0.1}Ni$ (M1=1, M2=Mn, x=0.1, y=1.0; Comparative Example 12) and $Mg_2Ni$ (Comparative Example 3) were prepared.

Then, each of these hydrogen-absorbing alloys was charged into the test sample vessel 33. Thereafter, the first valve $37_1$ was closed, and both of the second valve $37_2$ and the third valve $37_3$ were opened. Under this condition, the vacuum pump 35 was actuated to exhaust the air in each of the pipe 32, the branched pipe 34, the pressure accumulator 38 and the test sample vessel 33. Then, after closing the second valve $37_2$ and the third valve $37_3$, the first valve $37_1$ was opened to supply hydrogen from the hydrogen gas cylinder 31 to each of the pipe 32, the branched pipe 34, the pressure accumulator 38 and the test sample vessel 33 thereby carrying out a hydrogen displacement of them. Subsequently, the first valve $37_1$ was closed and at the same time, the amount of hydrogen introduced was calculated from the pressures indicated by the manometer 36. Thereafter, the second valve $37_2$ was opened thereby feeding hydrogen to the test sample vessel 33, and the temperature thereof was monitored with the thermocouple 40. Then, the temperature of the test sample vessel 33 was allowed to raise at a constant rate by controlling the thermocouple 40 and the temperature controller 42. At the same time, the temperature of the test sample vessel 33 was scanned by using the heater 39 receiving this control signal. At this moment, a change in pressure if any within the test sample vessel 33 was detected by means of the manometer 36 and recorded in the recorder 43. The pressure change (a decrease in temperature resulting from the hydrogen absorption by the hydrogen-absorbing alloy) due to the rise in temperature of the test sample vessel 33 is shown in FIG. 7.

As seen from FIG. 7, a hydrogen-absorbing alloy of $Mg_{1.9}Al_{0.1}Ni_{1.05}$ (Example 16) is capable of absorbing hydrogen at a lower temperature as compared with a hydrogen-absorbing alloy of $Mg_{1.9}Al_{0.1}Ni$ (Comparative Example 11). A hydrogen-absorbing alloy of $Mg_{0.9}Mn_{0.1}Ni_{1.05}$ (Example 17) is also capable of absorbing hydrogen at a lower temperature as compared with a hydrogen-absorbing alloy of $Mg_{1.9}Mn_{0.1}Ni$ (Comparative Example 12). In particular, the hydrogen-absorbing alloy of Example 16 wherein M2 is substituted by Al is seen to be more suited, as compared with the hydrogen-absorbing alloy of Example 17 wherein M2 is substituted by Mn, in lowering the hydrogen-absorbing temperature or the temperature suited for hydrogen absorption. Further, it can be seen that the hydrogen-absorbing alloys of Examples 16 and 17 have an excellent hydrogen-absorbing capacity which is comparable to that of the alloy of $Mg_2Ni$ (Comparative Example 3). Accordingly, it can be seen that when part of Mg is substituted with M2 (Al or Mn), it: is possible to lower the temperature suited for hydrogen-absorption, while maintaining an excellent hydrogen-absorption capacity.

In another test, the relationship between the concentration of absorbed hydrogen and the hydrogen-absorption temperature was investigated, using the hydrogen-absorbing alloys of $Mg_{1.9}Al_{0.1}Ni_{1.05}$ (Example 16), $Mg_{1.9}Mn_{0.1}Ni_{1.05}$ (Example 17), $Mg_{1.9}Al_{0.1}Ni$ (Comparative Example 11) and $Mg_2Ni$ (Comparative Example 3), thereby investigating the temperature requiring to absorb hydrogen up to H/M=0.1 (this means that the ratio of the number of atoms absorbed to the number of atoms of a hydrogen-absorbing alloy is 0.1). Furthermore, the relative value of the concentration of eluted magnesium and the concentration of eluted magnesium per mole of Mg of the alloy were measured using the hydrogen-absorbing alloys of Examples 16 and 17, and Comparative Examples of 11 and 3 in the same manner as explained in Example 1. In this case, the relative value of the eluted magnesium ion concentration was calculated by setting the magnesium ion concentration eluted from the pure magnesium as being 100. The results obtained are shown in FIG. 5.

As apparent from Table 5, with the employment of a hydrogen-absorbing alloy comprising Mg substituted partially by M2 (Al or Mn) and M1 whose value of y exceeding over 1, it is possible to realize the lowering of hydrogen-absorbing temperature and to improve the chemical stability of the alloy.

EXAMPLE 18

Figure 8:
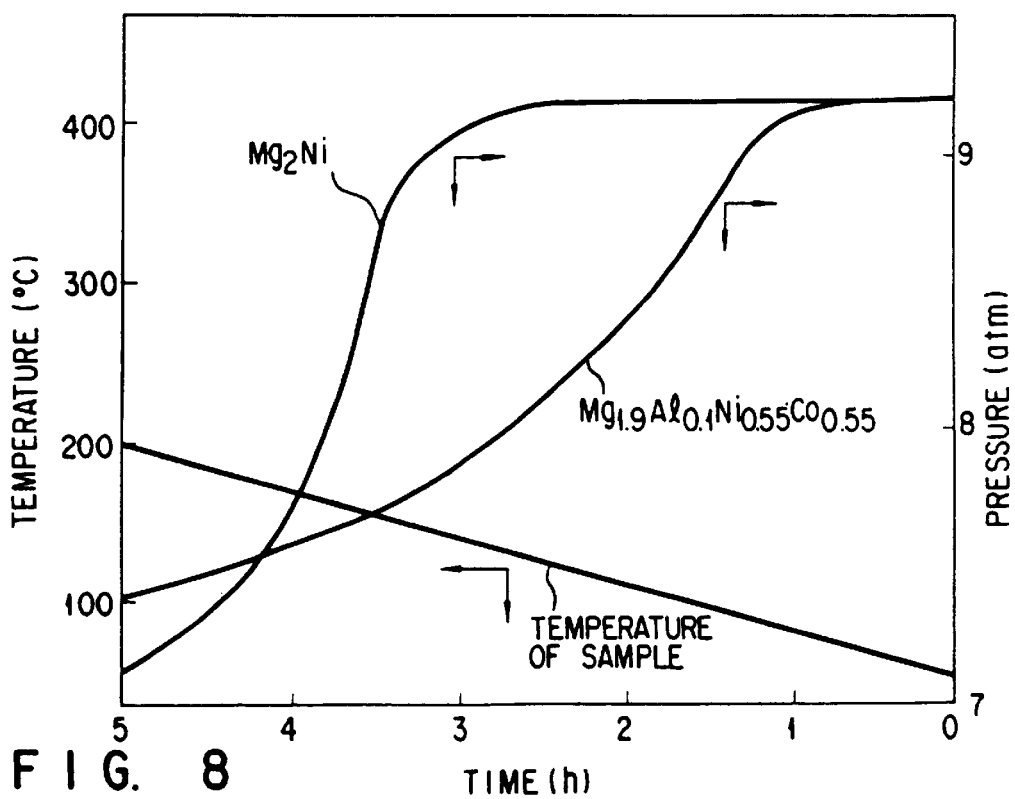
FIG. 8 is a graph showing the relationship between the rise in temperature of hydrogen-absorbing alloys of Example 18 and Comparative Example 3 and the changes in pressure (a decrease in pressure in proportion to the hydrogen absorption by a hydrogen-absorbing alloy)

A hydrogen-absorbing alloy having a composition of $Mg_{1.9}Al_{0.1}Ni_{0.55}Co_{0.55}$ (M1=Ni and Co, M2=Al, x=0.1, y=1.10 in $Mg_{2-x}M2_xM1_y$, was prepared. Then, the pressure change (a decrease in temperature resulting from the hydrogen absorption by the hydrogen-absorbing alloy) due to the rise in temperature of the test sample vessel was measured in the same manner as in Example 16 using the shown in FIG. 6. As result, a graph showing the characteristics of the alloy as shown in FIG. 8 was obtained. The results obtained from the hydrogen-absorbing alloy of $Mg_2Ni$ (Comparative Example 3) are also shown in FIG. 8.

As shown in FIG. 8, the hydrogen-absorbing alloy wherein M1 is substituted by Ni and Co is capable of lowering the temperature suited for hydrogen-absorption, while maintaining an excellent hydrogen-absorption capacity.

In another test, the relative value of the concentration of eluted magnesium and the concentration of eluted magnesium per mole of Mg of the alloy of this Example were measured in the same manner as explained in Example 1. In this case, the relative value of the eluted magnesium ion concentration was calculated by setting the magnesium ion concentration eluted from the pure magnesium as being 100. As a result, the relative value of the concentration of eluted magnesium was found to be 8, and the concentration of eluted magnesium per mole of Mg of the alloy was found to be 0.13.

EXAMPLES 19 and 20

Comparative Example 13

Various kinds of hydrogen-absorbing alloys, each having a composition of $M_{2-x}M2_xM1_y$, but differing in components of $M_{2-x}M2_x$ and M1, and values of x and y, i.e., an alloy of $Zr_{1.9}V_{0.1}Fe_{1.05}$ (M=Zr, M1=Fe, M2=V, x=0.1, y=1.05; Example 19), an alloy of $Zr_{1.9}Cr_{0.1}Fe_{1.05}$ (M=Zr, M1=Fe, M2=Cr, x=0.1, y=1.05; Example 20), and $Zr_2Fe$ (Comparative Example 13) were prepared. Then, the pressure change (a decrease in temperature resulting from the hydrogen absorption by the hydrogen-absorbing alloy) due to the rise in temperature of the test sample vessel was measured in the same manner as in Example 16 using the shown in FIG. 6. At the same time, an investigation was also conducted regarding the temperature requiring to absorb

TABLE 5

|  | Hydrogen-absorbing alloy $Mg_{2-x}M2_xM1_y$ | Value of y | Eluted Mg concentration | | Temperature (° C.) |
|---|---|---|---|---|---|
|  |  |  | Relative value | per molar ratio of Mg in alloy |  |
| Example 16 | $Mg_{1.9}Al_{0.1}Ni_{1.05}$ | 1.05 | 7 | 0.11 | 70 |
| Comparative Example 11 | $Mg_{1.9}Al_{0.1}Ni$ | 1.00 | 17 | 0.27 | 75 |
| Example 17 | $Mg_{1.9}Ni_{1.06}Mn_{0.1}$ | 1.16 | 7 | 0.12 | 110 |
| Comparative Example 3 | $Mg_2Ni$ | 1.00 | 18 | 0.27 | 140 | hydrogen up to H/M=0.1 (this means that the ration of the number of atoms absorbed to the number of atoms of a hydrogen-absorbing alloy is 0.1). Results are shown in Table 6 below.

TABLE 6

| | Hydrogen-absorbing alloy $M_{2-x}M2_xM1_y$ | Value of y | Temperature (° C.) |
|---|---|---|---|
| Example 19 | $Zr_{1.9}V_{0.1}Fe_{1.05}$ | 1.16 | 340 |
| Example 20 | $Zr_{1.9}Cr_{0.1}Fe_{1.05}$ | 1.16 | 295 |
| Comparative Example 13 | $Zr_2Fe$ | 1.00 | 380 |

As apparent from Table 6, with the employment of a hydrogen-absorbing alloy comprising Zr as M, which is substituted partially by M2 (V and Cr), and M1 whose value of y exceeding over 1 (Examples 19 and 20), it is possible to realize the lowering of hydrogen-absorbing temperature.

EXAMPLES 21–26

Comparative Examples 3, 14 and 15

First, Mg, Ni, Ag, Cd, Ca, Pd, Al, In, Co and Ti where dissolved in a high frequency furnace filled with an argon gas atmosphere, thereby preparing 9 kinds of hydrogen-absorbing alloy, each having a composition of $Mg_{2-x}M2_xM1_y$ as shown in Table 7.

Then, each of these hydrogen-absorbing alloys was charged into the test sample vessel 33 as a test sample. Thereafter, the first valve 37₁ was closed, and both of the second valve 37₂ and the third valve 37₃ were opened. Under this condition, the vacuum pump 35 was actuated to exhaust the air in each of the pipe 32, the branched pipe 34, the pressure accumulator 38 and the test sample vessel 33. Then, after closing the second valve 37₂ and the third valve 37₃, the first valve 37₁ was opened to supply hydrogen from the hydrogen gas cylinder 31 to each of the pipe 32, the branched pipe 34, the pressure accumulator 38 and the test sample vessel 33 thereby carrying out a hydrogen displacement of them. Subsequently, the first valve 37₁ was closed and the second valve 37₂ was opened thereby feeding hydrogen to the test sample vessel 33, and the pressures and temperatures recorded in the recorder 43 were checked.

In the case of Examples 21 to 26, and Comparative Examples 3, 14 and 15 the pressure of the hydrogen gas cylinder 31 was preset at the moment of the hydrogen displacement so as to control the pressure (initial pressure) in the vessel 33 to be kept at about 10 atm., and the measurement-initiating temperature was set to room temperature (about 25° C.).

Subsequently, the temperature within the test sample vessel 33 was controlled to be raised at a rate of 0.5° C. per minute by the controlling of the computer 41 and the temperature controller 42. At the same time, the temperature of the test sample vessel 33 was scanned by using the heater 39 receiving this control signal. At this moment, changes in pressure and temperature if any within the test sample vessel 33 were detected by means of the manometer 36 and recorded in the recorder 43.

On the other hand, the change in pressure within the test sample vessel 33, resulting from the rise in temperature in the above operation was monitored, and, on the basis of this pressure decrease, the temperature when H/M=0.1 was reached (i.e., when the number of hydrogen atoms absorbed per one mole of atom of the alloy was reached to 0.1) was determined, assuming this temperature as a standard of the minimum temperature which enables the hydrogen-absorbing alloy to perform a hydrogen-absorbing reaction. Further, the relative value of the concentration of eluted magnesium and the concentration of eluted magnesium per mole of Mg of the alloy of Examples 21 to 26 and Comparative Examples 3, 14 and 15 were measured in the same manner as explained in Example 1. In this case, the relative value of the eluted magnesium ion concentration was calculated by setting the magnesium ion concentration eluted from the pure magnesium as being 100. Results are shown in Table 7 below.

TABLE 7

| | Hydrogen-absorbing alloy $Mg_{2-x}M2_xM1_y$ | Value of y | Eluted Mg concentration | | Temperature (° C.) |
|---|---|---|---|---|---|
| | | | Relative value | per molar ratio of Mg in alloy | |
| Example 21 | $Mg_2Ag_{0.22}Ni_{1.11}$ | 1.11 | 7 | 0.11 | 120 |
| Comparative Example 14 | $Mg_{1.9}Al_{0.1}Ni$ | 1.00 | 17 | 0.27 | 75 |
| Example 22 | $Mg_2Co_{1.24}In_{0.35}$ | 1.59 | 8 | 0.14 | 110 |
| Example 23 | $Mg_2Co_{1.11}In_{0.11}$ | 1.22 | 9 | 0.15 | 150 |
| Example 24 | $Mg_{1.5}Ca_{0.5}Ni_{1.5}Ag_{0.5}$ | 2.00 | 7 | 0.19 | 115 |
| Example 25 | $Mg_{1.76}Ca_{0.5}Ni_{1.5}Ag_{0.38}$ | 1.88 | 7 | 0.15 | 110 |
| Example 26 | $Mg_2Ni_{1.25}In_{0.25}W_{0.25}$ | 1.75 | 6 | 0.11 | 125 |
| Comparative Example 3 | $Mg_2Ni$ | 1.00 | 18 | 0.27 | 140 |
| Comparative Example 15 | $Mg_2Co$ | 1.00 | 58 | 0.87 | 170 |

As apparent from Table 7, with the employment of a hydrogen-absorbing alloy according to Examples 21 to 26, it is possible to realize the lowering of hydrogen-absorbing temperature and to improve the chemical stability of the alloy as compared with those of Comparative Examples 3, 14 and 15.

EXAMPLES 27–38

Comparative Example 16

Thirteen kinds of hydrogen-absorbing alloy as shown in the following Table 8, each having the general formula (V) of $(Mg_{1-x}M3_x)_{20-y}M4$ (wherein x is defined as 0<x<0.5; and y is defined as 0≦y<18), were charged into the test sample vessel 33. Thereafter, the first valve 37₁ was closed, and both of the second valve 37₂ and the third valve 37₃ were opened. Under this condition, the vacuum pump 35 was actuated to exhaust the air in each of the pipe 32, the branched pipe 34, the pressure accumulator 38 and the test sample vessel 33.

Then, after closing the second valve $37_2$ and the third valve $37_3$, the first valve $37_1$ was opened to supply hydrogen from the hydrogen gas cylinder 31 to each of the pipe 32, the branched pipe 34, the pressure accumulator 38 and the test sample vessel 33 thereby carrying out a hydrogen displacement of them. Subsequently, the first valve $37_1$ was closed and the amount of hydrogen thus introduced up to this moment was calculated from the pressure of the system which was indicated by the manometer 36. Then, the second valve $37_2$ was opened thereby feeding hydrogen to the test sample vessel 33, and the temperature therein was monitored by making use of the thermocouple 40. At this moment, the thermocouple 40 and the temperature controller 42 were controlled so as to keep the temperature inside the test sample vessel 33 constant. In this case, changes in pressure if any within the test sample vessel 33 were detected by means of the manometer 36 and recorded in the recorder 43.

By making use of the aforementioned evaluation apparatus, the rate of hydrogen absorption by each hydrogen-absorbing alloy at a temperature of 100° C. was measured. This hydrogen absorption rate was indicated by the amount of hydrogen (wt. %) which was absorbed in the hydrogen-absorbing alloy during a time period of one hour starting from the introduction of a predetermined amount of hydrogen into the sample vessel. Results are shown in Table 8 below.

TABLE 8

| | Hydrogen-absorbing alloy | Hydrogen absorption rate |
|---|---|---|
| Comparative Example 16 | $Mg_4Ni$ | 1.0 |
| Example 27 | $(Mg_{0.5}V_{0.5})_{20}Zn_{0.3}Ni_{0.7}$ | 7.2 |
| Example 28 | $(Mg_{0.85}Mn_{0.15})_{17}Ni_{0.9}Cu_{0.1}$ | 6.6 |
| Example 29 | $(Mg_{0.8}S_{0.2})_{7.8}Ni$ | 4.7 |
| Example 30 | $(Mg_{0.7}C_{0.3})_6Ni_{0.5}Co_{0.5}$ | 4.5 |
| Example 31 | $(Mg_{0.6}Ru_{0.4})_4Ni_{0.3}Fe_{0.7}$ | 4.0 |
| Example 32 | $(Mg_{0.9}Pt_{0.1})_5Si_{0.2}Ni_{0.8}$ | 4.2 |
| Example 33 | $(Mg_{0.5}Pd_{0.5})_8Cu$ | 5.0 |
| Example 34 | $(Mg_{0.8}Au_{0.1}Al_{0.1})_{14}Ni$ | 6.2 |
| Example 35 | $(Mg_{0.99}Mn_{0.01})_{7.8}Ni_{0.8}Fe_{0.2}$ | 4.9 |
| Example 36 | $(Mg_{0.7}Ti_{0.3})_{17}Ni_{0.3}Co_{0.7}$ | 6.5 |
| Example 37 | $(Mg_{0.9}Nb_{0.1})_{10}Ni$ | 5.3 |
| Example 38 | $(Mg_{0.8}Ag_{0.2})_8Ni_{0.8}Fe_{0.2}$ | 5.0 |

As apparent from Table 8, with the employment of hydrogen-absorbing alloys according to Examples 27 to 38 each containing an increased amount of Mg as compared with the hydrogen-absorbing alloy of Comparative Example 16, it was possible to prominently increase the amount of hydrogen absorption and to improve the hydrogen absorbing properties of the alloy.

EXAMPLES 39–50

Comparative Example 17

First of all, thirteen kinds of powdered hydrogen-absorbing alloy as shown in the following Table 9, each having the general formula (V) of $(Mg_{1-x}M3_x)_{20-y}M4$ (wherein x is defined as 0<x<0.5; and y is defined as 0≦y<18), were respectively mixed with electrolytic copper powder in the weight ratio of 1:1, and 1 g of the resultant mixture was subjected to compression for 5 minutes by applying a pressure of 10,000 kg in a tablet-molding device (inner diameter: 10 mm) thereby obtaining a pellet. This pellet was then sandwiched between Ni wire nettings, and the peripheral portion thereof was spot-welded and pressed. Subsequently, to this pressed body was connected a Ni lead wire by means of spot-welding thereby preparing thirteen different kinds of hydrogen-absorbing alloy electrodes (negative electrodes).

The hydrogen electrodes thus obtained were respectively dipped, together with a sintered nickel electrode constituting a counter electrode, into a 8N aqueous solution of potassium hydroxide, and then, a charge/discharge cycle test was performed at a temperature of 25° C. In this charge/discharge cycle test, each cycle was consisted of steps, i.e. the charging was conducted under the condition of 100 mA per 1 g of hydrogen-absorbing alloy for 10 hours, and, after a ten minute cessation, the discharge was conducted under the condition of 20 mA per 1 g of hydrogen-absorbing alloy until the voltage against the mercury oxide electrode was lowered down to −0.5V. This charge/discharge cycle was repeated to obtain a maximum discharge capacity of each negative electrode. The results of this cycle test were shown in Table 9 below.

TABLE 9

| | Hydrogen-absorbing alloy | Discharge capacity (mAh/g) |
|---|---|---|
| Comparative Example 17 | $Mg_{3.5}Ni$ | 15 |
| Example 39 | $(Mg_{0.8}Ta_{0.2})_{7.8}Cu_{0.4}Ni_{0.6}$ | 410 |
| Example 40 | $(Mg_{0.6}Os_{0.4})_9Ni_{0.5}Cu_{0.5}$ | 420 |
| Example 41 | $(Mg_{0.7}Re_{0.3})_{15}Si_{0.4}Ni_{0.6}$ | 710 |
| Example 42 | $(Mg_{0.98}Ir_{0.02})_{10}Ni_{0.6}Co_{0.4}$ | 425 |
| Example 43 | $(Mg_{0.8}Rh_{0.2})_8Ni$ | 405 |
| Example 44 | $(Mg_{0.97}C_{0.03})_3Ni_{0.2}Fe_{0.8}$ | 120 |
| Example 45 | $(Mg_{0.9}Ag_{0.1})_{14}Cu$ | 640 |
| Example 46 | $(Mg_{0.5}Al_{0.5})_{7.8}Ni$ | 420 |
| Example 47 | $(Mg_{0.94}P_{0.06})_{10}Ni_{0.6}Co_{0.4}$ | 415 |
| Example 48 | $(Mg_{0.9}In_{0.1})_8Ni$ | 390 |
| Example 49 | $(Mg_{0.8}Pt_{0.2})_5Ni$ | 180 |
| Example 50 | $(Mg_{0.8}Au_{0.2})_3Ni_{0.2}Fe_{0.8}$ | 135 |

As apparent from Table 9, the negative electrodes (Examples 39 to 50) each containing a hydrogen-absorbing alloy represented by the general formula (V) of $(Mg_{1-x}M3_x)_{20-y}M4$ and containing an increased amount of Mg as compared with the hydrogen-absorbing alloy of Comparative Example 17 were effective in increasing the amount of hydrogen absorption and in prominently improving the hydrogen absorbing properties of the alloy.

EXAMPLES 51–60

Comparative Example 18

Eleven kinds of hydrogen-absorbing alloy as shown in the following Table 10, each having the general formula (V) of $(Mg_{1-x}M3_x)_{20-y}M4$ (wherein x is defined as 0<x<0.5; and y is defined as 0≦y<18), were respectively measured of the amount of hydrogen absorption at a temperature of 25° C. by making use of the aforementioned hydrogen-absorption/desorption property-evaluating apparatus shown in FIG. 6. In this case, the amount of hydrogen absorption was indicated by the amount of hydrogen (wt. %) which was absorbed in the hydrogen-absorbing alloy during a time period of 20 hours starting from the introduction of a predetermined amount of hydrogen into the sample vessel. Results are shown in Table 10 below.

TABLE 10

| | Hydrogen-absorbing alloy | Amount of hydrogen absorption (wt %) |
|---|---|---|
| Comparative Example 18 | $Mg_{3.2}Ni$ | 0.5 |
| Example 51 | $(Mg_{0.9}Y_{0.1})_{7.8}Zn_{0.1}Ni_{0.9}$ | 4.8 |
| Example 52 | $(Mg_{0.7}Sc_{0.3})_5Cu_{0.8}Ni_{0.2}$ | 4.2 |
| Example 53 | $(Mg_{0.6}La_{0.4})_3Ni_{0.5}Co_{0.5}$ | 3.1 |
| Example 54 | $(Mg_{0.6}Hf_{0.2}Pt_{0.2})_4Fe$ | 4.0 |
| Example 55 | $(Mg_{0.5}Zr_{0.5})_{10}Cu_{0.5}Ni_{0.5}$ | 5.3 |
| Example 56 | $(Mg_{0.8}Pb_{0.2})_5Ni$ | 4.2 |
| Example 57 | $(Mg_{0.9}Y_{0.1})_8Sn_{0.4}Ni_{0.6}$ | 5.0 |
| Example 58 | $(Mg_{0.4}In_{0.4}W_{0.2})_{7.8}Ni$ | 4.8 |
| Example 59 | $(Mg_{0.7}La_{0.3})_{17}Cu_{0.3}Ni_{0.7}$ | 6.6 |
| Example 60 | $(Mg_{0.9}Tl_{0.1})_9Si_{0.05}Co_{0.95}$ | 5.0 |

As apparent from Table 10, with the employment of hydrogen-absorbing alloys according to Examples 51 to 60 each containing an increased amount of Mg as compared with the hydrogen-absorbing alloy of Comparative Example 18, it was possible to prominently increase the amount of hydrogen absorption and to improve the hydrogen absorbing properties of the alloy.

EXAMPLES 61–71

Comparative Example 19

First of all, twelve kinds of powdered hydrogen-absorbing alloy as shown in the following Table 11, each having the general formula (V) of $(Mg_{1-x}M3_x)_{20-y}M4$ (wherein x is defined as $0<x<0.5$; and y is defined as $0 \leq y<18$), were respectively mixed with electrolytic copper powder in the weight ratio of 1:1, and 1 g of the resultant mixture was subjected to compression for 5 minutes by applying a pressure of 10,000 kg in a tablet-molding device (inner diameter: 10 mm) thereby obtaining a pellet. This pellet was then sandwiched between Ni wire nettings, and the peripheral portion thereof was spot-welded and pressed. Subsequently, to this pressed body was connected a Ni lead wire by means of spot-welding thereby preparing twelve different kinds of hydrogen-absorbing alloy electrodes (negative electrodes).

The hydrogen electrodes thus obtained were respectively dipped, together with a sintered nickel electrode constituting a counter electrode, into a 8N aqueous solution of potassium hydroxide, and then, a charge/discharge cycle test was performed at a temperature of 25° C. In this charge/discharge cycle test, each cycle was consisted of steps, i.e. the charging was conducted under the condition of 100 mA per 1 g of hydrogen-absorbing alloy for 10 hours, and, after a ten minute cessation, the discharge was conducted under the condition of 20 mA per 1 g of hydrogen-absorbing alloy until the voltage against the mercury oxide electrode was lowered down to −0.5V. This charge/discharge cycle was repeated to obtain a maximum discharge capacity of each negative electrode. The results of this cycle test were shown in Table 11 below.

TABLE 11

| | Hydrogen-absorbing alloy | Discharge capcity (mAh/g) |
|---|---|---|
| Comparative Example 19 | $Mg_{4.0}Ni$ | 25 |
| Example 61 | $(Mg_{0.9}Ce_{0.1})_8Zn_{0.3}Ni_{0.7}$ | 420 |
| Example 62 | $(Mg_{0.85}La_{0.05}C_{0.1})_{13}Fe$ | 510 |
| Example 63 | $(Mg_{0.7}Pr_{0.3})_{7.8}Ni$ | 410 |
| Example 64 | $(Mg_{0.25}Zr_{0.4}Mo_{0.35})_3Ni$ | 125 |
| Example 65 | $(Mg_{0.8}Sm_{0.2})_5Si_{0.3}Cu_{0.7}$ | 200 |
| Example 66 | $(Mg_{0.5}Y_{0.4}Al_{0.1})_4Co$ | 180 |
| Example 67 | $(Mg_{0.9}Zr_{0.1})_9Si_{0.2}Ni_{0.8}$ | 390 |
| Example 68 | $(Mg_{0.8}In_{0.2})_{7.8}Zn_{0.4}Cu_{0.6}$ | 370 |
| Example 69 | $(Mg_{0.99}Hf_{0.01})_3Sn_{0.2}Ni_{0.8}$ | 110 |
| Example 70 | $(Mg_{0.8}Hf_{0.2})_4Ni$ | 175 |
| Example 71 | $(Mg_{0.8}Y_{0.2})_8Cu_{0.5}Ni_{0.5}$ | 390 |

As apparent from Table 11, the negative electrodes (Examples 61 to 71) each containing a hydrogen-absorbing alloy represented by the general formula (V) of $(Mg_{1-x}M3_x)_{20-y}M4$ and containing an increased amount of Mg as compared with the hydrogen-absorbing alloy of Comparative Example 19 were effective in increasing the amount of hydrogen absorption and in prominently improving the hydrogen absorbing properties of the alloy.

EXAMPLES 72–74

Three kinds of hydrogen-absorbing alloy as shown in the following Table 12, each having the general formula (VI) of $(Mg_{1-x}M5_x)_{20-y}M6$ (wherein x is defined as $0<x<0.5$; and y is defined as $0 \leq y<18$), were respectively measured of the amount of hydrogen absorption at a temperature of 25° C. by making use of the aforementioned hydrogen-absorption/desorption property-evaluating apparatus shown in FIG. 6. In this case, the amount of hydrogen absorption was indicated by the amount of hydrogen (wt. %) which was absorbed in the hydrogen-absorbing alloy during a time period of 20 hours starting from the introduction of a predetermined amount of hydrogen into the sample vessel. Results are shown in Table 12.

Furthermore, the aforementioned powdered hydrogen-absorbing alloys were respectively mixed with electrolytic copper powder in the weight ratio of 1:1, and 1 g of the resultant mixture was subjected to compression for 5 minutes by applying a pressure of 10,000 kg in a tablet-molding device (inner diameter: 10 mm) thereby obtaining a pellet. This pellet was then sandwiched between Ni wire nettings, and the peripheral portion thereof was spot-welded and pressed. Subsequently, to this pressed body was connected a Ni lead wire by means of spot-welding thereby preparing three different kinds of hydrogen-absorbing alloy electrodes (negative electrodes).

The hydrogen electrodes thus obtained were respectively dipped, together with a sintered nickel electrode constituting a counter electrode, into a 8N aqueous solution of potassium hydroxide, and then, a charge/discharge cycle test was performed at a temperature of 25° C. In this charge/discharge cycle test, each cycle was consisted of steps, i.e. the charging was conducted under the condition of 100 mA per 1 g of hydrogen-absorbing alloy for 10 hours, and, after a ten minute cessation, the discharge was conducted under the condition of 20 mA per 1 g of hydrogen-absorbing alloy until the voltage against the mercury oxide electrode was lowered down to −0.5V. This charge/discharge cycle was repeated to obtain a maximum discharge capacity of each negative electrode. The results of this cycle test were shown in Table 12 below.

modified were investigated of their hydrogen-absorbing properties using aforementioned hydrogen-absorption/desorption property-evaluating apparatus shown in FIG. 6. This measurement was conducted by monitoring the pressure change in the reaction vessel when a predetermined volume of hydrogen was introduced into the reaction vessel.

Specifically, first of all, each of these hydrogen-absorbing alloy s was charged into the test sample vessel 33. Thereafter, the first valve $37_1$ was closed, and both of the second valve $37_2$ and the third valve $37_3$ were opened. Under this condition, the vacuum pump 35 was actuated to exhaust the air in each of the pipe 32, the branched pipe 34, the pressure accumulator 38 and the test sample vessel 33. Then, after closing the second valve $37_2$ and the third valve $37_3$, the first valve $37_1$ was opened to supply hydrogen from the hydrogen gas cylinder 31 to each of the pipe 32, the branched pipe 34, the pressure accumulator 38 and the test sample vessel 33 thereby carrying out a hydrogen displacement of them. Subsequently, the first valve $37_1$ was closed and at the same time, the amount of hydrogen introduced was calculated from the pressures indicated by the manometer 36. Thereafter, the second valve $37_2$ was opened thereby feeding hydrogen to the test sample vessel 33, and the

TABLE 12

| | Hydrogen-absorbing alloy | Amount of hydrogen absorption (wt %) | Discharge capacity (mAh/g) |
| --- | --- | --- | --- |
| Example 72 | $(Mg_{0.85}Ca_{0.15})_{16}Ni_{0.8}Cu_{0.2}$ | 6.4 | 650 |
| Example 73 | $(Mg_{0.7}Ca_{0.3})_{15}Fe_{0.3}Co_{0.7}$ | 6.0 | 720 |
| Example 74 | $(Mg_{0.8}Sr_{0.2})_{11}Co_{0.05}Cu_{0.95}$ | 5.5 | 580 |

As apparent from Table 12, the hydrogen-absorbing alloys according to Examples 72 to 74, where the Mg site in the alloy was substituted by M5 or an element which has 1 to 1.5 times as high atomic radius as that of Mg (excluding elements which are more electro-negative than Mg), and where at least one element selected from Ni, Fe, Co, Cu, Zn, Sn and Si was employed as M6 exhibited a prominent increase in hydrogen absorption and an improved hydrogen absorbing properties.

It can be also understood that negative electrodes containing the aforementioned hydrogen absorbing alloy are capable of increasing the discharge capacity and prominently improving the charge/discharge characteristics thereof, respectively.

EXAMPLE 75

A hydrogen-absorbing alloy comprising $Mg_2Ni$ was introduced into a round bottom flask provided therein with a rotator, and attached thereto with a dropping funnel and a cooling pipe. Then, the interior of the flask was evacuated by means of a vacuum pump and, after being head-dried with a heating gun, displaced by argon gas. Subsequently, THF was introduced into the flask while allowing the argon gas to flow into the flask, and 1-bromo-3-ethane was slowly dripped under stirring into the flask via the dropping funnel, thereby allowing the hydrogen-absorbing alloy to react with 1-bromo-3-ethane. Upon finishing the dripping, the stirring was suspended thereby allowing the hydrogen-absorbing alloy to settle, and then this settled hydrogen-absorbing alloy was filtered to obtain a surface-modified hydrogen-absorbing alloy.

This surface-modified hydrogen-absorbing alloy as well as a hydrogen-absorbing alloy which was not surface-temperature thereof was monitored with the thermocouple 40. At this moment, the thermocouple 40 and the temperature controller 42 were controlled so as to keep the temperature inside the test sample vessel 33 constant. At this moment, a change in pressure if any within the test sample vessel 33 was detected by means of the manometer 36 and recorded in the recorder 43. The pressure changes (a decrease in temperature resulting from the hydrogen absorption by the hydrogen-absorbing alloy) due to the hydrogen absorption at 25° C. by the $Mg_2Ni$ hydrogen-absorbing alloy before and after the surface modification are shown in FIG. 9.

As apparent from FIG. 9, in the case of the $Mg_2Ni$ hydrogen-absorbing alloy which was not surface-modified, any substantial pressure change was not recognized even if a predetermined hydrogen pressure was applied thereto, thus maintaining a constant pressure. Meanwhile, in the case of the Mg2Ni hydrogen-absorbing alloy which was surface-modified, the internal pressure thereof was abruptly altered by the application of the hydrogen pressure, thus making it possible to confirm a large amount of hydrogen being absorbed therein. Moreover, it is possible to lower the hydrogen-absorbing temperature as compared with the conventional hydrogen-absorbing alloy by about 200° C. Namely, in the case of the conventional $Mg_2Ni$ hydrogen-absorbing alloy, the hydrogen-absorption/desorption reaction would not be occurred or would be very slow if occurred unless the temperature is relatively high (200° C. to 300° C.). by contrast, with the employment of the hydrogen-absorbing alloy which has been surface-modified as in Example 75, it has been made possible to carry out the hydrogen-absorption/desorption reaction at around room temperature.

EXAMPLES 76–106

The hydrogen-absorbing alloys having compositions as shown in following Tables 13 to 15 were subjected to a surface-modification in the same manner as in the case of Example 75 to investigate changes in their hydrogen-absorbing properties before and after the surface modification. In this evaluation, aforementioned hydrogen-absorption/desorption property-evaluating apparatus shown in FIG. 6 was employed. The results are shown in the following Tables 13 to 15. In these Tables, the symbol of X indicates the number of hydrogen, i.e., MHx absorbed in the hydrogen-absorbing alloy.

TABLE 13

|  | Hydrogen-absorbing alloys | X (Before treatment) | X (After treatment) |
|---|---|---|---|
| Example 75 | $Mg_2Ni$ | 0 | 3.0 |
| Example 76 | $Mg_2Cu$ | 0 | 2.0 |
| Example 77 | $Mg_2Co$ | 0 | 3.5 |
| Example 78 | $Mg_2Fe$ | 0 | 4.0 |
| Example 79 | $LaNi_5$ | 0.1 | 6.0 |
| Example 80 | $MmNi_5$ | 0 | 3.0 |
| Example 81 | $CaNi_5$ | 0 | 4.0 |
| Example 82 | TiFe | 0.1 | 0.5 |
| Example 83 | TiCo | 0 | 0.5 |
| Example 84 | $ZrMn_2$ | 0.1 | 3.0 |
| Example 85 | $ZrNi_2$ | 0.1 | 3.0 |

TABLE 14

|  | Hydrogen-absorbing alloys | X (Before treatment) | X (After treatment) |
|---|---|---|---|
| Example 86 | $Mg_2Ni_{0.8}Co_{0.2}$ | 0 | 2.3 |
| Example 87 | $Mg_2Ni_{0.9}Co_{0.2}$ | 0 | 2.9 |
| Example 88 | $Mg_{2.1}Ni_{1.8}Fe_{0.1}$ | 0 | 3.0 |
| Example 89 | $Mg_2Ni_{0.7}Mo_{0.2}Rh_{0.2}$ | 0 | 3.1 |
| Example 90 | $Mg_{1.8}Zr_{0.2}Ni$ | 0 | 2.5 |
| Example 91 | $Mg_{1.3}Y_{0.5}Ni$ | 0 | 2.0 |
| Example 92 | $Mg_2Ir_{0.1}Ni$ | 0 | 2.4 |
| Example 93 | $Mg_{1.9}Al_{0.1}Ni_{0.9}Mn_{0.2}$ | 0 | 3.5 |
| Example 94 | $Mg_2Cu_{0.5}Cd_{0.5}$ | 0 | 1.6 |
| Example 95 | $Mg_2Cu_{0.8}Pd_{0.4}$ | 0 | 2.0 |

TABLE 15

|  | Hydrogen-absorbing alloy | X (Before treatment) | X (After treatment) |
|---|---|---|---|
| Example 96 | $Mg_2Ti_{0.1}Ni$ | 0 | 2.3 |
| Example 97 | $Mg_2Nb_{0.1}Ni_{1.2}$ | 0 | 3.1 |
| Example 98 | $Mg_2Ta_{0.1}Ni_{1.8}$ | 0 | 2.8 |
| Example 99 | $LaAl_{0.3}Ni_{3.8}Mn_{0.4}Co_{0.5}$ | 0.5 | 5.0 |
| Example 100 | $NmAl_{0.6}Ni_{3.7}Mn_{0.3}Zr_{0.4}$ | 1.0 | 5.0 |
| Example 101 | $CaAl_{0.4}Ni_{4.0}Mn_{0.5}Si_{0.1}$ | 0.7 | 4.5 |
| Example 102 | $TiFe_{0.4}Mn_{0.5}$ | 0.2 | 2.1 |
| Example 103 | $TiNn_{1.6}Co_{0.1}$ | 0 | 2.6 |
| Example 104 | $ZrCo_{1.1}Mn_{1.3}$ | 0.2 | 3.0 |
| Example 105 | $Zr_{0.6}Ti_{0.4}V_{0.6}Ni_{1.1}Mn_{0.2}$ | 0.1 | 3.5 |
| Example 106 | $ZrMn_{0.6}V_{0.2}Ni_{1.5}Co_{0.1}$ | 0.2 | 3.1 |

As apparent from theses Tables 13 to 15, when a hydrogen-absorbing alloy is surface-modified, the surface thereof is activated so that the hydrogen-absorbing property of the alloy can be improved.

EXAMPLE 107

A $Mg_2Ni$ hydrogen-absorbing alloy was introduced together with stainless steel balls into a stainless steel vessel provided with a double cap. Thereafter, the vessel was filled with an argon atmosphere which has been conditioned to contain 1 ppm or less of oxygen and 0.5 ppm or less of water content. After being sealed with an O-ring, the vessel was subjected to a ball-milling treatment (a mechanical treatment) for 100 hours, the rotational speed thereof being 200 rpm.

This mechanically treated hydrogen-absorbing alloy as well as a hydrogen-absorbing alloy which was not mechanically treated were investigated of their hydrogen-absorbing properties using aforementioned hydrogen-absorption/desorption property-evaluating apparatus shown in FIG. 6. This measurement was conducted by monitoring the pressure change in the reaction vessel when a predetermined volume of hydrogen was introduced into the reaction vessel.

Specifically, first of all, each of these hydrogen-absorbing alloys was charged into the test sample vessel 33. Thereafter, the first valve $37_1$ was closed, and both of the second valve $37_2$ and the third valve $37_3$ were opened. Under this condition, the vacuum pump 35 was actuated to exhaust the air in each of the pipe 32, the branched pipe 34, the pressure accumulator 38 and the test sample vessel 33. Then, after closing the second valve $37_2$ and the third valve $37_3$, the first valve $37_1$ was opened to supply hydrogen from the hydrogen gas cylinder 31 to each of the pipe 32, the branched pipe 34, the pressure accumulator 38 and the test sample vessel 33 thereby carrying out a hydrogen displacement of them. Subsequently, the first valve $37_1$ was closed and at the same time, the amount of hydrogen introduced was calculated from the pressures indicated by the manometer 36. Thereafter, the second valve $37_2$ was opened thereby feeling hydrogen to the test sample vessel 33, and the temperature thereof was monitored with the thermocouple 40. At this moment, the thermocouple 40 and the temperature controller 42 were controlled so as to keep the temperature inside the test sample vessel 33 constant. At this moment, a change in pressure if any within the test sample vessel 33 was detected by means of the manometer 36 and recorded in the recorder 43.

The hydrogen absorption property at 25° C. of the hydrogen-absorbing alloy particles before and after the mechanical treatment are shown in Table 16 below.

EXAMPLE 108

0.5 mol of $Mg_2Ni$ hydrogen-absorbing alloy and 0.5 mol of Ni powder to be functioned as a catalyst seed were mixed and the resultant mixture was introduced together with stainless steel balls into a stainless steel vessel provided with a double cap. Thereafter, the vessel was filled with an argon atmosphere which has been conditioned to contain 1 ppm or less of oxygen and 0.5 ppm or less of water content. After being sealed with an O-ring, the vessel was subjected to a ball-milling treatment (a mechanical treatment) for 100 hours, the rotational speed thereof being 200 rpm.

This mechanically treated $Mg_2Ni$ hydrogen-absorbing alloy as well as a $Mg_2Ni$ hydrogen-absorbing alloy which was not mechanically treated were investigated of their hydrogen-absorbing properties using afore-mentioned hydrogen-absorption/desorption property-evaluating apparatus shown in FIG. 6. The hydrogen absorption property at 25° C. of the hydrogen-absorbing alloy is shown in Table 16 below.

EXAMPLES 109–150

The hydrogen-absorbing alloys having compositions as shown in following Tables 16 to 19 were subjected to a mechanical treatment in the same manner as in the case of Example 107 to investigate changes in their hydrogen-absorbing properties before and after the surface modification. In this evaluation, afore-mentioned hydrogen-absorption/desorption property-evaluating apparatus shown in FIG. 6 was employed. The results are shown in the following Tables 16 to 19. In these Tables, the symbol of X indicates the number of hydrogen i.e., MHx absorbed in the hydrogen-absorbing alloy.

TABLE 16

|  | Hydrogen-absorbing alloys | X (Before treatment) | X (After treatment) |
|---|---|---|---|
| Example 107 | $Mg_2Ni$ | 0 | 3.0 |
| Example 108 | $Mg_2Ni$ (Ni mixed) | 0 | 3.5 |
| Example 109 | $Mg_2Cu$ | 0 | 2.5 |
| Example 110 | $Mg_2Co$ | 0 | 3.8 |
| Example 111 | $Mg_2Fe$ | 0 | 4.4 |
| Example 112 | $LaNi_5$ | 0.1 | 6.0 |
| Example 113 | $MmNi_5$ | 0 | 3.5 |
| Example 114 | $CaNi_5$ | 0 | 4.5 |
| Example 115 | TiFe | 0.1 | 1.6 |
| Example 116 | TiCo | 0 | 1.8 |
| Example 117 | $ZrNi_2$ | 0.1 | 3.2 |
| Example 118 | $ZrNi_2$ | 0.1 | 3.6 |

TABLE 17

|  | Hydrogen-absorbing alloys | X (Before treatment) | X (After treatment) |
|---|---|---|---|
| Example 119 | $Mg_2Ni_{0.7}Cu_{0.3}$ | 0 | 2.9 |
| Example 120 | $Mg_2Ni_{0.9}Co_{0.2}$ | 0 | 3.4 |
| Example 121 | $Mg_2Ni_{0.8}Fe_{0.1}$ | 0 | 3.5 |
| Example 122 | $Mg_2Ni_{0.7}Rh_{0.2}Ru_{0.2}$ | 0 | 3.7 |
| Example 123 | $Mg_{1.9}Zr_{0.1}Ni$ | 0 | 3.0 |
| Example 124 | $Mg_{1.8}Cr_{0.1}Ni$ | 0 | 2.6 |
| Example 125 | $Mg_2Mo_{0.1}Ni$ | 0 | 2.4 |
| Example 126 | $Mg_{1.9}V_{0.1}Ni_{0.9}Mn_{0.2}$ | 0 | 3.4 |
| Example 127 | $Mg_2Cu_{0.5}W_{0.5}$ | 0 | 1.6 |
| Example 128 | $Mg_2Cu_{0.7}Cd_{0.4}$ | 0 | 2.0 |

TABLE 18

|  | Hydrogen-absorbing alloy | X (Before treatment) | X (After treatment) |
|---|---|---|---|
| Example 129 | $Mg_2Y_{0.1}Ni_{1.1}$ | 0 | 2.3 |
| Example 130 | $Mg_2Ir_{0.1}Ni_{1.5}$ | 0 | 3.1 |
| Example 131 | $Mg_2Pt_{0.1}N_{1.9}$ | 0 | 2.8 |
| Example 132 | $LaAl_{0.3}Ni_{3.5}Mn_{0.4}Co_{0.7}$ | 0.5 | 6.0 |
| Example 133 | $MmAl_{0.3}Ni_{4.1}Mn_{0.3}Co_{0.3}$ | 1.0 | 6.0 |
| Example 134 | $CaAl_{0.3}Ni_{4.3}Mn_{0.4}$ | 0.6 | 5.5 |
| Example 135 | $TiFe_{0.6}Mn_{0.3}$ | 0.3 | 2.1 |
| Example 136 | $TiMn_{0.6}Co_{0.4}$ | 0 | 2.5 |
| Example 137 | $ZrCo_{0.9}Mn_{1.1}$ | 0.1 | 3.5 |
| Example 138 | $Zr_{0.5}Ti_{0.5}V_{0.7}Ni_{1.3}$ | 0.2 | 3.9 |
| Example 139 | $ZrMn_{0.5}V_{0.3}Ni_{1.5}$ | 0.1 | 3.4 |

TABLE 19

|  | Hydrogen-absorbing alloy | X (Before treatment) | X (After treatment) |
|---|---|---|---|
| Example 140 | $(Mg_{0.8}Al_{0.2})_3Ni$ | 0 | 2.0 |
| Example 141 | $(Mg_{0.6}V_{0.4})_8Fe_{0.7}Cu_{0.3}$ | 0 | 2.6 |
| Example 142 | $(Mg_{0.5}Ba_{0.25}Cr_{0.25})_{10}Co$ | 0 | 3.1 |
| Example 143 | $(Mg_{0.9}Mn_{0.05}Ti_{0.05})_4Si_{0.6}Zn_{0.4}$ | 0 | 2.8 |
| Example 144 | $(Mg_{0.7}Mo_{0.3})_5Cu_{0.8}Ni_{0.2}$ | 0 | 2.5 |
| Example 145 | $(Mg_{0.8}Ca_{0.2})_{11}Ni$ | 0 | 2.2 |
| Example 146 | $(Mg_{0.5}Sr_{0.5})_6Co_{0.5}Fe_{0.5}$ | 0 | 3.0 |
| Example 147 | $(Mg_{0.7}Li_{0.3})_7Zn_{0.5}Ni_{0.5}$ | 0 | 2.1 |
| Example 148 | $(Mg_{0.8}La_{0.1}Y_{0.1})_{15}Cu$ | 0 | 2.9 |

TABLE 19-continued

|  | Hydrogen-absorbing alloy | X (Before treatment) | X (After treatment) |
|---|---|---|---|
| Example 149 | $(Mg_{0.8}Na_{0.05}K_{0.15})_9Ni_{0.9}Cu_{0.1}$ | 0 | 3.2 |
| Example 150 | $(Mg_{0.6}Sr_{0.2}La_{0.2})_{13}Ni_{0.8}Cu_{0.2}Co_{0.2}$ | 0 | 2.9 |

As apparent from these Tables 16 to 19, when a hydrogen-absorbing alloy is mechanically treated, the surface thereof is activated so that the hydrogen-absorbing property of the alloy can be improved.

EXAMPLE 151

The hydrogen-absorbing alloy powders obtained from Example 108 and electrolytic copper powders were mixed in the ratio of 1:1, and 1 g of the resultant mixture was subjected to compression for 3 minutes by applying a pressure of 20 tons in a table-molding device (inner diameter: 10 mm) thereby obtaining a pellet. This pellet was then interposed between Ni wire nettings, and the peripheral portion thereof was spot-welded and pressed. Subsequently, to this pressed body was connected Ni lead wires by means of spot-welding thereby preparing a hydrogen-absorbing alloy electrode (a negative electrode).

Comparative Example 20

A hydrogen-absorbing alloy electrode (a negative electrode) was prepared in the same manner as explained in Example 151 except that a $Mg_2Ni$ hydrogen-absorbing alloy which was not subjected to the mechanical treatment was used as a raw material.

The negative electrodes of Example 151 and Comparative Example 20 were dipped into a 8N aqueous solution of potassium hydroxide together with counter electrodes (sintered nickel electrodes), and then, a charge/discharge cycle test was performed at a temperature of 25° C. In this charge/discharge cycle test, the charging was conducted using a current of 100 mA per 1 g of hydrogen-absorbing alloy for 10 hours, and after a cessation of 10 minutes, the discharge was conducted using a current of 100 mA per 1 g of hydrogen-absorbing alloy until the voltage against the mercury oxide electrode was lowered down to −0.5V. This charge/discharge cycle was repeated. The result of this charge/discharge cycle is shown in FIG. 10. In this FIG. 10, the symbol A indicates a charge/discharge property line of Comparative Example 20 employing a negative electrode which was not mechanically treated, while the symbol B indicates a charge/discharge property line of Example 151 employing a negative electrode which was mechanically treated.

As apparent from FIG. 10, in the case of Comparative Example 20 (charge/discharge property line A), it was impossible to carry out the charge/discharge at normal temperature, indicating no discharge capacity. By contrast, in the case of Example 151 (charge/discharge property line B), a discharge capacity of 750 mAh/g was indicated from the first cycle, thus making it clear that it is possible, through this mechanical treatment, to prominently increase the discharge capacity. Therefore, it can be said that the mechanical treatment is an effective way to prominently improve the discharge property of a battery provided with a negative electrode containing a hydrogen-absorbing alloy.

EXAMPLES 152–155

Comparative Example 20

A $Mg_2Ni$ hydrogen-absorbing alloy was introduced together with stainless steel balls into a stainless steel vessel provided with a double cap. Thereafter, the vessel was filled with an argon atmosphere which has been conditioned to contain 1 ppm or less of oxygen and 0.5 ppm or less of water content. After being sealed with an O-ring, the vessel was subjected to a ball-milling treatment (a mechanical treatment) for 2 hours, 50 hours, 200 hours and 800 hours respectively with the rotational speed thereof being controlled to 200 rpm, thereby obtaining four kinds of surface-modified hydrogen-absorbing alloy powders.

This mechanically treated hydrogen-absorbing alloy as well as a hydrogen-absorbing alloy which was not mechanically treated were employed to prepare a hydrogen-absorbing alloy electrode (a negative electrode) in the same manner as explained in Example 151. These negative electrodes were dipped into a 8N aqueous solution of potassium hydroxide together with counter electrodes (sintered nickel electrodes), and then, a charge/discharge cycle test was performed at a temperature of 25° C. In this charge/discharge cycle test, the charging was conducted in the same manner as explained in Example 151, and the maximum discharge capacity thereof were measured. The result of this charge/discharge cycle is shown in Table 20. In this Table 20, an average particle diameter of each of these hydrogen-absorbing alloy powders and a hydrogen-absorbing alloy powder used Comparative Example 20 is also indicated.

TABLE 20

| | Treatment time (h) | Average particle diameter (μm) | Discharge capacity (mAh/g) |
|---|---|---|---|
| Comparative Example 20 | 0 | 80 | 0 |
| Example 152 | 2 | 20 | 115 |
| Example 153 | 50 | 6 | 523 |
| Example 154 | 200 | 2 | 617 |
| Example 155 | 800 | 1 | 658 |

As apparent from Table 20, with the increase of the mechanical treatment time, the average particle diameter of the hydrogen-absorbing alloy was proportionally minimized, thereby making it possible to increase the discharge capacity.

EXAMPLES 156–162

Comparative Example 20

A $Mg_2Ni$ hydrogen-absorbing alloy was introduced together with stainless steel balls into a stainless steel vessel provided with a double cap. Thereafter, the vessel was filled with an argon atmosphere which has been conditioned to contain 1 ppm or less of oxygen and 0.5 ppm or less of water content. After being sealed with an O-ring, the vessel was subjected to a ball-milling treatment (a mechanical treatment) for 3 hours, 40 hours, 300 hours, 650 hours, 800 hours, 900 hours and 1000 hours respectively with the rotational speed thereof being controlled to 200 rpm, thereby obtaining four kinds of surface-modified hydrogen-absorbing alloy powders.

This mechanically treated hydrogen-absorbing alloy as well as a hydrogen-absorbing alloy which was not mechanically treated were employed to prepare a hydrogen-absorbing alloy electrode (a negative electrode) in the same manner as explained in Example 151. These negative electrodes were dipped into a 8N aqueous solution of potassium hydroxide together with counter electrodes (sintered nickel electrodes), and then, a charge/discharge cycle test was performed at a temperature of 25° C. In this charge/discharge cycle test, the charging was conducted in the same manner as explained in Example 151, and the maximum discharge capacity thereof were measured. The result of this charge/discharge cycle is shown in Table 21. In this Table 21, a value of $\Delta(2\theta_2)$ (a half-width of at least one peak out of peaks of three strongest lines to be obtained by an X-ray diffraction using Cuk$\alpha$-ray as a radiation source) of the hydrogen-absorbing alloy used Examples 156 to 162 and Comparative Example 20 is also indicated.

TABLE 21

| | Treatment time (h) | $\Delta(2\theta_2)$ (°) | Discharge capacity (mAh/g) |
|---|---|---|---|
| Comparative Example 20 | 0 | 0.1 | 0 |
| Example 156 | 3 | 0.5 | 142 |
| Example 157 | 40 | 1.2 | 503 |
| Example 158 | 300 | 3.4 | 631 |
| Example 159 | 650 | 5.1 | 649 |
| Example 160 | 800 | 9.5 | 653 |
| Example 161 | 900 | 25.1 | 630 |
| Example 162 | 1000 | 41.3 | 535 |

As apparent from Table 21, with the increase of the mechanical treatment time, the crystal grain size of the hydrogen-absorbing alloy particles was proportionally minimized and at the same time, the value of $\Delta(2\theta_2)$ was increased, thereby making it possible to increase the discharge capacity.

EXAMPLES 163–167

Comparative Example 20

A $Mg_2Ni$ hydrogen-absorbing alloy was introduced together with stainless steel balls into a stainless steel vessel provided with a double cap. Thereafter, the vessel was filled with an argon atmosphere which has been conditioned to contain 1 ppm or less of oxygen and 0.5 ppm or less of water content. After being sealed with an O-ring, the vessel was subjected to a ball-milling treatment 8a mechanical treatment) for 0.5 hours, 2.5 hours, 15 hours, 250 hours and 700 hours respectively with the rotational speed thereof being controlled to 200 rpm, thereby obtaining five kinds of surface-modified hydrogen-absorbing alloy powders.

This mechanically treated hydrogen-absorbing alloy as well as a hydrogen-absorbing alloy which was not mechanically treated were employed to prepare a hydrogen-absorbing alloy electrode (a negative electrode) in the same manner as explained in Example 151. These negative electrodes were dipped into a 8N aqueous solution of potassium hydroxide together with counter electrodes (sintered nickel electrodes), and then, a charge/discharge cycle test was performed at a temperature of 25° C. In this charge/discharge cycle test, the charging was conducted in the same manner as explained in Example 151, and the maximum discharge capacity thereof were measured. The result of this charge/discharge cycle is shown in Table 22. In this Table 22, the size of crystal grain of each of these hydrogen-absorbing alloy powders used Examples 163 to 167 and Comparative Example 20 is also indicated.

TABLE 22

|  | Treatment time (h) | Size of crystallite (nm) | Discharge capacity (mAh/g) |
| --- | --- | --- | --- |
| Comparative Example 20 | 0 | 111.5 | 0 |
| Example 163 | 0.5 | 56.2 | 13 |
| Example 164 | 2.5 | 37.5 | 124 |
| Example 165 | 15 | 23.2 | 323 |
| Example 166 | 250 | 5.1 | 626 |
| Example 167 | 700 | 2.2 | 651 |

As apparent from Table 22, with the increase of the mechanical treatment time, the size of crystal grain of the hydrogen-absorbing alloy was proportionally minimized, thereby making it possible to increase the discharge capacity.

EXAMPLES 168–172

Comparative Examples 21 and 22

A $Mg_2Ni$ hydrogen-absorbing alloy was introduced together with stainless steel balls into a stainless steel vessel provided with a double cap. Thereafter, the vessel was filled with seven kinds of atmosphere, i.e., vacuum, an inert gas (argon, nitrogen or helium), hydrogen, oxygen and air. After being sealed with an O-ring, the vessel was subjected to a ball-milling treatment (a mechanical treatment) for 100 hours with the rotational speed thereof being controlled to 200 rpm, thereby obtaining seven kinds of surface-modified hydrogen-absorbing alloy powders.

These mechanically treated hydrogen-absorbing alloys were employed to prepare a hydrogen-absorbing alloy electrode (a negative electrode) in the same manner as explained in Example 151. These negative electrodes were dipped into a 8N aqueous solution of potassium hydroxide together with counter electrodes (sintered nickel electrodes), and then, a charge/discharge cycle test was performed at a temperature of 25° C. in the same manner as explained in Example 151, and the maximum discharge capacity thereof were measured. The result of this charge/discharge cycle is shown in Table 23.

TABLE 23

|  | Treatment atmosphere | Discharge capacity (mAh/g) |
| --- | --- | --- |
| Example 168 | Argon (99.999%) | 605 |
| Example 169 | Vacuum | 402 |
| Example 170 | Nitrogen (99.999%) | 513 |
| Example 171 | Helium (99.999%) | 526 |
| Example 172 | Hydrogen (99.99999%) | 650 |
| Comparative Example 21 | Oxygen (99.999%) | 0 |
| Comparative Example 22 | Air | 0 |

As apparent from Examples 168 to 172 of Table 23, it is desirable to perform the mechanical treatment in vacuum atmosphere or in an atmosphere of an inert gas or hydrogen. It is possible to increase the discharge capacity if the mechanical treatment is performed in such a preferable atmosphere.

EXAMPLES 173–219

Comparative Example: 20

The hydrogen-absorbing alloys having compositions as shown in following Tables 24 to 27 were subjected to a mechanical treatment under various conditions thereby effecting a surface treatment.

These mechanically treated hydrogen-absorbing alloys were employed to prepare negative electrodes comprising these hydrogen-absorbing alloys in the same manner as explained in Example 151. Then, these negative electrodes were dipped into a 8N aqueous solution of potassium hydroxide together with counter electrodes (sintered nickel electrodes), and then, a charge/discharge cycle test was performed at a temperature of 25° C. in the same manner as explained in Example 151, and the maximum discharge capacity thereof were measured. The results are shown in Table 24 to 27. In these Tables 24 to 27, the maximum discharge capacity of Comparative Example 20 is also indicated.

TABLE 24

|  | Alloy having hydrogen-absorbing properties | Additive | Treatment time (h) | Discharge capacity (mAh/g) |
| --- | --- | --- | --- | --- |
| Comparative Example 20 | $Mg_2Ni$ | — | — | 0 |
| Example 173 | $Mg_2Ni$ | Ni | 100 | 751 |
| Example 174 | $Mg_2Ni$ | — | 1 | 78 |
| Example 175 | $Mg_2Ni$ | — | 25 | 452 |
| Example 176 | $Mg_2Ni$ | — | 100 | 605 |
| Example 177 | $Mg_2Ni$ | Ni | 500 | 825 |
| Example 178 | $Mg_2Ni$ | Co | 100 | 752 |
| Example 179 | $Mg_2Ni$ | Fe | 100 | 703 |
| Example 180 | $Mg_2Ni$ | $WCO_3$ | 100 | 642 |
| Example 181 | $Mg_2Ni$ | $IrO_2$ | 100 | 750 |
| Example 182 | $Mg_2Cu$ | Cu | 100 | 502 |

TABLE 25

|  | Alloy having hydrogen-absorbing properties | Additive | Treatment time (h) | Discharge capacity (mAh/g) |
| --- | --- | --- | --- | --- |
| Example 183 | $Mg_2Co$ | CO | 100 | 712 |
| Example 184 | $Mg_2Fe$ | Fe | 100 | 745 |
| Example 185 | $LaNi_5$ | — | — | 274 |
| Example 186 | $LaNi_5$ | Pt | 100 | 321 |
| Example 187 | $LaNi_5$ | $MoCo_3$ | 100 | 325 |
| Example 188 | $LaNi_5$ | CoO | 100 | 290 |
| Example 189 | $MmNi_5$ | Rh | 100 | 123 |
| Example 190 | $CaNi_5$ | $MoNi_3$ | 100 | 150 |
| Example 191 | TiFe | Pd | 100 | 154 |

TABLE 25-continued

| | Alloy having hydrogen-absorbing properties | Additive | Treatment time (h) | Discharge capacity (mAh/g) |
|---|---|---|---|---|
| Example 192 | TiCo | FeO | 100 | 111 |
| Example 193 | $ZrMn_2$ | $Wni_3$ | 100 | 148 |
| Example 194 | $ZrNi_2$ | Au | 100 | 85 |

TABLE 26

| | Alloys having hydrogen-absorbing properties | Additive | Treatment time (h) | Discharge capacity (mAh/g) |
|---|---|---|---|---|
| Example 195 | $Mg_2Ni_{0.8}Co_{0.2}$ | Aq | 100 | 650 |
| Example 196 | $Mg_2Ni_{0.6}Co_{0.5}$ | Ir | 100 | 730 |
| Example 197 | $Mg_2Ni_{0.7}Fe_{0.2}$ | V | 50 | 360 |
| Example 198 | $Mg_2Al_{0.2}Ni_{0.8}Mn_{0.2}$ | CoO | 100 | 850 |
| Example 199 | $Mg_{1.9}B_{0.1}Ni$ | NiO | 100 | 605 |
| Example 200 | $Mg_{1.8}Co_{0.1}Ni$ | Pd | 500 | 625 |
| Example 201 | $Mg_2Au_{0.1}Ni$ | Cr | 200 | 652 |
| Example 202 | $Mg_{1.8}Al_{0.2}Ni_{0.8}Cr_{0.2}$ | Ni | 100 | 800 |
| Example 203 | $Mg_2Cu_{0.8}Co_{0.2}$ | Mn | 100 | 503 |
| Example 204 | $Mg_2Cu_{0.7}Sn_{0.5}$ | $Co_3O_4$ | 100 | 524 |
| Example 205 | $Mg_2Au_{0.1}Ni_{1.3}$ | Ru | 100 | 605 |
| Example 206 | $Mg_2Ni_{1.6}Ag_{0.1}$ | Mo | 100 | 553 |
| Example 207 | $Mg_2Al_{0.1}Ni_{1.9}$ | $RhO_2$ | 100 | 502 |

TABLE 27

| | Alloys having hydrogen-absorbing properties | Additive | Treatment time (h) | Discharge capacity (mAh/g) |
|---|---|---|---|---|
| Example 208 | $Mg_2Fe_{0.5}Ni_{0.6}Zn_{0.1}$ | W | 100 | 645 |
| Example 209 | $LaAl_{0.3}Ni_{3.7}Nn_{0.5}Co_{0.5}$ | $VCO_3$ | 100 | 285 |
| Example 210 | $LaAl_{0.4}Ni_{4.4}Zr_{0.2}$ | Ru | 100 | 231 |
| Example 211 | $LaAl_{0.3}Ni_{3.7}Mn_{0.5}Co_{0.5}$ | $VNi_3$ | 100 | 265 |
| Example 212 | $MmAl_{1.0}Ni_{3.5}Si_{0.5}$ | Nb | 100 | 284 |
| Example 213 | $MmNi_{3.6}Mn_{0.4}Ti_{0.3}Co_{0.7}$ | $Wpt_3$ | 100 | 205 |
| Example 214 | $MmAl_{0.2}Ni_{3.8}Mn_{0.5}Cu_{0.5}$ | Ta | 100 | 250 |
| Example 215 | $TiFe_{0.8}Mn_{0.1}$ | $Co_2O_3$ | 100 | 211 |
| Example 216 | $TiCo_{0.6}Mn_{0.5}$ | V | 100 | 260 |
| Example 217 | $Zr_{0.6}Ti_{0.4}V_{0.6}Ni_{1.3}$ | Au | 100 | 390 |
| Example 218 | $ZrCo_{1.0}Mn_{1.3}$ | $RuO_2$ | 100 | 350 |
| Example 219 | $ZrV_{0.3}Ni_{1.4}Mn_{0.6}$ | Ta | 100 | 380 |

As apparent from these Tables 24 to 27, when a hydrogen-absorbing alloy is mechanically treated, the discharge capacity thereof can be increased so that the charge/discharge property of the alloy can be prominently improved.

EXAMPLE 220

$Mg_2Ni$ alloy obtained by way of high-frequency melting method was mixed with 20% by volume (based on $Mg_2Ni$ alloy) of Ni powder to be functioned as a catalyst seed (an additive), and the resultant mixture was introduced together with stainless steel balls into a stainless steel vessel provided with a double cap. Thereafter, the vessel was filled with an argon atmosphere which has been conditioned to contain 1 ppm or less of oxygen and 0.5 ppm or less of water content. After being sealed with an O-ring, the vessel was subjected to a ball-milling treatment (a mechanical treatment) for 100 hours, the rotational speed thereof being controlled to 200 rpm.

Then, a measurement was performed regarding the hydrogen-absorbing rate at 25° C. of the resultant alloy by making use of the aforementioned hydrogen-absorption/desorption property-evaluating apparatus shown in FIG. 6. The hydrogen absorption rate V of the alloy is indicated by the number of hydrogen MHV which was absorbed in the alloy for a time period of 10 hours starting from the introduction of predetermined quantity of hydrogen into the reaction vessel. The results are shown in Table 28 below.

EXAMPLES 221–241

As shown in Table 28, the alloys having hydrogen-absorbing properties were mixed respectively with percent by volume (based on the hydrogen-absorbing alloys) of an additive to be functioned as a catalyst seed, and the resultant mixtures were subjected to a mechanical treatment under the same conditions as in the case of Example 220.

Thereafter, the hydrogen-absorbing rate at 25° C. of each hydrogen-absorbing alloy was performed in the same manner as explained in Example 220 by making use of the aforementioned hydrogen-absorption/desorption property-evaluating apparatus shown in FIG. 6. The results on these mechanically treated hydrogen-absorbing alloys are shown in the following Table 28 together with the result on an $Mg_2Ni$ alloy which was not mechanically treated (Comparative Example 20).

TABLE 28

| | Alloy having hydrogen-absorbing properties | Additive | Amount of additive (vol %) | V (Before treatment) | V (After treatment) |
|---|---|---|---|---|---|
| Comparative Example 20 | $Mg_2Ni$ | — | — | 0 | — |
| Example 220 | $Mg_2Ni$ | Ni | 20 | 0 | 3.3 |
| Example 221 | $Mg_2Ni_{0.5}Cu_{0.5}$ | Pd | 51 | 0 | 2.7 |
| Example 222 | $Mg_2Ni_{0.75}Co_{0.25}$ | $MoCo_3$ | 32 | 0 | 3.9 |
| Example 223 | $Mg_2Ni_{0.75}Fe_{0.25}$ | $RuO_3$ | 61 | 0 | 3.2 |
| Example 224 | $Ti_2Ni$ | $MmNi_5$ | 5 | 0 | 1.9 |
| Example 225 | $LaNi_5$ | V | 37 | 0.1 | 6.0 |
| Example 226 | $MmNi_5$ | $MgZn_2$ | 21 | 0 | 3.6 |
| Example 227 | $CaNi_5$ | Hf | 9 | 0 | 4.8 |
| Example 228 | $MgNi_2$ | $La_3Ni$ | 42 | 0 | 3.4 |
| Example 229 | $WNi_2$ | $ZrFe_2$ | 13 | 0 | 3.7 |
| Example 230 | TiNi | Ir | 46 | 0 | 1.9 |
| Example 231 | LaNi | $V_4Ti$ | 84 | 0.1 | 2.6 |
| Example 232 | Vni | Ni | 29 | 0.1 | 2.3 |
| Example 233 | $LaNi_3$ | $Ca_2Fe$ | 34 | 0.1 | 4.2 |
| Example 234 | $Vni_3$ | $Mg_2Ni$ | 55 | 0 | 4.1 |
| Example 235 | $La_2Ni_7$ | Pt | 42 | 0.1 | 7.6 |
| example 236 | $Zr_2Ni_7$ | $Mg_2Cu$ | 63 | 0 | 6.9 |
| Example 237 | $La_2Ni_3$ | $ZrNi_2$ | 2 | 0.2 | 3.6 |
| Example 238 | $Ca_2Ni_3$ | Mo | 27 | 0.1 | 3.1 |
| Example 239 | $La_7Ni_3$ | TiNi | 13 | 0.1 | 4.2 |
| Example 240 | $La_3Ni$ | $Co_3O_4$ | 73 | 0.2 | 8.1 |
| Example 241 | $V_3Ni$ | Co | 58 | 0 | 7.6 |

As apparent from Table 28, the hydrogen-absorbing alloys of Examples 220 to 241 which were obtained by mechanically treating a mixture comprising a hydrogen-absorptive alloy containing not less than 5% by volume of Ni and mixed with an additive such as a metallic additive exhibited a prominently high hydrogen-absorbing rate and improved hydrogen-absorbing properties as compared with the hydrogen-absorbing alloy of Comparative Example 19 which was formed of an $Mg_2Ni$ alloy and not subjected to the aforementioned mechanical treatment.

EXAMPLE 242

The powdered hydrogen-absorbing alloy obtained in Example 220 was mixed with electrolytic copper powder in the weight ratio of 1:1, and 1 g of the resultant mixture was subjected to compression for 3 minutes by applying a pressure of 20,000 kg in a tablet-molding device (inner diameter: 10 mm) thereby obtaining a pellet. This pellet was then sandwiched between Ni wire nettings, and the peripheral portion thereof was spot-welded and pressed. Subsequently, to this pressed body was connected a Ni lead wire by means of spot-welding thereby preparing a hydrogen-absorbing alloy electrode (a negative electrode).

The hydrogen electrode thus obtained was dipped, together with a sintered nickel electrode constituting a counter electrode, into a 8N aqueous solution of potassium hydroxide, and then, a charge/discharge cycle test was performed at a temperature of 25° C. In this charge/discharge cycle test, each cycle was consisted of the steps, i.e. the charging was conducted under the condition of 100 mA per 1 g of hydrogen-absorbing alloy for 10 hours, and, after a ten minute cessation, the discharge was then conducted under the condition of 20 mA per 1 g of hydrogen-absorbing alloy until the voltage against the mercury oxide electrode was lowered down to −0.5V.

The cycling characteristic in discharge capacity of the negative electrode of the Comparative Example 20 (containing $Mg_2Ni$ which was not subjected to the aforementioned mechanical treatment) and the cycling characteristic in discharge capacity of the negative electrode of Example 242 are indicated in FIG. 11 by the curves a and b, respectively. As apparent from FIG. 11, the negative electrode (the curve a) containing $Mg_2Ni$ which was not subjected to the aforementioned mechanical treatment failed to perform any charging/discharging at the normal temperature, thus indicating little discharge capacity. On the other hand, the negative electrode (the curve b) containing the hydrogen-absorbing alloy of Example 220 indicated a discharge capacity of 832 mAh/g from the first cycle, thus indicating a prominent increase in discharge capacity that had been brought about by the mechanical treatment.

EXAMPLES 243–253

Twelve kinds of hydrogen-absorbing alloy were prepared by mixing nickel at a volume ratios shown in the following Table 29 with $Mg_2Ni$ alloy, and the resultant mixtures were treated in the same manner as in Example 220.

Thereafter, the hydrogen-absorbing rate of each hydrogen-absorbing alloy thus obtained was measured in the same manner as in Example 220.

Furthermore, negative electrodes were prepared in the same manner as explained in Example 242 by making use of each hydrogen-absorbing alloy, and the negative electrodes thus obtained were respectively dipped, together with a sintered nickel electrode constituting a counter electrode, into a 8N aqueous solution of potassium hydroxide, and then, a charge/discharge cycle test was performed at a temperature of 25° C. to measure the maximum discharge capacity.

The results obtained are shown in Table 29 together with the result of Comparative Example 20.

Figure 12:
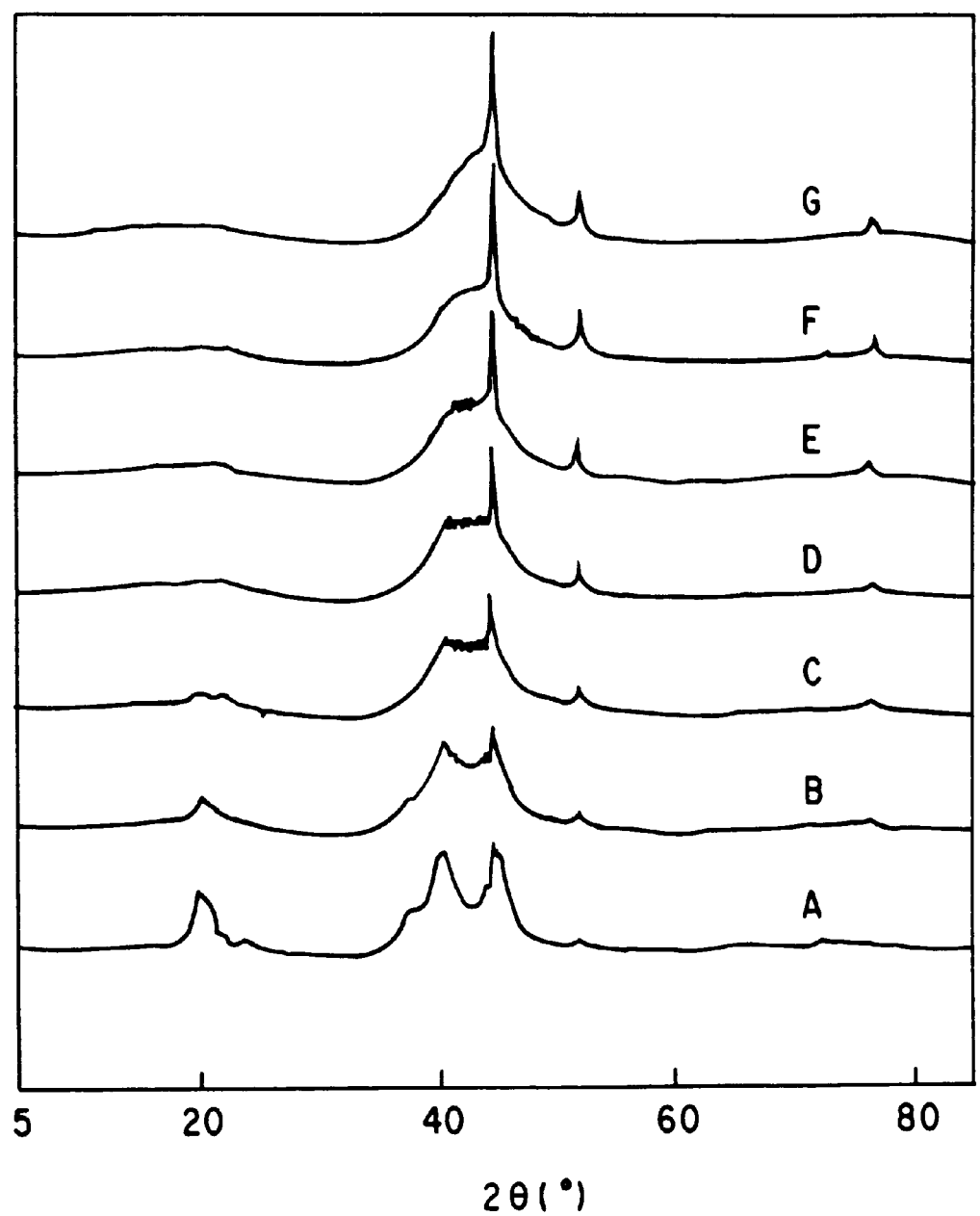
FIG. 12 is a graph showing the XRD patterns of hydrogen-absorbing alloys which have been obtained by mechanically treating the mixtures comprising $Mg_2Ni$ and Ni.

FIG. 12 indicates XRD patterns (A to G) which were obtained as the content of nickel was altered. In FIG. 12, A indicates the pattern of the sample $Mg_2Ni$+5 vol. % Ni; B, the pattern of the sample $Mg_2Ni$+10 vol. % Ni; C, the pattern of the sample $Mg_2Ni$+15 vol. % Ni; D, the pattern of the sample $Mg_2Ni$+18 vol. % Ni; E, the pattern of the sample $Mg_2Ni$+22 vol. % Ni; F, the pattern of the sample $Mg_2Ni$+25 vol. % Ni; and G, the pattern of the sample $Mg_2Ni$+33 vol. % Ni. As apparent from FIG. 12, as the content of nickel was increased, the peaks in the vicinity of 20° and in the vicinity of 40° in the XRD patterns of $Mg_2Ni$ become proportionally broader, thus prominently increasing the apparent half-widths $\Delta(2\theta_{20°})$ and $\Delta(2\theta_{40°})$.

TABLE 29

| | Amount of nickel (vol %) | Hydrogen absorption rate V | Discharge capacity (mAh/g) |
|---|---|---|---|
| Comparative Example 20 | 0 | 0 | 0 |
| Example 243 | 5.1 | 2.1 | 525 |
| Example 244 | 9.7 | 2.2 | 544 |
| Example 245 | 13.9 | 2.5 | 645 |
| Example 246 | 17.7 | 3.0 | 751 |
| Example 247 | 21.2 | 3.1 | 790 |
| Example 248 | 24.4 | 3.2 | 805 |
| Example 249 | 30.0 | 3.3 | 832 |
| Example 250 | 34.5 | 3.4 | 850 |
| Example 251 | 39.2 | 3.6 | 900 |
| Example 252 | 49.8 | 3.7 | 920 |
| Example 253 | 65.9 | 2.8 | 700 |

As apparent from Table 29, the hydrogen-absorbing rate as well as the discharge capacity could be increased by increasing the content of nickel up to 50 vol. %. However, when the content of nickel exceeded over 50 vol. %, the hydrogen-absorbing rate was greatly decreased on the contrary.

EXAMPLES 254–275

22 kinds of hydrogen-absorbing alloy were prepared by mixing various kinds of additive at a volume ratios with various kinds of alloy having hydrogen-absorbing properties as shown in the following Table 30, and the resultant mixtures were mechanically treated in the same manner as in Example 220 to prepare 22 kinds of hydrogen-absorbing alloys.

Thereafter, negative electrodes were prepared in the same manner as explained in Example 242 by making use of each hydrogen-absorbing alloy, and the negative electrodes thus obtained were respectively dipped, together with a sintered nickel electrode constituting a counter electrode, into a 8N aqueous solution of potassium hydroxide, and then, a charge/discharge cycle test was performed at a temperature of 25° C. to measure the maximum discharge capacity.

The results obtained are shown in Table 30 together with the result of Comparative Example 20.

TABLE 30

| | Alloy having hydrogen-absorbing properties | Additive | Amount of additive (vol %) | Discharge capacity (mAh/g) |
|---|---|---|---|---|
| Comparative Example 20 | $Mg_2Ni$ | — | — | 0 |
| Example 254 | $Mg_2Ni$ | Ni | 65 | 820 |
| Example 255 | $Mg_2Ni_{0.5}Cu_{0.5}$ | $WNi_3$ | 31 | 728 |
| Example 256 | $Mg_2Ni_{0.75}Co_{0.25}$ | NiO | 27 | 826 |
| Example 257 | $Mg_2Ni_{0.75}Co_{0.25}$ | $LaNi_5$ | 48 | 850 |
| Example 258 | $Ti_2Ni$ | Au | 3 | 302 |
| Example 259 | $LaNi_5$ | $V_2O_5$ | 63 | 350 |
| Example 260 | $MmNi_5$ | $ZrFe_2$ | 22 | 285 |
| Example 261 | $CaNi_5$ | Os | 38 | 350 |
| Example 262 | $MgNi_2$ | TiNi | 52 | 442 |
| Example 263 | $VNi_2$ | $Wco_3$ | 8 | 419 |
| Example 264 | TiNi | $Zr_2Ni_7$ | 26 | 374 |
| Example 265 | LaNi | Ti | 64 | 355 |
| Example 266 | VNi | Ni | 14 | 480 |
| Example 267 | $LaNi_3$ | $RuO_2$ | 17 | 450 |

TABLE 30-continued

|  | Alloy having hydrogen-absorbing properties | Additive | Amount of additive (vol %) | Discharge capacity (mAh/g) |
|---|---|---|---|---|
| Example 268 | $VNi_3$ | Co | 56 | 401 |
| Example 269 | $La_2Ni_7$ | Ta | 35 | 360 |
| Example 270 | $Zr_2Ni_7$ | $Na_2Ni$ | 2 | 364 |
| Example 271 | $La_2Ni_3$ | $ZrNi_2$ | 42 | 222 |
| Example 272 | $Ca_2Ni_3$ | LaNi | 29 | 211 |
| Example 273 | $La_7Ni_3$ | $V_3Ni$ | 51 | 503 |
| Example 274 | $La_3Ni$ | $Co_2O_3$ | 38 | 450 |
| Example 275 | $V_3Ni$ | Rf | 7 | 700 |

As apparent from Table 30, it was found possible by the mechanical treatment of the hydrogen-absorbing alloys to increase the discharge capacity and to greatly improve the charge/discharge characteristics of the alloys.

EXAMPLES 276–279

Comparative Example 20

$Mg_2Ni$ alloy obtained by way of high-frequency melting method and $LaNi_5$ alloy obtained by way of high-frequency melting method were mixed together at a volume ratio of 80:20, and the resultant mixtures were subjected to the same mechanical treatment as in the case of Example 220 for various time periods, thereby preparing four different kinds of hydrogen-absorbing alloy.

Then, the value of $\Delta(2\theta_2)$ (a half-width of a peak in the vicinity of 40° in an X-ray diffraction using $CuK_\alpha$-ray as a radiation source) of each hydrogen-absorbing alloy and the hydrogen-absorbing rate of each hydrogen-absorbing alloy were measured respectively.

Thereafter, negative electrodes were prepared in the same manner as explained in Example 242 by making use of each hydrogen-absorbing alloy, and the negative electrodes thus obtained were respectively dipped, together with a sintered nickel electrode constituting a counter electrode, into a 8N aqueous solution of potassium hydroxide, and then, a charge/discharge cycle test was performed at a temperature of 25° C. to measure the maximum discharge capacity.

The results obtained are shown in Table 31 together with the result of Comparative Example 20 where a $Mg_2Ni$ alloy was not subjected to the aforementioned mechanical treatment.

TABLE 31

|  | Treatment time (h) | $\Delta(2\theta_2)$ (°) | Hydrogen absorption rate V | Discharge capacity (mAh/g) |
|---|---|---|---|---|
| Comparative Example 20 | 0 | 0.07 | 0.6 | 150 |
| Example 276 | 5 | 0.60 | 1.9 | 463 |
| Example 277 | 50 | 1.50 | 2.4 | 621 |
| Example 278 | 400 | 3.70 | 3.4 | 860 |
| Example 279 | 700 | 6.10 | 3.5 | 871 |

As apparent from Table 31, it was found that when this mechanical treatment was performed for a longer period of time, the particle diameter of the crystal-lite became smaller, and at the same time, a non-uniform distortion was generated within the crystal, thereby increasing the value of $\Delta(2\theta_2)$ and greatly increasing the hydrogen-absorbing rate and discharge capacity of the alloys.

EXAMPLES 280–284

Comparative Examples 23 and 24

70 vol. % of a $Mg_2Ni$ hydrogen-absorbing alloy and 30 vol. % of Co powder were introduced together with stainless steel balls into a stainless steel vessel provided with a double cap. Thereafter, the vessel was filled with seven kinds of atmosphere, i.e., vacuum, an inert gas (argon, nitrogen or helium), hydrogen, oxygen and air. The mechanical treatment was performed in the same manner as in the case of Example 220 to prepare seven kinds of surface-modified hydrogen-absorbing alloy powders.

Then, the hydrogen-absorbing rate of each modified hydrogen-absorbing alloy was measured by making use of these modified hydrogen-absorbing alloy powders.

Thereafter, negative electrodes were prepared in the same manner as explained in Example 242 by making use of each of these modified hydrogen-absorbing alloy, and the negative electrodes thus obtained were respectively dipped, together with a sintered nickel electrode constituting a counter electrode, into a 8N aqueous solution of potassium hydroxide, and then, a charge/discharge cycle test was performed at a temperature of 25° C. to measure the maximum discharge capacity.

The results obtained are shown in Table 32.

TABLE 32

|  | Treatment atmosphere |  | Hydrogen absorption rate V | Discharge capacity (mAh/g) |
|---|---|---|---|---|
| Example 280 | Argon | (99.999%) | 2.4 | 610 |
| Example 281 | Vacuum |  | 2.0 | 415 |
| Example 282 | Nitrogen | (99.999%) | 2.2 | 550 |
| Example 283 | Helium | (99.999%) | 2.1 | 531 |
| Example 284 | Hydrogen | (99.99999%) | 2.7 | 672 |
| Comparative Example 23 | Oxygen | (99.999%) | 0 | 0 |
| Comparative Example 24 | Air |  | 0 | 0 |

As apparent from Table 32, it was found that the employment of vacuum, an inert gas or hydrogen gas was, preferable as an atmosphere for the mechanical treatment, i.e. hydrogen-absorbing alloys which were mechanically treated in these atmospheres exhibited a greatly increased hydrogen-absorbing rate, and the negative electrode containing any of these hydrogen-absorbing alloys exhibited an increased discharge capacity.

EXAMPLES 285–306

Powdered additives having a predetermined particle diameter were added to the alloys having hydrogen-absorbing properties as shown in the following Table 33, and the resultant mixtures were subjected to the same mechanical treatment as in the case of Example 220 for various time periods, thereby preparing 22 different kinds of hydrogen-absorbing alloy.

Then, the hydrogen-absorbing rate of each hydrogen-absorbing alloy was measured in the same manner as in Example 220.

Thereafter, negative electrodes were prepared in the same manner as explained in Example 242 by making use of each hydrogen-absorbing alloy, and the negative electrodes thus obtained were respectively dipped, together with a sintered nickel electrode constituting a counter electrode, into a 8N aqueous solution of potassium hydroxide, and then, a charge/discharge cycle test was performed at a temperature of 25° C. to measure the maximum discharge capacity.

The results obtained are shown in Table 33 together with the dispersion volume of the aforementioned powdered additives and with the result of Comparative Example 20.

TABLE 33

| | Alloy having hydrogen-absorbing properties | Additive | Particle diameter ($\mu$m) | Dispersion ratio (vol %) | Hydrogen absorption rate V | Discharge capacity (mAh/g) |
|---|---|---|---|---|---|---|
| Comparative Example 20 | $Mg_2Ni$ | — | — | 0 | 0 | 0 |
| Example 285 | $Mg_2Ni$ | Ni | 0.001 | 30 | 3.0 | 743 |
| Example 286 | $Mg_2Ni_{0.6}Cu_{0.4}$ | Zr | 0.513 | 17 | 2.8 | 700 |
| Example 287 | $Mg_2Ni_{0.7}Cu_{0.3}$ | $MoNi_3$ | 8.15 | 0.4 | 3.3 | 824 |
| Example 288 | $Mg_2Ni_{0.85}Fe_{0.15}$ | $Co_2O_3$ | 0.692 | 16 | 3.4 | 856 |
| Example 289 | $Ti_2Ni$ | Ag | 3.68 | 0.7 | 3.0 | 290 |
| Example 290 | $LaNi_5$ | $ZrNi_2$ | 5.1 | 30 | 5.0 | 381 |
| Example 291 | $MmNi_5$ | W | 35.7 | 4.3 | 5.5 | 256 |
| Example 292 | $CaNi_5$ | $ZrFe_3$ | 0.325 | 17 | 5.8 | 348 |
| Example 293 | $MgNi_2$ | V | 0.013 | 32 | 3.1 | 431 |
| Example 294 | $VNi_2$ | $Mg_2Ni$ | 12.0 | 0.5 | 3.8 | 409 |
| Example 295 | TiNi | Tc | 1.35 | 2.5 | 2.0 | 368 |
| Example 296 | LaNi | $Mg_2Cu$ | 2.31 | 26 | 2.7 | 351 |
| Example 297 | VNi | $LaNi_5$ | 0.052 | 1.8 | 3.0 | 360 |
| Example 298 | $LaNi_3$ | $Ti_2Ni$ | 0.016 | 45 | 4.8 | 425 |
| Example 299 | $VNi_3$ | TiFe | 0.894 | 3.6 | 4.9 | 431 |
| Example 300 | $La_2Ni_7$ | $Zr_2Fe$ | 0.953 | 23 | 10.1 | 367 |
| Example 301 | $Zr_2Ni_7$ | $IrO_2$ | 22.3 | 0.02 | 9.5 | 356 |
| Example 302 | $La_2Ni_3$ | $MmNi_5$ | 0.413 | 8.9 | 3.6 | 218 |
| Example 303 | $Ca_2Ni_3$ | Rh | 40.5 | 48 | 3.8 | 209 |
| Example 304 | $La_7Ni_3$ | $WCo_3$ | 35.36 | 0.06 | 4.0 | 482 |
| Example 305 | $La_3Ni$ | Ru | 0.156 | 31 | 8.5 | 503 |
| Example 306 | $V_3Ni$ | Cr | 8.91 | 15 | 9.0 | 690 |

As apparent from Table 33, it was found that, although the hydrogen-absorbing rate V of $Mg_2Ni$ per se was about 0 to 0.5 at the normal temperature, when a powdered additive such as Ni was added to an alloy having hydrogen-absorbing properties such as the hydrogen-absorbing alloys of Examples 285 to 306, the hydrogen-absorbing properties at the normal temperature of the alloy could be improved, and at the same time, the charge/discharge characteristics of the negative electrode containing this hydrogen-absorbing alloy could be greatly improved.

EXAMPLES 307–326

Powdered additives having a predetermined particle diameter were added to the alloys having hydrogen-absorbing properties and represented by the aforementioned general formulas (V) and (VI) as shown in the following Table 34, and the resultant mixtures were subjected to the same mechanical treatment as in the case of Example 220 for various time periods, thereby preparing 20 different kinds of hydrogen-absorbing alloy.

Then, the hydrogen-absorbing rate of each hydrogen-absorbing alloy was measured in the same manner as in Example 220.

Thereafter, negative electrodes were prepared in the same manner as explained in Example 242 by making use of each hydrogen-absorbing alloy, and the negative electrodes thus obtained were respectively dipped, together with a sintered nickel electrode constituting a counter electrode, into a 8N aqueous solution of potassium hydroxide, and then, a charge/discharge cycle test was performed at a temperature of 25° C. to measure the maximum discharge capacity.

The results obtained are shown in Table 34 together with the dispersion volume of the aforementioned powdered additives.

TABLE 34

| | Alloy having hydrogen-absorbing properties | Additive | Particle diameter ($\mu$m) | Dispersion ratio (vol %) | Hydrogen absorption rate V | Discharge capacity (mAh/g) |
|---|---|---|---|---|---|---|
| Example 307 | $(Mg_{0.8}Mn_{0.2})_4Ni$ | Co | 5 | 3.2 | 2.8 | 456 |
| Example 308 | $(Mg_{0.6}Cr_{0.4})_{12}Co_{0.3}Cu_{0.7}$ | $CaNi_5$ | 20 | 15.3 | 3.0 | 391 |
| Example 309 | $(Mg_{0.8}Al_{0.1}B_{0.1})_4Fe$ | TiFe | 35 | 8.6 | 1.6 | 530 |
| Example 310 | $(Mg_{0.9}Mo_{0.1})_{11}Si$ | Ni | 0.1 | 25.2 | 3.1 | 700 |
| Example 311 | $(Mg_{0.7}Ru_{0.3})_{13}Sn_{0.5}Zn_{0.5}$ | V | 3 | 40.1 | 2.6 | 621 |
| Example 312 | $(Mg_{0.8}Pd_{0.1}W_{0.1})_{10}Ni$ | $Ti_2Ni$ | 18 | 55.3 | 2.2 | 313 |
| Example 313 | $(Mg_{0.7}Zr_{0.3})_5Ni_{0.9}Cu_{0.1}$ | $Co_3Mo$ | 50 | 1.2 | 2.1 | 215 |
| Example 314 | $(Mg_{0.9}Co_{0.1})_{15}Ni_{0.9}Co_{0.1}$ | Ni | 0.9 | 11.6 | 2.9 | 400 |
| Example 315 | $(Mg_{0.7}Ge_{0.3})_9Fe$ | ZrMnNi | 23 | 31.2 | 3.1 | 390 |
| Example 316 | $(Mg_{0.8}P_{0.1}Ti_{0.1})_3Cu$ | Pt | 11 | 0.6 | 2.6 | 280 |
| Example 317 | $(Mg_{0.9}K_{0.1})_3Ni$ | NiP | 0.5 | 19.3 | 2.2 | 431 |
| Example 318 | $(Mg_{0.6}Ca_{0.4})_{14}Co_{0.5}Ni_{0.5}$ | Mo | 1.3 | 60.2 | 1.3 | 320 |
| Example 319 | $(Mg_{0.8}Ca_{0.1}Sr_{0.1})_{12}Zn$ | Pd | 5 | 45.3 | 2.9 | 800 |
| Example 320 | $(Mg_{0.5}Ba_{0.5})_{10}Cu_{0.7}Ni_{0.3}$ | $V_4Ti$ | 13 | 1.2 | 3.0 | 293 |
| Example 321 | $(Mg_{0.8}Na_{0.2})_{16}Fe$ | NiB | 8 | 16.3 | 2.2 | 411 |
| Example 322 | $(Mg_{0.7}La_{0.2}Li_{0.1})_5Si$ | $LaNi_4Al$ | 15 | 21.6 | 2.6 | 393 |

TABLE 34-continued

|  | Alloy having hydrogen-absorbing properties | Additive | Particle diameter ($\mu$m) | Dispersion ratio (vol %) | Hydrogen absorption rate V | Discharge capacity (mAh/g) |
|---|---|---|---|---|---|---|
| Example 323 | $(Mg_{0.8}Y_{0.1}Ca_{0.1})_{20}Ni_{0.8}Co_{0.1}Cu_{0.1}$ | Ni | 0.05 | 30.3 | 2.5 | 516 |
| Example 324 | $(Mg_{0.6}Sr_{0.4})_5Cu$ | Au | 21 | 9.6 | 2.1 | 290 |
| Example 325 | $(Mg_{0.9}Li_{0.1})_8Ni$ | B | 0.8 | 51.2 | 1.3 | 410 |
| Example 326 | $(Mg_{0.6}La_{0.4})_4Co$ | $CaAlNi_4$ | 3 | 3.2 | 2.2 | 391 |

As apparent from Table 34, it was found that the hydrogen-absorbing alloys according to Examples 307 to 326 wherein a powdered additive such as Ni was added to the alloys having hydrogen-absorbing properties and represented by the aforementioned general formulas (V) and (VI) were capable of further improving the hydrogen-absorbing properties at the normal temperature as compared with the hydrogen-absorbing alloys of Examples 307 to 326.

EXAMPLES 327–332

Comparative Examples 25–27

To the hydrogen-absorbing alloy having the composition of $Mg_{1.9}Al_{0.1}Ni_{1.05}$ were mixed carbon powder and polytetrafluoroethylene in a various ratio, and each of the resultant mixtures was rolled, thereby forming a sheet. This sheet was adhered under pressure to Ni wire nettings, thereby preparing nine kinds of hydrogen electrodes (negative electrodes). The hydrophobic nature as well as the elution rate of ions of the hydrogen electrode can be altered depending on the composition thereof such as the content of polytetrafluoroethylene and on the magnitude of pressure for forming the composite sheet with Ni wire netting.

The hydrogen electrodes thus obtained were dipped into a 8N aqueous solution of potassium hydroxide, and then, a charge/discharge cycle test was performed at the normal temperature. In this charge/discharge cycle test, the charging was conducted under the condition of 100 mA per 1 g of hydrogen-absorbing alloy for 10 hours, and the discharge was conducted under the condition of 200 mA per 1 g of hydrogen-absorbing alloy until the voltage against the mercury oxide electrode was risen up to −0.5V. The relationship of the ratio between the capacity at 20th cycle and the capacity at 3rd cycle to the ion elution rate is shown in Table 35. The ion elution rate was determined by dipping the hydrogen electrode in an aqueous solution of alkali hydroxide for 5 hours, and then, measuring the amount of the eluted component by means of ICP (Inductively Coupled Plasma) spectrometry. The amount of the aqueous solution of alkali hydroxide was selected to be about 100 mL per 1 g of the alloy in the hydrogen electrode.

TABLE 35

|  | Ionic species | Composition of alkali hydroxide aqueous solution | Liquid Temp. °C. | Eluting rate mg/kg alloy/hr. | Ratio (%) of capacity: 20th cycle/3rd cycle |
|---|---|---|---|---|---|
| Example 327 | Mg | 8N KOH | 25 | 0.3 | 70 |
| Example 328 | Mg | 6N KOH | 25 | 0.5 | 65 |
| Example 329 | Mg | 7N KOH 1N LiOH | 25 | 0.4 | 77 |
| Example 330 | Mg | 9N KOH | 60 | 1.2 | 75 |
| Example 331 | Mg + Al | 8N KOH | 25 | 1.0 | 72 |
| Example 332 | Mg + Al | 8N KOB | 60 | 3.4 | 68 |
| Comparative Example 25 | Mg | 8N KOH | 25 | 0.7 | 32 |
| Comparative Example 26 | Mg | 9N KOH | 60 | 2.3 | 43 |
| Comparative Example 27 | Mg + Al | 8N KOH | 25 | 4.8 | 30 |

EXAMPLES 333–341

To the hydrogen-absorbing alloy having the composition shown in Table 36 were mixed carbon powder and polytetrafluoroethylene in a various ratio, and each of the resultant mixtures was rolled, thereby forming a sheet. This sheet was adhered under pressure to Ni wire nettings, thereby preparing eight kinds of hydrogen electrodes (negative electrodes).

The hydrogen electrodes thus obtained were dipped into a 8N aqueous solution of potassium hydroxide, and then, a charge/discharge cycle test was performed at the normal temperature and in the same manner as explained in Example 327. The relationship of the ratio between the capacity at 20th cycle and the capacity at 3rd cycle to the ion elution rate as determined in the same manner as explained in Example 327 is shown in Table 36 below.

TABLE 36

|  | Hydrogen-absorbing alloy | Ionic species |
|---|---|---|
| Example 333 | $Mg_2Ni_{1.125}$ | Mg |
| Example 334 | $Mg_2Co_{1.1}In_{0.1}$ | All elements |
| Example 335 | $MgNi_{1.11}Ag_{0.22}$ | Mg |
| Example 336 | $Mg_{1.8}Al_{0.3}Ni_{0.9}Pd_{0.3}$ | Mg |
| Example 337 | $Mg_{1.8}Al_{0.3}Ni_{0.9}Pd_{0.3}$ | All elements |
| Example 338 | $Mg_{1.6}Al_{0.3}NiMn_{0.2}$ | Mg |
| Example 339 | $Mg_{1.6}Al_{0.3}Ni_{0.7}Mn_{0.2}Co_{0.2}$ | All elements |
| Example 340 | $Mg_{1.8}Al_{0.3}Ni_{0.9}Pd_{0.3}$ (Powder dipped in 0.01N hydrochloric acid for 30 seconds as used) | Mg |
| Example 341 | $Mg_{1.8}Al_{0.2}Ni_{0.95}Pt_{0.05}$ | Mg |

|  | Composition of aqueous solution | Liquid Temp. °C. | Eluting rate mg/kg alloy/hr | Ratio (%); 20th cycle/3rd cycle |
|---|---|---|---|---|
| Example 333 | 8N KOH | 25 | 0.2 | 65 |
| Example 334 | 8N KOH | 25 | 2.1 | 72 |
| Example 335 | 8N KOH | 25 | 0.2 | 76 |
| Example 336 | 8N KOH | 25 | 0.2 | 78 |
| Example 337 | 8N KOH | 60 | 4.2 | 77 |

TABLE 36-continued

| Example 338 | 7N KOH 1N LiOH | 60 | 0.5 | 70 |
|---|---|---|---|---|
| Example 339 | 9N KOH | 60 | 3.4 | 80 |
| Example 340 | 8N KOH | 25 | 0.2 | 76 |
| Example 341 | 8N KGB | 25 | 0.2 | 74 |

As seen from these Tables 35 and 36, a simulated battery provided with a hydrogen electrode comprising a hydrogen-absorbing alloy which is featured in that, when the negative electrode is immersed in a 6 to 8N aqueous solution of an alkali hydroxide, (a) either the elution rate of magnesium ion into the aqueous solution of alkali hydroxide of normal temperature is not more than 0.5 mg/kg alloy/hr, or the elution rate of magnesium ion into the aqueous solution of alkali hydroxide of 60° C. is not more than 4 mg/kg alloy/hr, and (b) either the elution rate of a component element of alloy into the aqueous solution of alkali hydroxide of normal temperature is not more than 1.5 mg/kg alloy/hr, ore the elusion rate of a component element of alloy into the aqueous solution of alkali hydroxide of 60° C. is not more than 20 mg/kg alloy/hr (Examples 327 to 341) had a higher capacity as compared with a simulated battery provided with a hydrogen electrodes (Comparative Examples 25 to 27) comprising a hydrogen-absorbing alloy which did not satisfy such conditions as mentioned above.

EXAMPLES 342–348

Comparative Example 28

Hydrogen electrodes (negative electrodes) obtained in Examples 327, 333 to 335 and 338 to 340, and Comparative Example 27 were respectively superimposed on a paste type Ni electrode (a positive electrode) with a nylon non-woven fabric interposed therebetween. Then, the resultant composite was wound into a cylindrical body thereby preparing eight kinds of electrode group. These electrode group were inserted into a battery case of AA size, and then a 8N potassium hydroxide was poured therein. Thereafter, the case was sealed with a sealing plate provided with a safety valve thereby obtaining 8 kinds of AA type nickel-hydrogen secondary battery.

The batteries thus obtained were subjected to a charge/discharge cycle test performed under the following conditions-, i.e., the charging was conducted under the condition of 50 mA per 1 g of hydrogen-absorbing alloy for 10 hours, and the discharge was conducted under the condition of 20 mA per 1 g of hydrogen-absorbing alloy until the voltage against the mercury oxide electrode was lowered down to 0.9V. The cycle was repeated, and the capacity at 3rd cycle was compared with the capacity at 20th cycle. Further, the batteries were disintegrated at 30th day after the manufacture thereof, and the amount of Mg ion eluted into the electrolyte was measured by means of ICP (Inductively Coupled Plasma) spectrometry. The results are shown in Table 37.

TABLE 37

| | Ex. No. of hydrogen electrode used | Ionic species | Concentration mg/l | Ratio (%); 20th cycle/ 3rd cycle |
|---|---|---|---|---|
| Example 342 | Example 327 | Mg | 1.2 | 68 |
| Example 343 | Example 333 | Mg | 1.1 | 63 |
| Example 344 | Example 334 | Mg | 1.7 | 57 |
| Example 345 | Example 335 | Mg | 1.2 | 62 |
| Example 346 | Example 338 | Mg | 1.3 | 59 |
| Example 347 | Example 339 | Mg | 1.2 | 66 |
| Example 348 | Example 340 | Mg | 1.4 | 78 |
| Comparative Example 28 | Comparative Example 27 | Mg | 2.8 | 34 |

As will be apparent from Table 37, the batteries of Examples 343 to 349 satisfying the condition that a magnesium ion concentration in the alkali electrolyte 30 days after filling and sealing the alkali electrolyte in the case was not more than 2.2 mg/liter had a higher capacity as compared with the battery of Comparative Example 28 which did not satisfy such condition as mentioned above.

As explained above, the hydrogen-absorbing alloy of this invention is not only featured as being light and of high capacity, but also featured in that since it is excellent in low temperature hydrogen-absorbing property and chemical stability, the applicability of this alloy can be extended, beyond those to which the conventional alloys have been applicable, to various fields (such as the storage and transportation of hydrogen, the storage and transportation of heat, a heat-mechanical energy exchange, the separation and refining of hydrogen, the separation of hydrogen isotope, a battery containing hydrogen as an active material, a catalyst for synthetic chemistry and heat sensor). It is also possible to develop a new field of application making the most of the hydrogen-absorbing alloy.

Further, according to the hydrogen-absorbing alloy and surface-modifying method of this invention, it is possible to easily activate the alloy and to improve the hydrogen-absorbing property. Accordingly, with the employment of such an alloy as a negative electrode, it is possible to achieve a battery of high capacity.

Moreover, according to the negative electrode and alkali secondary battery as proposed by this invention, it has become possible to apply a Mg-containing hydrogen-absorbing alloy to a charge/discharge reaction, which the conventional Mg-containing hydrogen-absorbing alloy has failed to realized up to date. Furthermore, it is possible to keep the stability of the charge/discharge reaction for a long period of time, while retaining a high capacity.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A negative electrode for battery containing a hydrogen-absorbing alloy comprising magnesium, wherein when the negative electrode is immersed in a 6N to 9N aqueous solution of an alkali hydroxide, (a) either the elution rate of magnesium ion into the aqueous solution of alkali hydroxide of normal temperature is 0.2 mg/kg alloy/hr~0.5 mg/kg alloy/hr, or the elution rate of magnesium ion into the aqueous solution of alkali hydroxide of 60° C. is 0.5 mg/kg alloy/hr~4 mg/kg alloy/hr, and (b) either the elution rate of a component element of alloy into the aqueous solution of alkali hydroxide of normal temperature is 1 mg/kg alloy/hr~1.5 mg/kg alloy/hr, or the elution rate of a component element of alloy into the aqueous solution of alkali hydroxide of 60° C. is 3.4 mg/kg alloy/hr~20 mg/kg alloy/hr.

2. An alkali secondary battery comprising a negative electrode containing a hydrogen-absorbing alloy comprising magnesium, said negative electrode being accommodated in a case; a positive electrode accommodated in said case in such a manner as to face said negative electrode with a separator sandwiched therebetween, and an alkali electrolyte filled therein, wherein a magnesium ion concentration in the alkali electrolyte 30 days after filling and sealing the alkali electrolyte in the case is 1.1 mg/liter~2.2 mg/liter.

3. The negative electrode according to claim 1, wherein the aqueous solution of alkali hydroxide contains at least one selected from the group consisting of sodium hydroxide, lithium hydroxide and potassium hydroxide.

4. The negative electrode according to claim 1, wherein said component element of alloy contains Mg.

5. The negative electrode according to claim 1, wherein said component element of alloy contains Mg and Al.

6. The negative electrode according to claim 1, wherein the hydrogen absorbing alloy contains a composition represented by the following formula (I):

$$Mg_2M1_y \qquad (I)$$

wherein M1 is at least one element selected (excluding Mg, elements which cause an exothermic reaction with hydrogen, Al and B) from elements which do not cause an exothermic reaction with hydrogen; and y is defined as $1<y\leq1.5$.

7. The negative electrode according to claim 1, wherein the hydrogen absorbing alloy contains a composition represented by the following formula (V):

$$(Mg_{1-x}M3_x)_{20-y}M4 \qquad (V)$$

wherein M4 is at least one element selected from the group consisting of Ni, Fe, Co, Cu, Zn, Sn and Si; M3 is at least one element selected (excluding the elements of M4) from the group consisting of elements which are more electronegative than Mg; x is defined as $0<x<0.5$; and y is defined as $0<y<18$.

8. The alkali secondary battery according to claim 2, wherein said alkali electrolyte contains at least one selected from the group consisting of sodium hydroxide, lithium hydroxide and potassium hydroxide.

9. The alkali secondary battery according to claim 2, wherein the hydrogen absorbing alloy contains a composition represented by the following formula (I):

$$Mg_2M1_y \qquad (I)$$

wherein M1 is at least one element selected (excluding Mg, elements which cause an exothermic reaction with hydrogen, Al and B) from elements which do not cause an exothermic reaction with hydrogen; and y is defined as $1<y\leq1.5$.

10. The alkali secondary battery according to claim 2, wherein the hydrogen absorbing alloy contains a composition represented by the following formula (V):

$$(Mg_{1-x}M3_x)_{20-y}M4 \qquad (V)$$

wherein M4 is at least one element selected from the group consisting of Ni, Fe, Co, Cu, Zn, Sn and Si; M3 is at least one element selected (excluding the elements of M4) from the group consisting of elements which are more electronegative than Mg; x is defined as $0<x<0.5$; and y is defined as $0\leq y<18$.

11. An alkali secondary battery according to claim 2, wherein said hydrogen-absorbing alloy further comprises Ni.

12. An alkali secondary battery according to claim 2, wherein said hydrogen-absorbing alloy further comprises Ni and Al.

13. An alkali secondary battery according to claim 2, wherein said alkali electrolyte contains an alkaline solution whose concentration is in the range 6N to 10N.

* * * * *